(12) United States Patent
Fenny

(10) Patent No.: US 9,061,760 B2
(45) Date of Patent: Jun. 23, 2015

(54) INDEPENDENT BLADE CONTROL SYSTEM WITH ROTARY BLADE ACTUATOR

(75) Inventor: Carlos A. Fenny, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 416 days.

(21) Appl. No.: 13/565,577

(22) Filed: Aug. 2, 2012

(65) Prior Publication Data

US 2014/0034778 A1 Feb. 6, 2014

(51) Int. Cl.
*B64C 27/52* (2006.01)
*B64C 27/72* (2006.01)
*F04C 9/00* (2006.01)
*F15B 15/12* (2006.01)

(52) U.S. Cl.
CPC ......... *B64C 27/72* (2013.01); *B64C 2027/7216* (2013.01); *F04C 9/002* (2013.01); *F15B 15/12* (2013.01); *Y02T 50/34* (2013.01)

(58) Field of Classification Search
USPC ................ 244/17.25, 17.27, 99.2, 99.5, 99.6, 244/99.7, 17.11; 92/121, 122, 123, 124, 92/125; 416/157 A, 158
See application file for complete search history.

(56) References Cited

U.S. PATENT DOCUMENTS

| | | | |
|---|---|---|---|
| 2,494,606 A | 1/1950 | Anderson | |
| 2,830,668 A * | 4/1958 | Gaubis et al. | 416/157 R |
| 3,028,814 A | 4/1962 | Rumsey et al. | |
| 3,112,902 A * | 12/1963 | Kongelbeck | 244/3.21 |
| 3,140,902 A * | 7/1964 | Herbst | 384/153 |
| 3,359,871 A * | 12/1967 | Kamman | 92/121 |
| 3,468,175 A | 9/1969 | Rabek | |
| 3,592,412 A | 7/1971 | Glatfelter | |
| 3,743,445 A | 7/1973 | Dworak et al. | |
| 3,747,477 A | 7/1973 | Aldinger | |
| 3,771,422 A * | 11/1973 | Kamman | 91/405 |

(Continued)

FOREIGN PATENT DOCUMENTS

| | | |
|---|---|---|
| DE | 19843120 C1 * | 12/1999 |
| DE | 19841855 A1 | 3/2000 |

(Continued)

OTHER PUBLICATIONS

European Search Report in related European Application No. 12188723.6, dated Feb. 14, 2013, 7 pages.

(Continued)

*Primary Examiner* — Benjamin P Lee
*Assistant Examiner* — Alexander V Giczy
(74) *Attorney, Agent, or Firm* — Bell Helicopter Textron Inc.; Christopher S. Storm

(57) ABSTRACT

According to one embodiment, a rotary blade actuator includes a housing, a vane disposed within the housing, a shaft disposed at least partially within the housing and coupled to the vane. The vane comprises a first vane surface disposed within a first chamber between a first fluid opening and a second fluid opening and a second vane surface disposed within a second chamber between a third fluid opening and a fourth fluid opening. The first and third fluid openings are configured to provide a first fluid to the first chamber and the second chamber at a first pressure, the second fluid opening is configured to provide a second fluid to the first chamber at a second pressure, and the fourth fluid opening is configured to provide a third fluid to the second chamber at a third pressure different from the second pressure.

19 Claims, 56 Drawing Sheets

(56) References Cited

U.S. PATENT DOCUMENTS

| | | |
|---|---|---|
| 4,379,678 A | 4/1983 | Carlock et al. |
| 4,799,859 A | 1/1989 | Zimmer |
| 4,825,754 A | 5/1989 | Devaud et al. |
| 4,946,354 A * | 8/1990 | Aubry et al. ............... 416/158 |
| 4,958,495 A * | 9/1990 | Yamaguchi ................. 60/468 |
| 5,228,844 A | 7/1993 | Klopfer et al. |
| 5,547,348 A | 8/1996 | Riley et al. |
| 5,634,777 A | 6/1997 | Albertin et al. |
| 5,655,878 A | 8/1997 | Yamakawa et al. |
| 5,722,616 A | 3/1998 | Durand |
| 6,181,034 B1 * | 1/2001 | Reichel et al. ............... 310/36 |
| 6,196,796 B1 | 3/2001 | Lozyniak et al. |
| 6,227,112 B1 * | 5/2001 | Becker ...................... 101/230 |
| 6,231,005 B1 | 5/2001 | Costes |
| 6,231,468 B1 | 5/2001 | Bajulaz |
| 6,354,536 B1 | 3/2002 | Torok et al. |
| 6,616,095 B2 | 9/2003 | Stamps et al. |
| 2002/0187041 A1 | 12/2002 | Arnold |
| 2004/0134345 A1 * | 7/2004 | Beilner et al. ............... 92/122 |
| 2006/0140781 A1 | 6/2006 | Nakata et al. |
| 2008/0010984 A1 | 1/2008 | Arbel et al. |
| 2008/0247877 A1 * | 10/2008 | Gallet ........................ 416/156 |
| 2008/0279685 A1 | 11/2008 | Kessler et al. |
| 2009/0269199 A1 | 10/2009 | Rudley et al. |
| 2010/0150719 A1 | 6/2010 | Waide et al. |
| 2012/0031087 A1 * | 2/2012 | Reynolds et al. ............. 60/429 |

FOREIGN PATENT DOCUMENTS

| | | |
|---|---|---|
| DE | 10243697 A1 * | 1/2004 |
| DE | 10257844 A1 | 7/2004 |
| FR | 893208 A * | 6/1944 |
| FR | 1242886 | 10/1960 |
| GB | 2213448 | 8/1989 |
| WO | 03098052 A1 | 11/2003 |
| WO | 2012065569 | 5/2012 |

OTHER PUBLICATIONS

European Office Action in related European Application No. 12188721.0, dated Mar. 15, 2013, 3 pages.
European Search Report in related European Application No. 13156347.0, dated Apr. 29, 2013, 6 pages.
European Search Report in related European Application No. 13156358.7, dated Apr. 29, 2013, 7 pages.
Arnold, U.T.P., Certification, Ground and Flight Testing of an Experimental IBC System for the CH-53G Helicopter, Jun. 11-13, 2002, pp. 297-307, vol. 1, AHS International, Montreal, Canada.
European Search Report in related European Application No. 12188719.4, dated Nov. 27, 2012, 9 pages.
Uwe T.P. Arnold et al., Development of an Integrated Electrical Swashplateless Primary and Individual Blade Control System, Cheeseman Award Paper invited for presentation at the American Helicopter Society International 63rd Annual Forum, May 1, 2007, pp. 1-14.
European Search Report in related European Application No. 12188721.0, dated Jan. 4, 2012, 8 pages.
Notice of Allowance in related U.S. Appl. No. 13/565,554, dated May 7, 2014, 13 pages.
Office Action in related U.S. Appl. No. 13/565,597, dated Jun. 6, 2014, 7 pages.
Extended Search Report in related European Application No. 14171889.0, dated Sep. 8, 2014 pages.
71(3) communication in related European Application No. 13156347, dated Nov. 27, 2014, 115 pages.
Requisition by the Examiner in related Canadian Application No. 2822131, dated Dec. 9, 2014, 2 pages.
Examination Search Report in related Canadian Application No. 2822131, dated Nov. 27, 2014, 1 page.
Requisition by the Examiner in related Canadian Application No. 2822073, dated Dec. 11, 2014, 3 pages.
Examination Search Report in related Canadian Application No. 2822073, dated Nov. 27, 2014, 1 page.
Requisition by the Examiner in related Canadian Application No. 2822073, dated Dec. 31, 2014, 2 pages.
Office Action in related U.S. Appl. No. 13/565,526, dated Oct. 28, 2014, 54 pages.

* cited by examiner

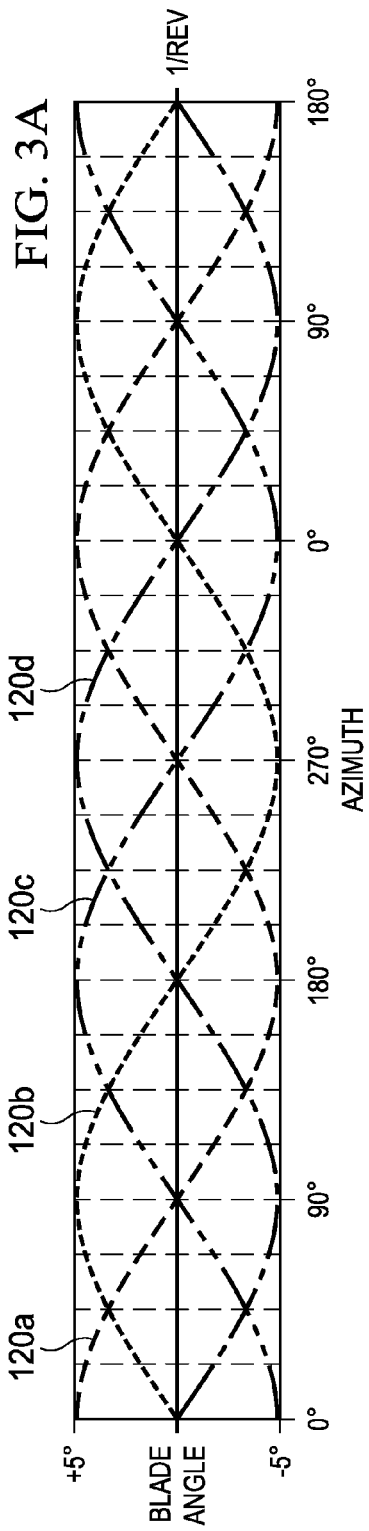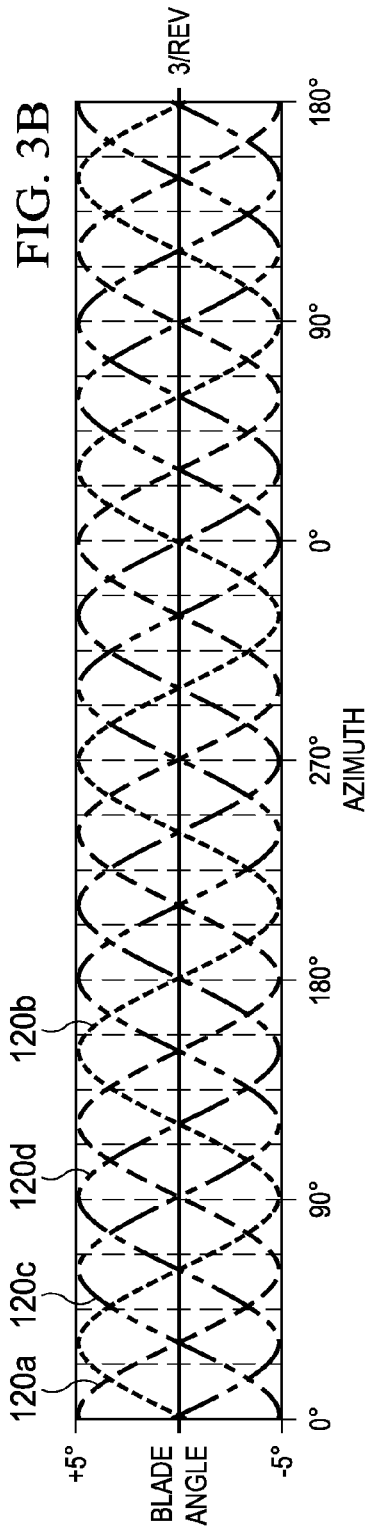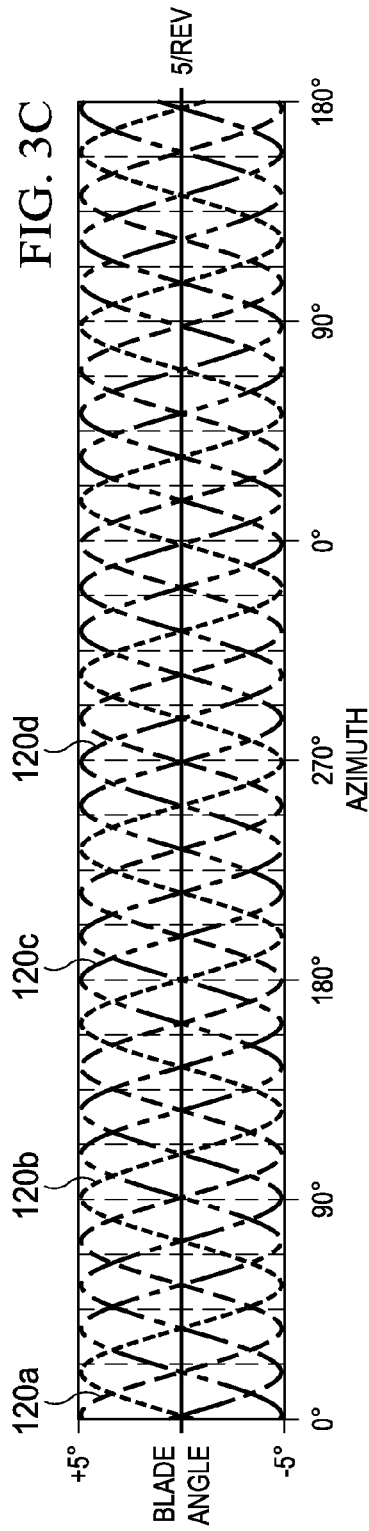

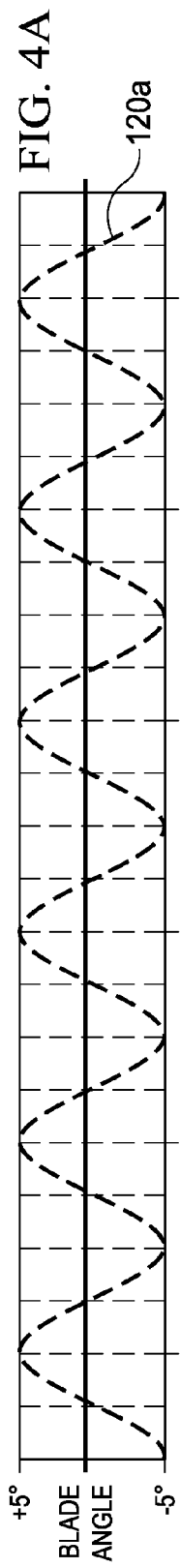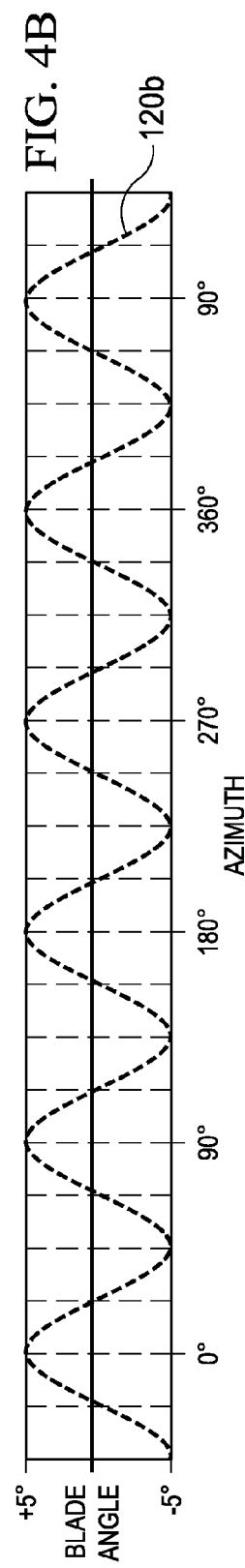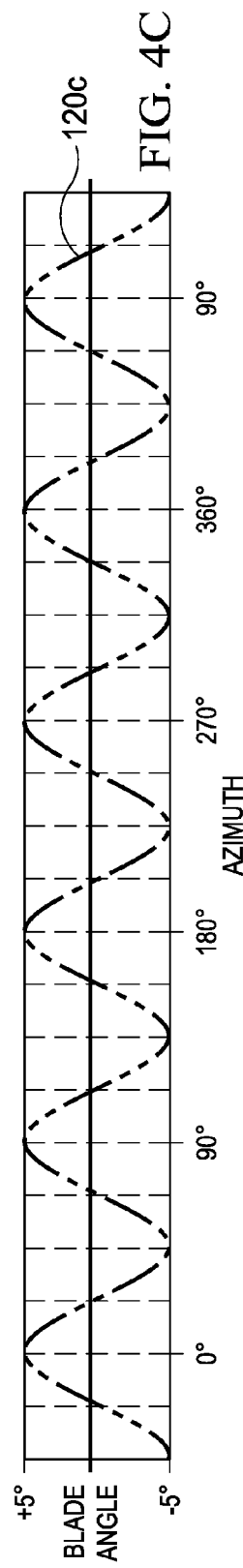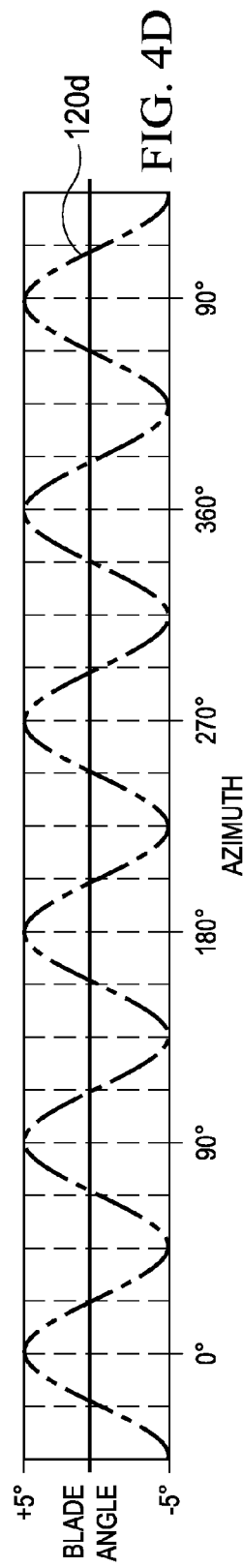

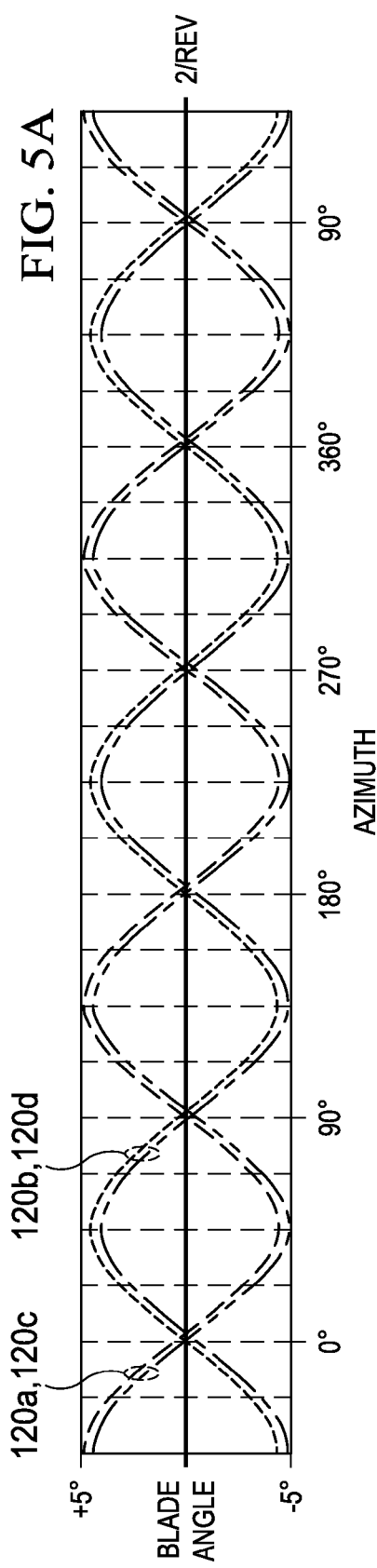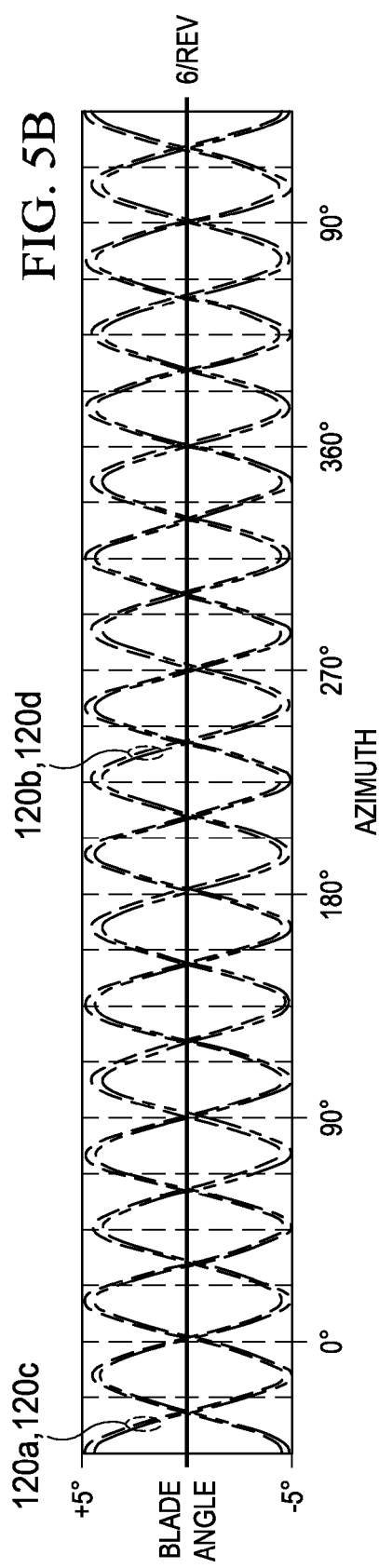

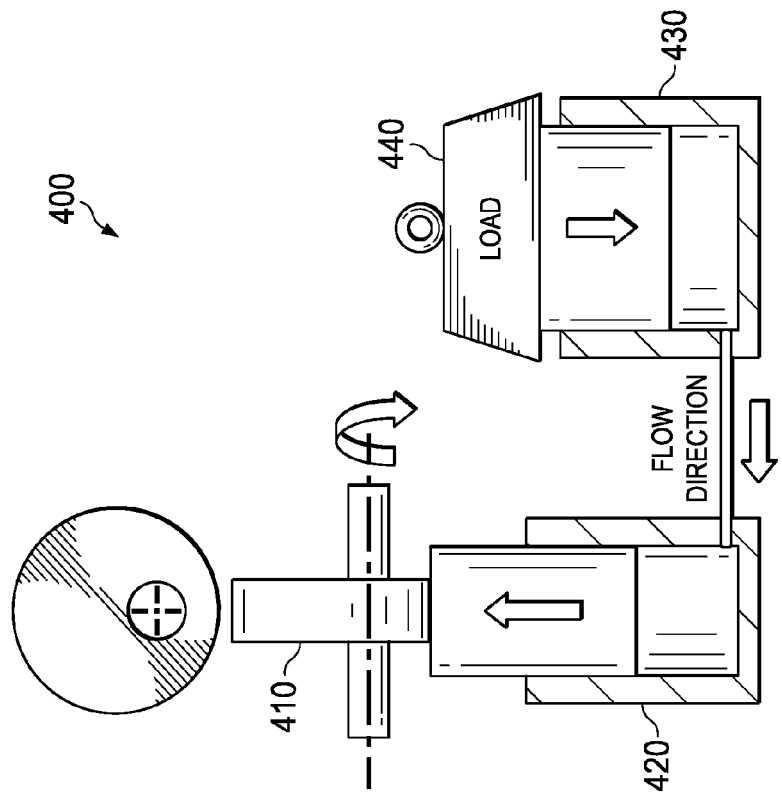
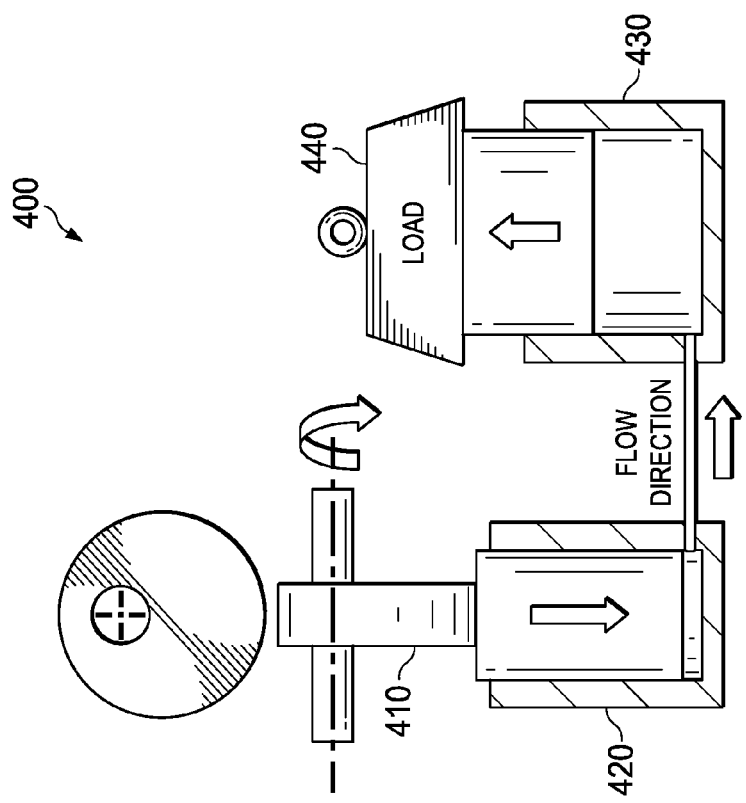

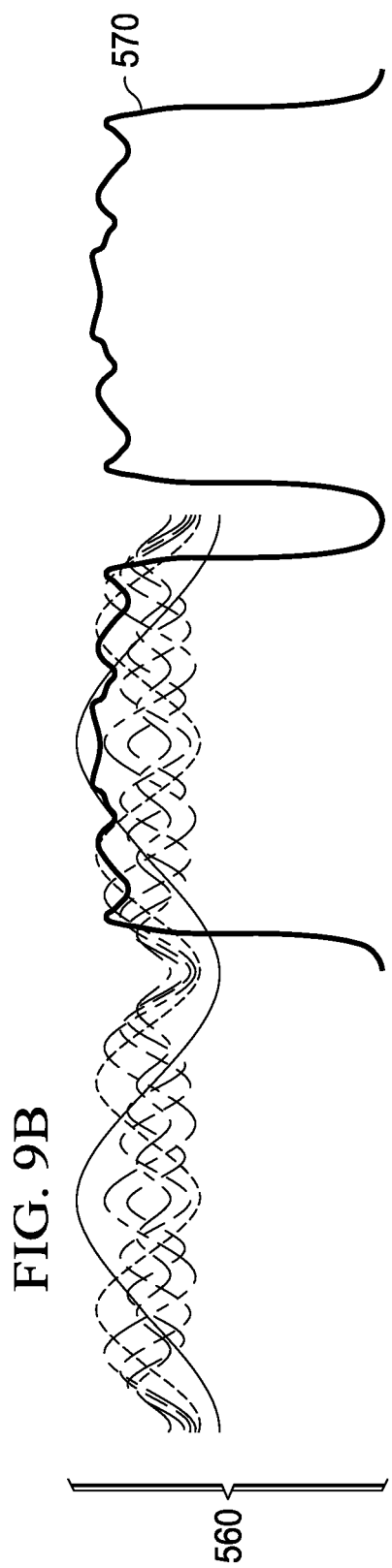

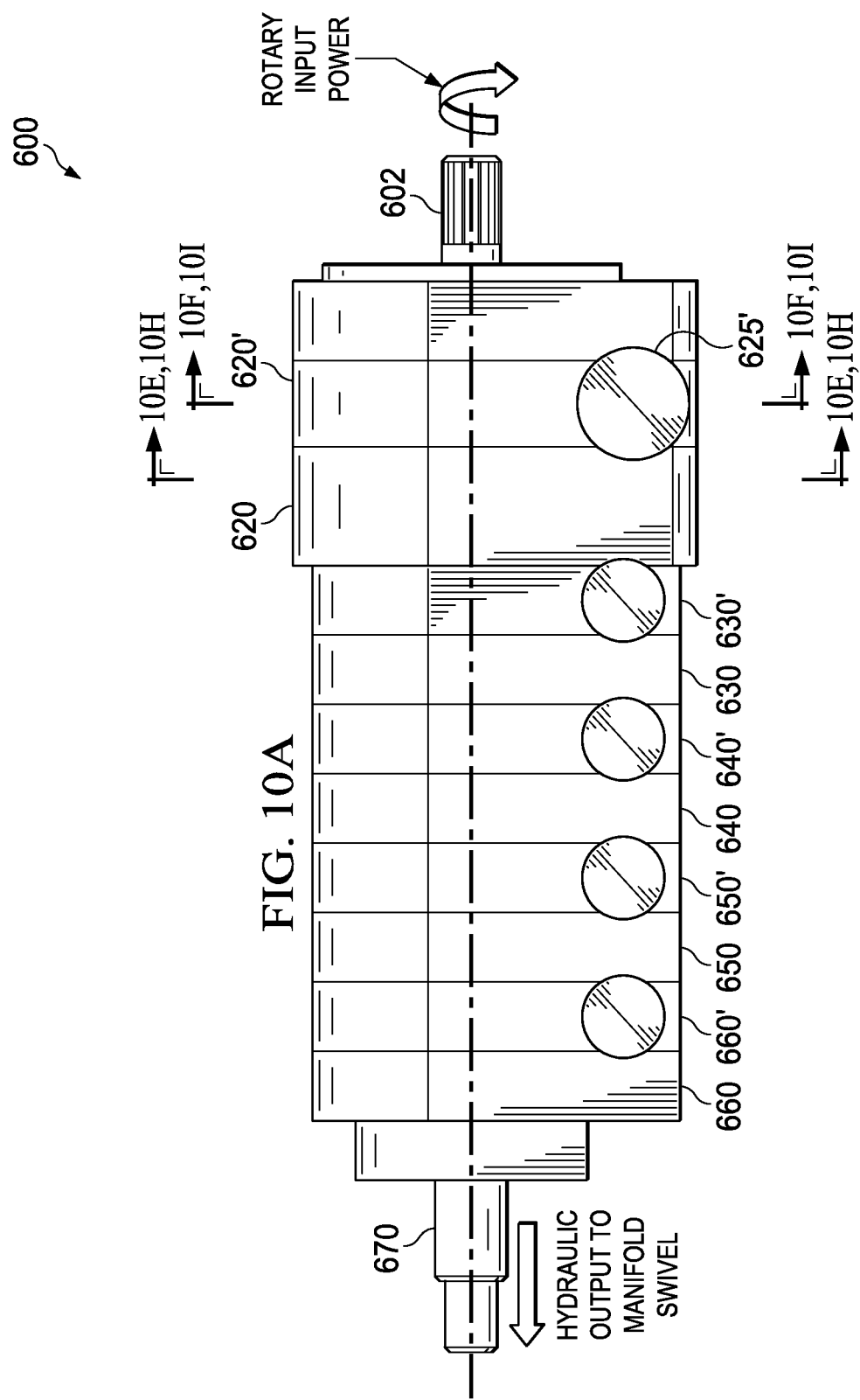

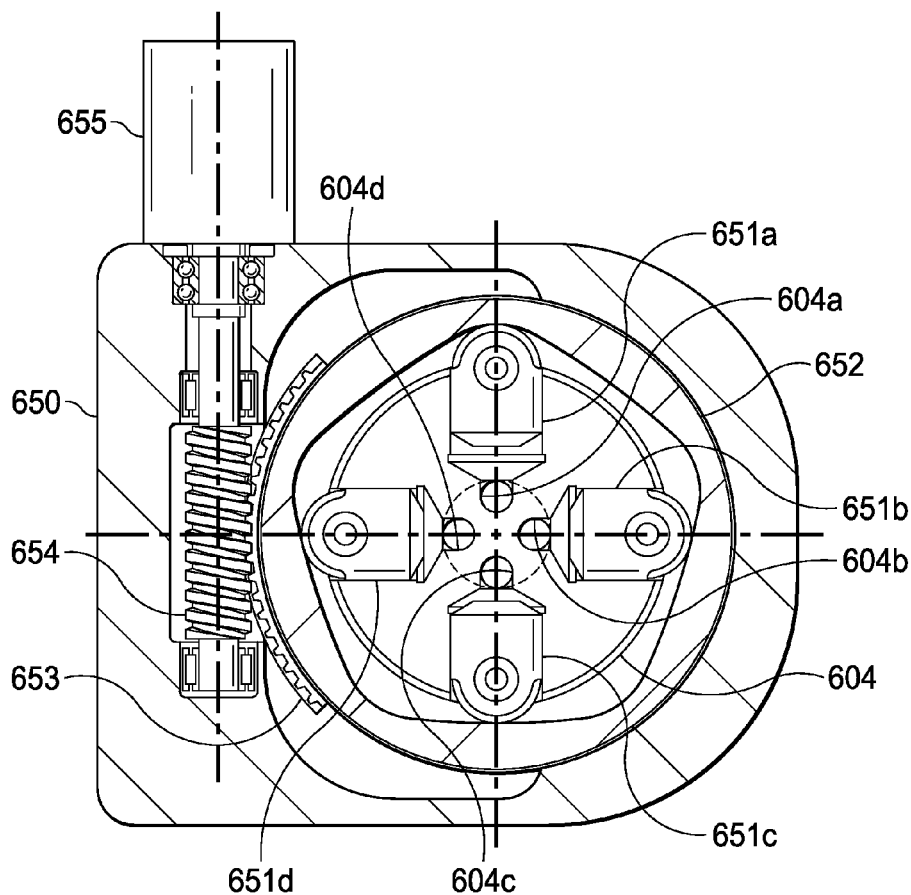
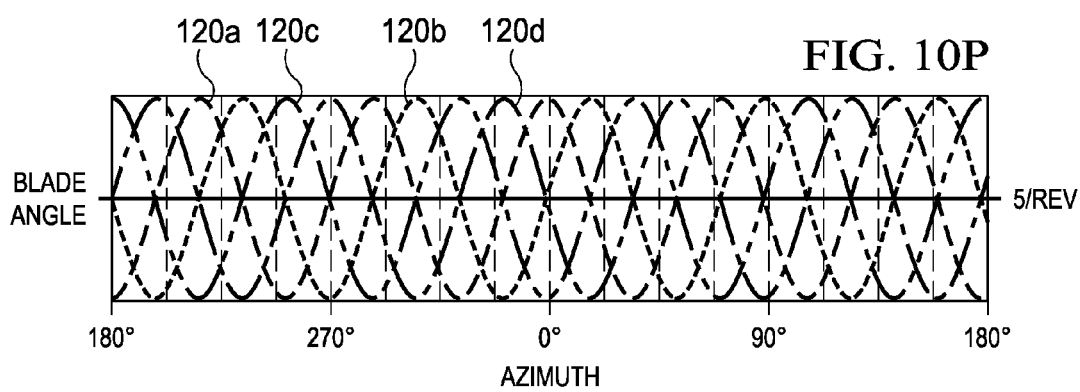

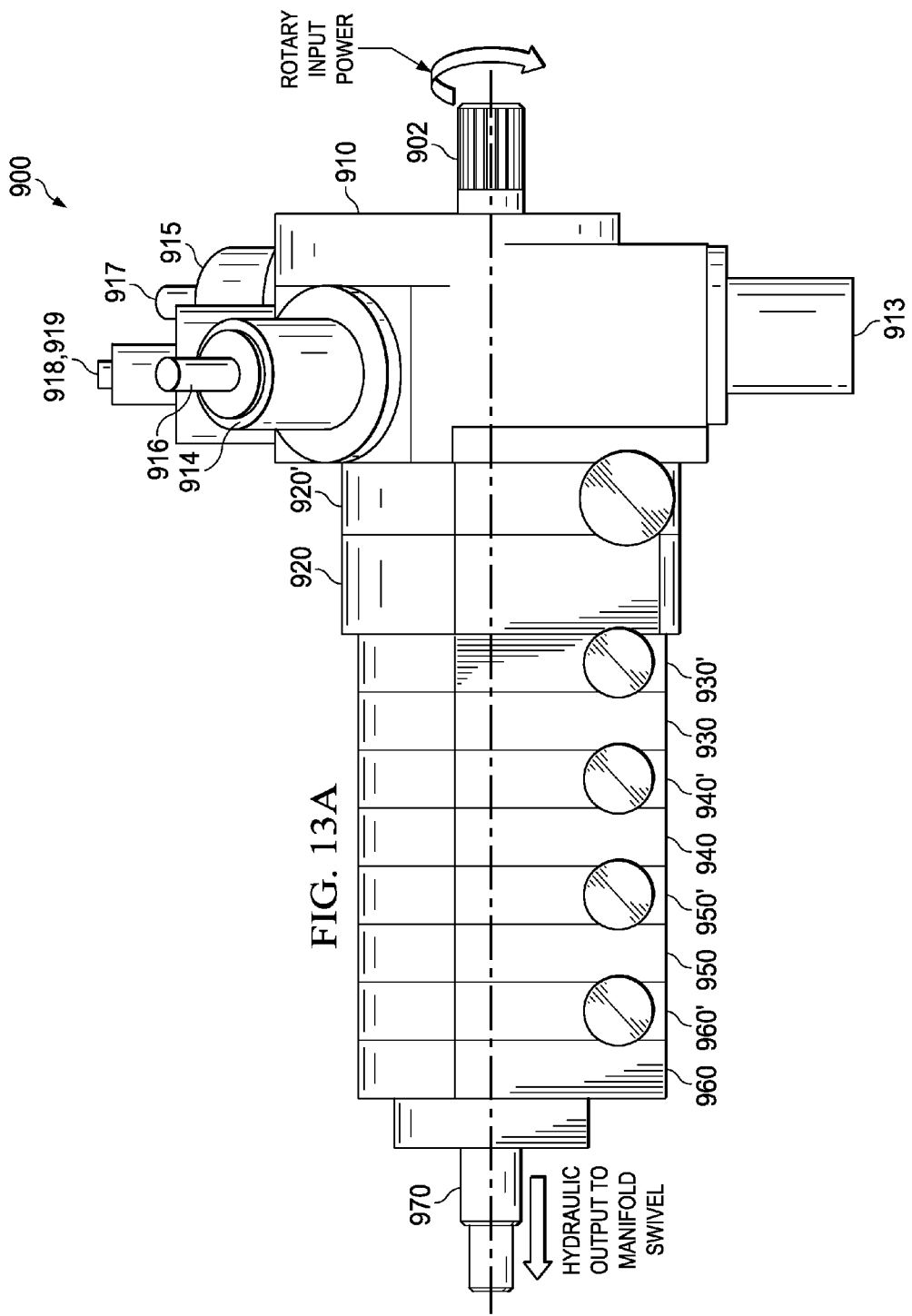

INDEPENDENT BLADE CONTROL SYSTEM WITH ROTARY BLADE ACTUATOR

TECHNICAL FIELD

This invention relates generally to rotorcraft blade control, and more particularly, to an independent blade control system with a rotary blade actuator.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more devices to rotate, deflect, and/or adjust rotor blades.

SUMMARY

Particular embodiments of the present disclosure may provide one or more technical advantages. A technical advantage of one embodiment may include the capability to implement independent blade control on a rotor system. A technical advantage of one embodiment may include the capability to provide a reliable independent blade control system without the need for redundant electrical or mechanical systems, condition monitoring systems, or secondary load paths. A technical advantage of one embodiment may include the capability to control an independent blade control system mechanically. A technical advantage of one embodiment may include the capability to conserve power in an independent blade control system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3A shows the motion of the blades of FIG. 1 for a frequency of one oscillation per revolution;

FIG. 3B shows the motion of the blades of FIG. 1 for a frequency of three oscillations per revolution;

FIG. 3C shows the motion of the blades of FIG. 1 for a frequency of five oscillations per revolution;

FIGS. 4A-4D shows the motions of the blades of FIG. 1 for a frequency of four oscillations per revolution;

FIG. 5A shows the motion of the blades of FIG. 1 for a frequency of two oscillations per revolution;

FIG. 5B shows the motion of the blades of FIG. 1 for a frequency of six oscillations per revolution;

FIGS. 8A and 8B show yet another example hydraulic actuation system;

FIG. 9B shows the sum of each sinusoidal oscillation pattern generated by the example hydraulic actuation system of FIG. 9A;

FIGS. 13A-13K and 13M show a radial fluid device and the frequencies of Blade motions produced during operation of the radial fluid device according to another example embodiment;

DETAILED DESCRIPTION OF THE DRAWINGS

Rotor Systems

Figure 1:
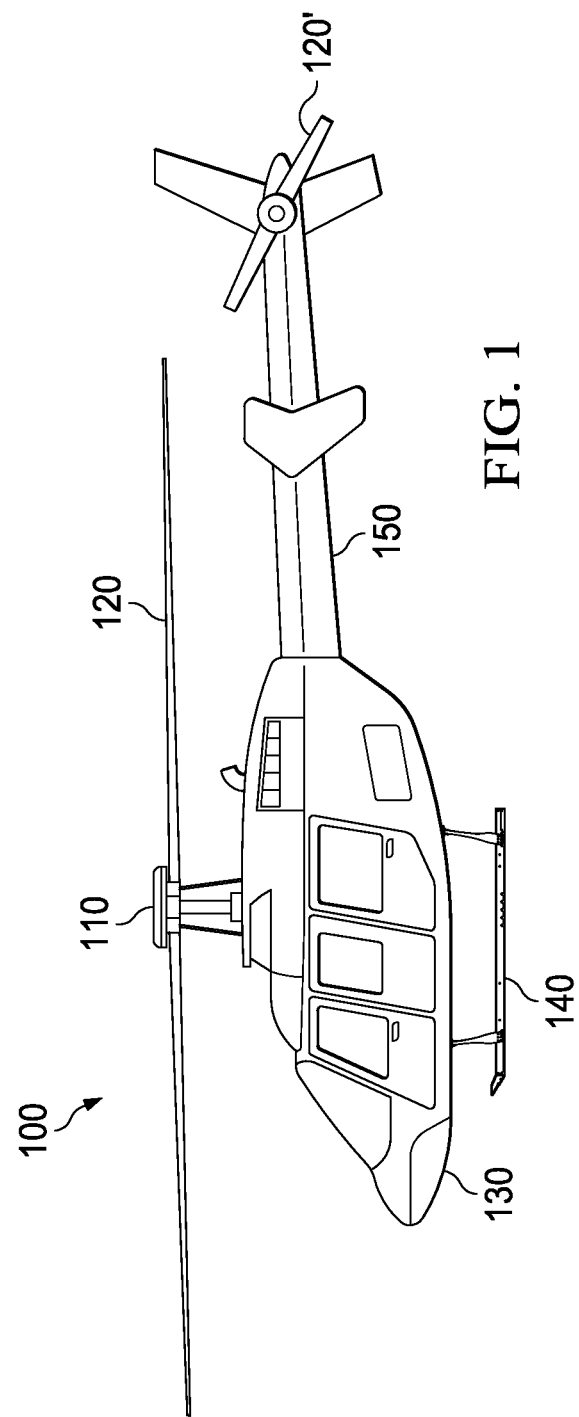
FIG. 1 shows a rotorcraft according to one example configuration.

FIG. 1 shows a rotorcraft 100 according to one example configuration. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
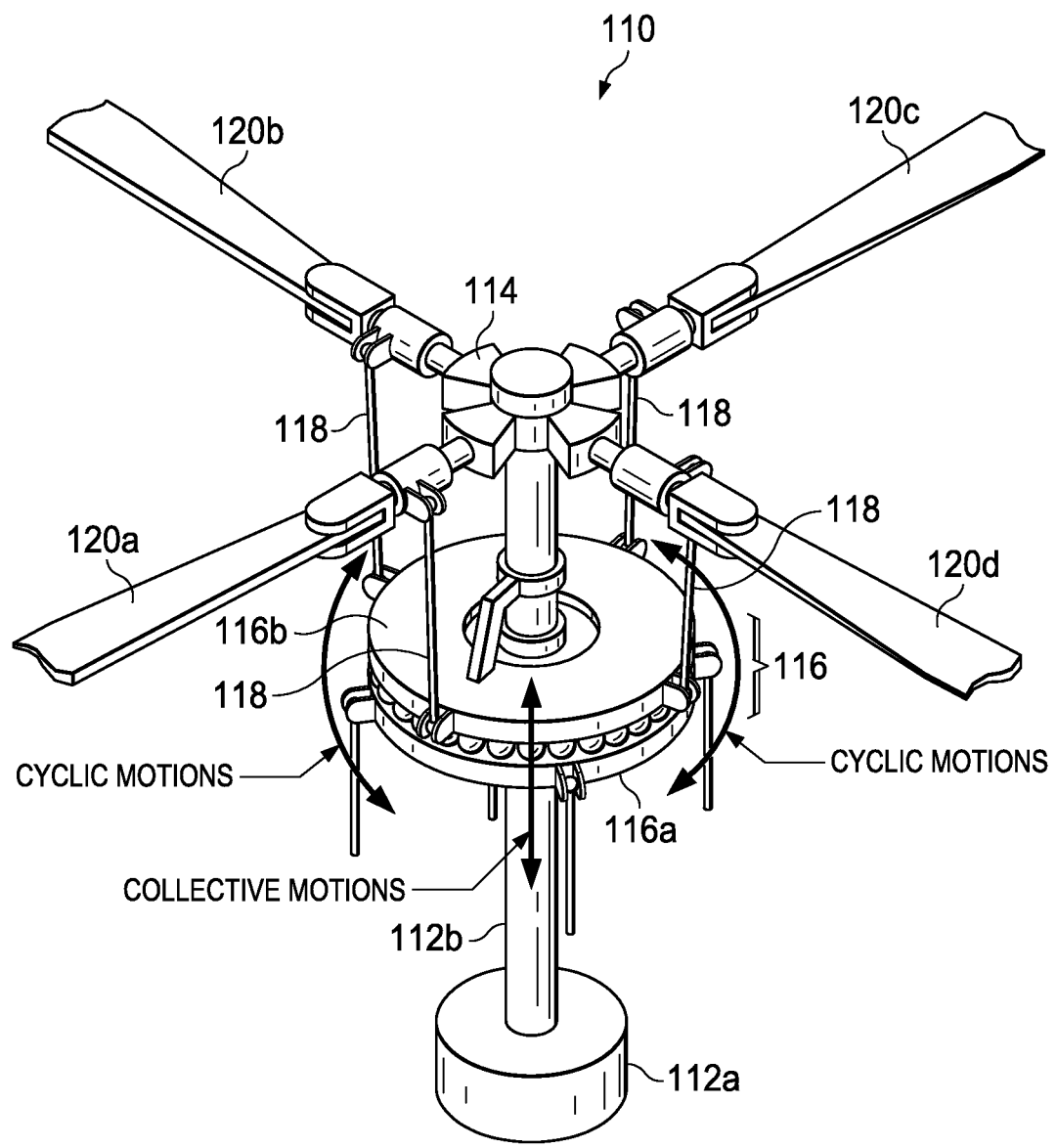
FIG. 2 shows the rotor system and blades 120 of FIG. 1 according to one example configuration.

FIG. 2 shows rotor system 110 and blades 120 of FIG. 1 according to one example configuration. In the example configuration of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

Independent Blade Control

Independent blade control (IBC) may refer to the ability to control motion of individual rotor system blades, such as blades 120a-120d. For example, IBC may provide the ability to control harmonic motions of individual blades as the individual blades rotate. For discussion purposes, harmonic blade motions may be separated into three categories: harmonic cyclic motions, harmonic collective motions, and reactionless motions. These three categories do not define any particular mechanization to drive the blades. Rather, these categories may be defined by the characteristics of their oscillatory blade motions.

Harmonic cyclic motions may represent rotor blade sinusoidal motions similar to those that can be generated by application of oscillatory swashplate tilting inputs to the non-rotating half of the swashplate. In the example of FIG. 2, harmonic cyclic motions may be similar to the application of tilting inputs to non-rotating swashplate ring 116a.

The frequency of harmonic cyclic motions may be expressed as specific multiple integers of rotor revolution frequency (e.g., revolutions per minute, or RPM). On a four-bladed rotor system such as rotor system 110, the frequencies of harmonic cyclic oscillations are odd integer values (e.g., one blade oscillation per revolution, 3/rev, 5/rev, 7/rev, etc.).

FIGS. 3A-3C show the motions of blades 120a-120d for frequencies of one, three, and five blade oscillations per revolution. FIG. 3A shows the motion of blades 120a-120d for a frequency of one oscillation per revolution. One blade oscillation per revolution may be accomplished, for example, by maintaining non-rotating swashplate ring 116a in a fixed, tilted position. FIG. 3B shows the motion of blades 120a-120d for a frequency of three oscillations per revolution. FIG. 3C shows the motion of blades 120a-120d for a frequency of five oscillations per revolution.

Harmonic collective motions move all blades sinusoidally in phase with each other. In the example of FIG. 2, harmonic collective motions may be similar to the application of axial inputs to non-rotating swashplate ring 116a.

The frequency of harmonic collective motions may be expressed as specific multiple integers of rotor revolution frequency (e.g., RPM). In particular, the frequency of harmonic collective motions may be expressed as multiples of the number of blades on the rotor. On a four-bladed rotor system such as rotor system 110, the frequencies of harmonic collective oscillations are 4/rev, 8/rev, etc. FIGS. 4A-4D shows the motions of blades 120a-120d for a frequency of 4/rev. As shown in FIGS. 4A-4D, blades 120a-120d move uniformly sinusoidally in phase with each other.

Unlike harmonic cyclic and collective motions, reactionless motions cannot be replicated by or analogized to swashplate motions. For a four-bladed rotor system, the frequencies of reactionless motions are 2/rev and 6/rev, which cannot be achieved using the rotor system 110 of FIG. 2. Oscillation frequencies of 2/rev and 6/rev for a four-bladed rotor system results in adjacent blades having a 180 degree phase lag and opposite blades being in phase with each other. FIG. 5A shows the motions of blades 120a-120d for a frequency of 2/rev, and FIG. 5B shows the motions of blades 120a-120d for a frequency of 6/rev. Teachings of certain embodiments recognize that implementing reactionless controls may increase rotor system efficiency as well as reduce noise and vibration.

Thus, IBC may represent the ability to move rotor blades unconstrained from the cyclic and collective kinematic motion limitations imposed by conventional swashplate controls. Although IBC is not a prerequisite to implement cyclic and collective controls, it is a prerequisite to implement reactionless controls.

Teachings of certain embodiments recognize the ability to implement IBC on a rotor system. For discussion purposes, IBC systems may be separated into two categories: partial authority and full authority. Partial-authority IBC systems sum their higher harmonic and reactionless control motions with a swashplate providing fundamental blade motion for cyclic and collective control. Full-authority IBC systems provide for independent blade control through the full range of cyclic and collective motion. In some circumstances, partial-authority IBC systems may be preferable because the total summed amplitudes of higher harmonic and reactionless motions are typically a relatively small percentage of the total blade travel required for cyclic and collective control. Therefore, the failure mode effects of partial-authority IBC actuators are not as critical as with full-authority systems, allowing for lesser levels of reliability and redundancy. Full-authority IBC systems, on the other hand, may be preferable because they can allow for the elimination of the swashplate and thus elimination of certain drag and weight penalties.

Hydraulic Systems

Figure 6A:
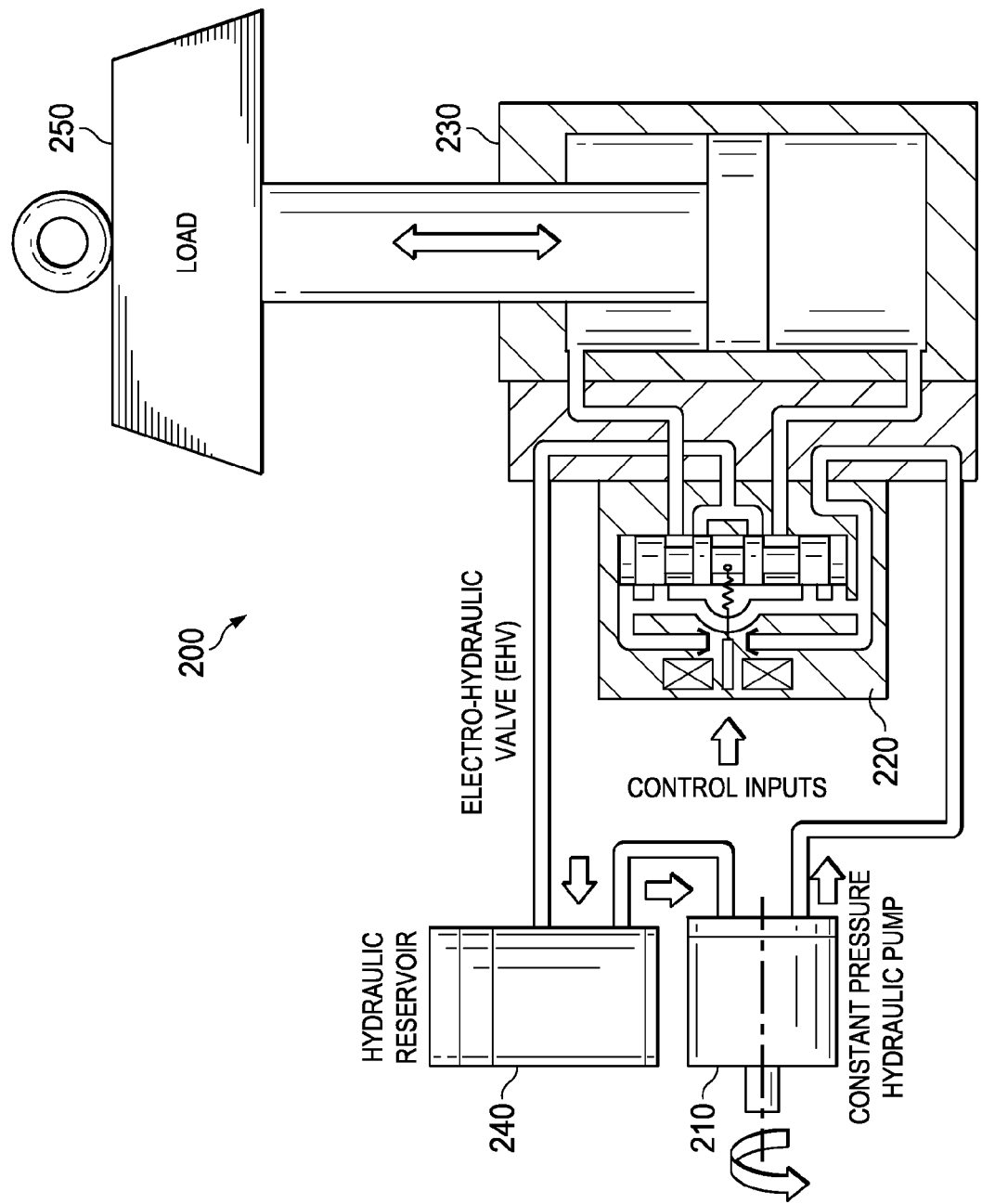
FIGS. 6A and 6B show an example hydraulic actuation system.
Figure 6B:
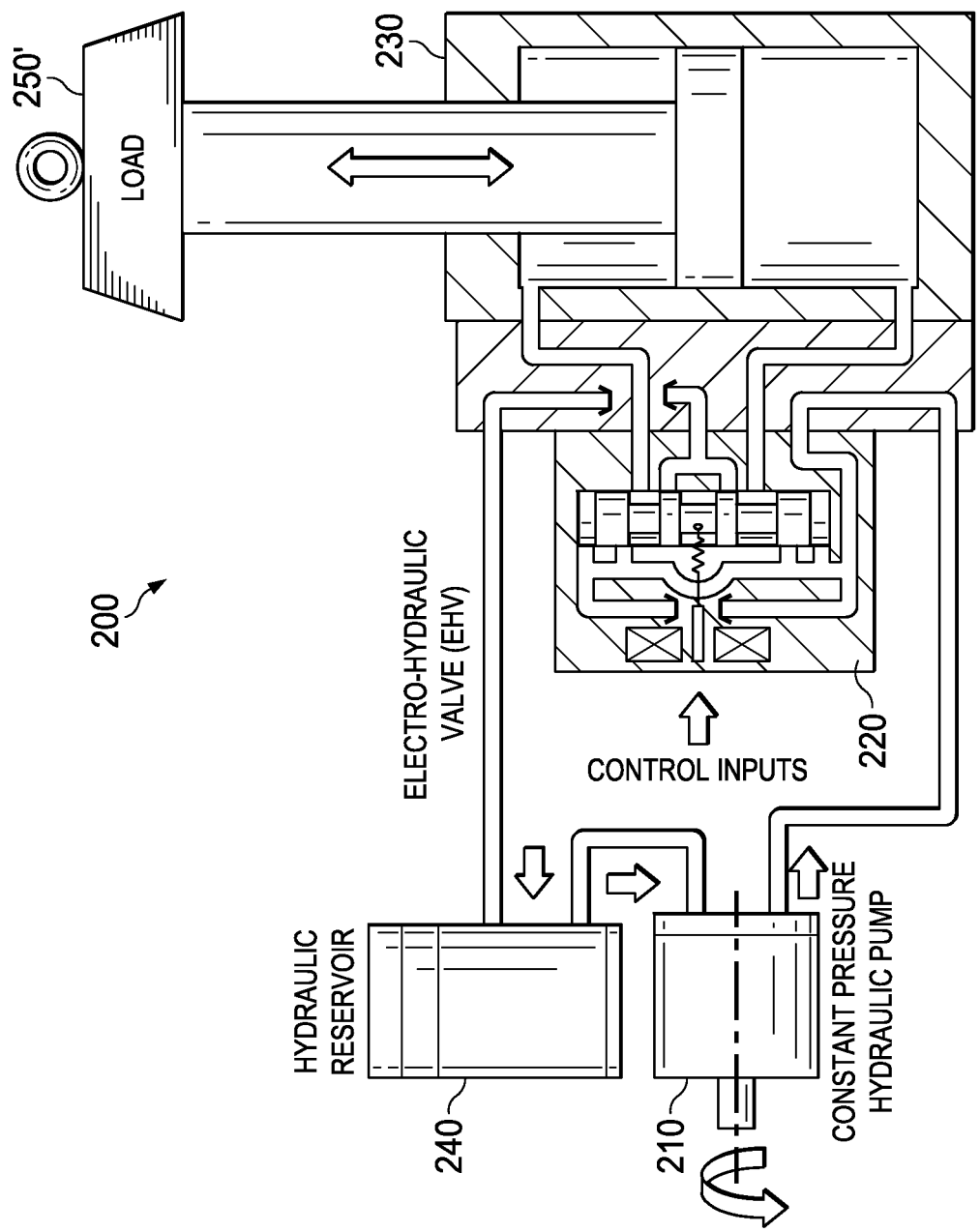

Teachings of certain embodiments recognize the ability to implement IBC by hydraulically actuating the position of each rotor blade. FIGS. 6A and 6B show an example hydraulic actuation system 200. Hydraulic actuation system 200 features a pump 210, control valves 220 (e.g., electro-hydraulic valves), an actuator 230, and a reservoir 240. In operation, pump 210 provides hydraulic fluid to control valves 220, which either provides into or releases fluid out of actuator 230. Changing the volume of fluid in actuator 230 allows hydraulic actuation system 200 to either raise or lower load 250. Control valves 220 may pass hydraulic fluid to reservoir 240, which may provide hydraulic fluid to pump 210, as needed.

In the example of FIGS. 6A and 6B, hydraulic actuation system 200 is a constant-pressure system in that pump 210 provides a constant pressure of hydraulic fluid. In a constant-pressure hydraulic system, the power expended to move the actuator is independent of the applied load on the actuator because power is a function of product flow and system pressure.

Maximum actuator rate capacity is achieved when control valves 220 are commanded to their maximum orifice size, which is also the maximum operating efficiency condition of hydraulic actuation system 200. Thus, the maximum operating efficiency condition occurs when load 250 is largest, as shown in FIG. 6A.

When less than maximum actuator rate is required (such as when load 250' is smaller, as shown in FIG. 6B), control valves 220 throttle down flow by reducing the orifice size and converting the unused power into waste heat. Power is converted to even more waste heat when commanding control valves 220 to move actuator 230 at less than maximum rate in the same direction as an aiding load. In addition to the power wasted throttling down the hydraulic flow going into actuator 230, hydraulic fluid being pushed out the actuator 230 is also throttled by control valves 220 squandering potentially regenerative power and converting it into heat waste.

Adding a second set of actuators 230 for increased system reliability may magnify this power waste more than a simple factor of two. For redundancy, each control valve 220 would be independently capable of providing required power. This suggests that, when operating together, they both waste more than half the power they consume. Therefore the power wasted by adding a second set of control valves 220 may increase the power wasted and the heat generated by a factor of four.

Figure 7A:
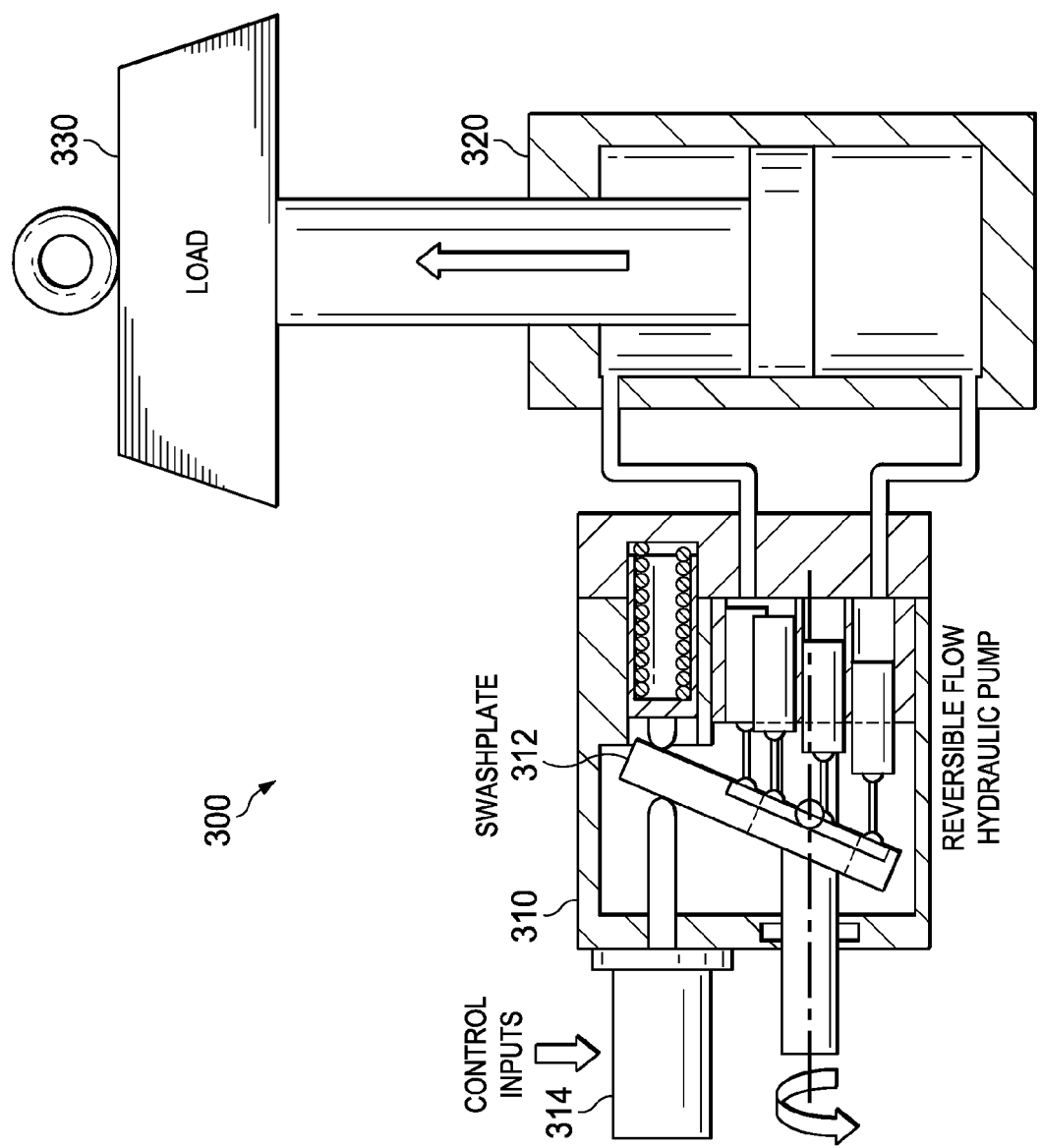
FIGS. 7A and 7B show another example hydraulic actuation.
Figure 7B:
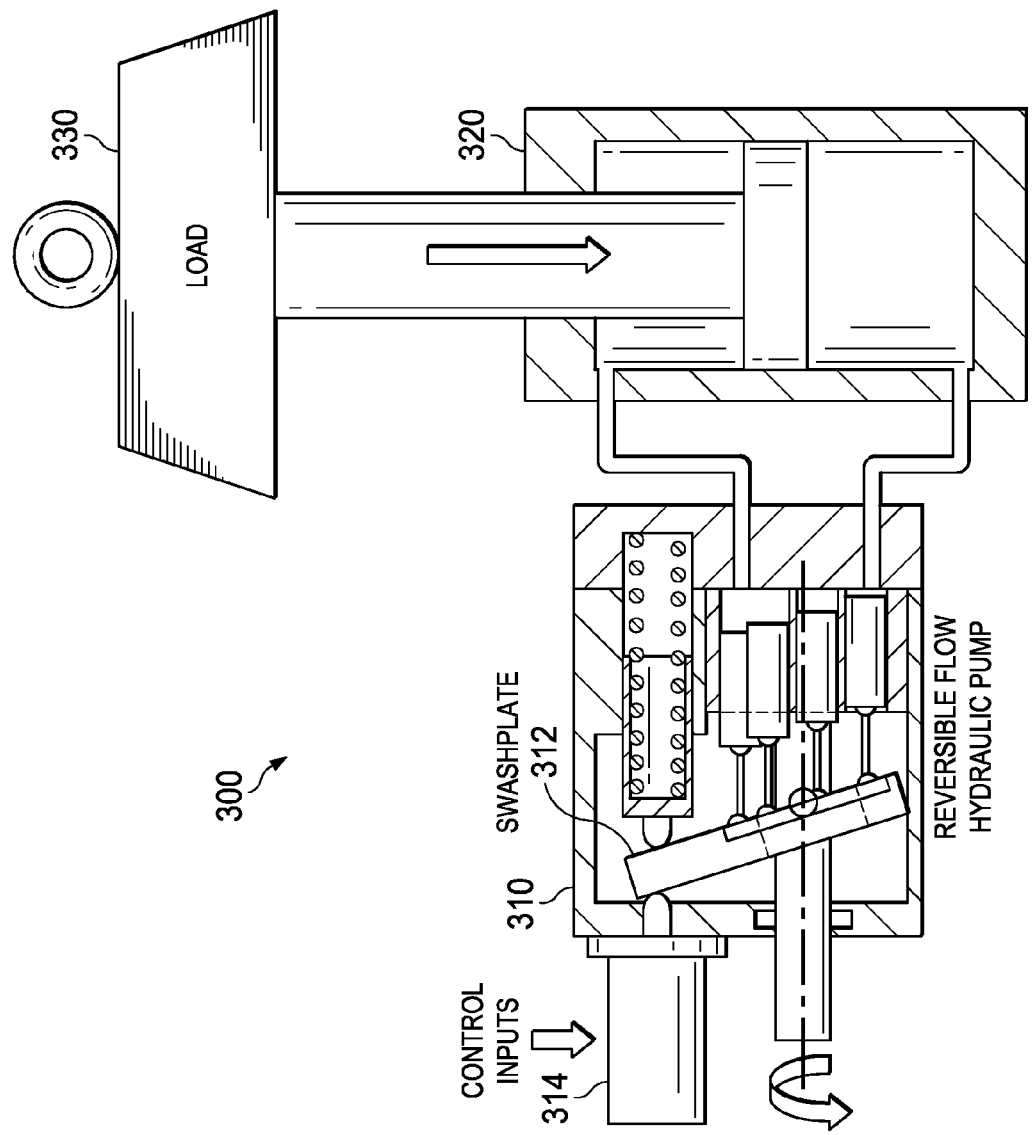

By regulating the volume of fluid going in and out of a hydraulic actuator without throttling down flow, control valve power losses and the resulting waste heat generation may be reduced or eliminated. FIGS. 7A and 7B show an example hydraulic actuation system 300. Hydraulic actuation system 300 features a pump 310 and an actuator 320. Pump 310 is a reversible-flow hydraulic pump featuring a swashplate 312 that may be adjusted by control inputs 314. In operation, pump 310 may move a load 330 by changing the position of swashplate 312, which allows fluid to flow between the chambers of actuator 320. Thus, swashplate 312 may provide control over both displacement and flow direction.

Unlike hydraulic actuation system 200, hydraulic actuation system 300 may provide control of actuator position without the throttling power loss. However, application of this technology to IBC may be impractical due to performance, system complexity, weight, and control issues. In particular, the high relative inertia of swashplate 312 may not be able to provide the frequency response required for IBC. In addition, a four-bladed rotor with dual redundancy would require a system of at least eight pumps total because each actuator requires a dedicated pump for control.

Thus, although the power density and jam resistance of hydraulic actuation may make hydraulic actuation suitable for application to IBC, efficiency and inertia issues may make some hydraulic actuation systems impracticable. Teachings of certain embodiments, however, recognize the capability to actuate loads in an IBC system without the wasted energy associated with hydraulic actuation system 200 or the high inertia problems associated with hydraulic actuation system 300. In particular, teachings of certain embodiments recognize the capability to efficiently and effectively actuate loads in an IBC system through the use of mechanically-programmed cams.

FIGS. 8A and 8B show a hydraulic actuation system 400 according to one example embodiment. Hydraulic actuation system 400 features a cam 410 and piston assemblies 420 and 430. Unlike hydraulic actuation system 200, hydraulic actuation system 400 does not feature any control valves to limit flow volume. Rather, piston assemblies 420 and 430 are ported directly to one another. Thus, hydraulic actuation system 400 may not suffer from the energy losses associated with hydraulic actuation system 200. In addition, unlike hydraulic actuation system 300, hydraulic actuation system 400 does not feature a swashplate and thus may not be subject to the inertia problems associated with hydraulic actuation system 300.

In operation, as shown in FIG. 8A, cam 410 pushes down the piston of piston assembly 420, which forces fluid into piston assembly 430, thus raising load 440. To lower load 440, as shown in FIG. 8B, cam 410 allows the piston of piston assembly 420 to pull up, which allows fluid to flow out of piston assembly 430, thus lowering load 440. Disregarding friction losses, raising or lowering load 440 may be 100% efficient regardless of the size of load 440.

Figure 8C:
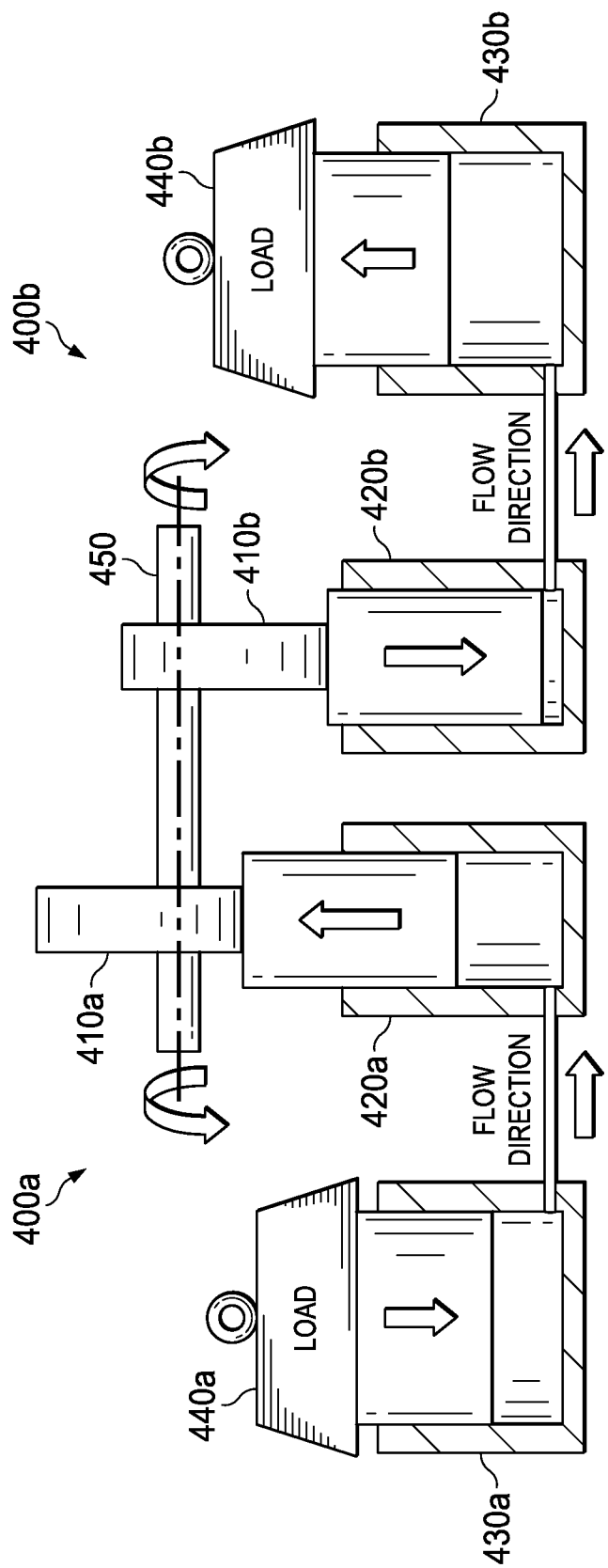
FIG. 8C and 8D show an example hydraulic actuation system having two cams.
Figure 8D:
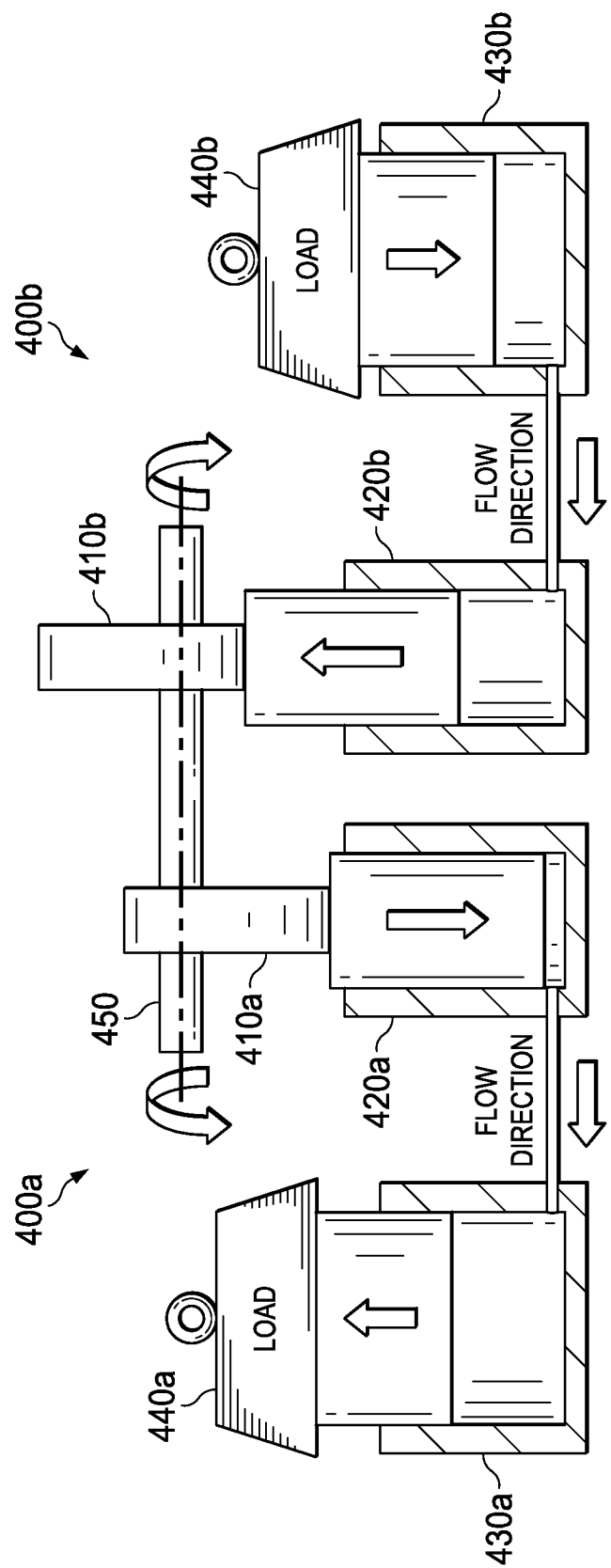

Teachings of certain embodiments recognize the ability to reduce the power required to move a cam 410 by balancing loads between two cams 410, as shown in FIGS. 8C and 8D. In this example, a cam shaft 450 joins two cams 410 together at 180 degrees out of phase. Disregarding leakage and friction losses, the sinusoidal raising and lowering of the cylinder loads would require no additional energy to sustain motion once a constant speed of cam shaft 450 is achieved.

In addition, teachings of certain embodiments recognize the capability to program sinusoidal motion of a load by providing multiple cams of different shapes. As explained above with regard to the different categories of IBC motions, IBC motions may be expressed as specific integers of rotor revolutions (e.g., for a four-blade rotor system, 1 oscillation per revolution for cyclic motion, 2/rev for reactionless motion, 3/rev for cyclic motion, 4/rev for collective motion, 5/rev for cyclic motion, 6/rev for reactionless motion, etc.). Teachings of certain embodiments recognize the ability to program sinusoidal motion by providing a cam for each oscillation frequency and then hydraulically summing the outputs.

Figure 9A:
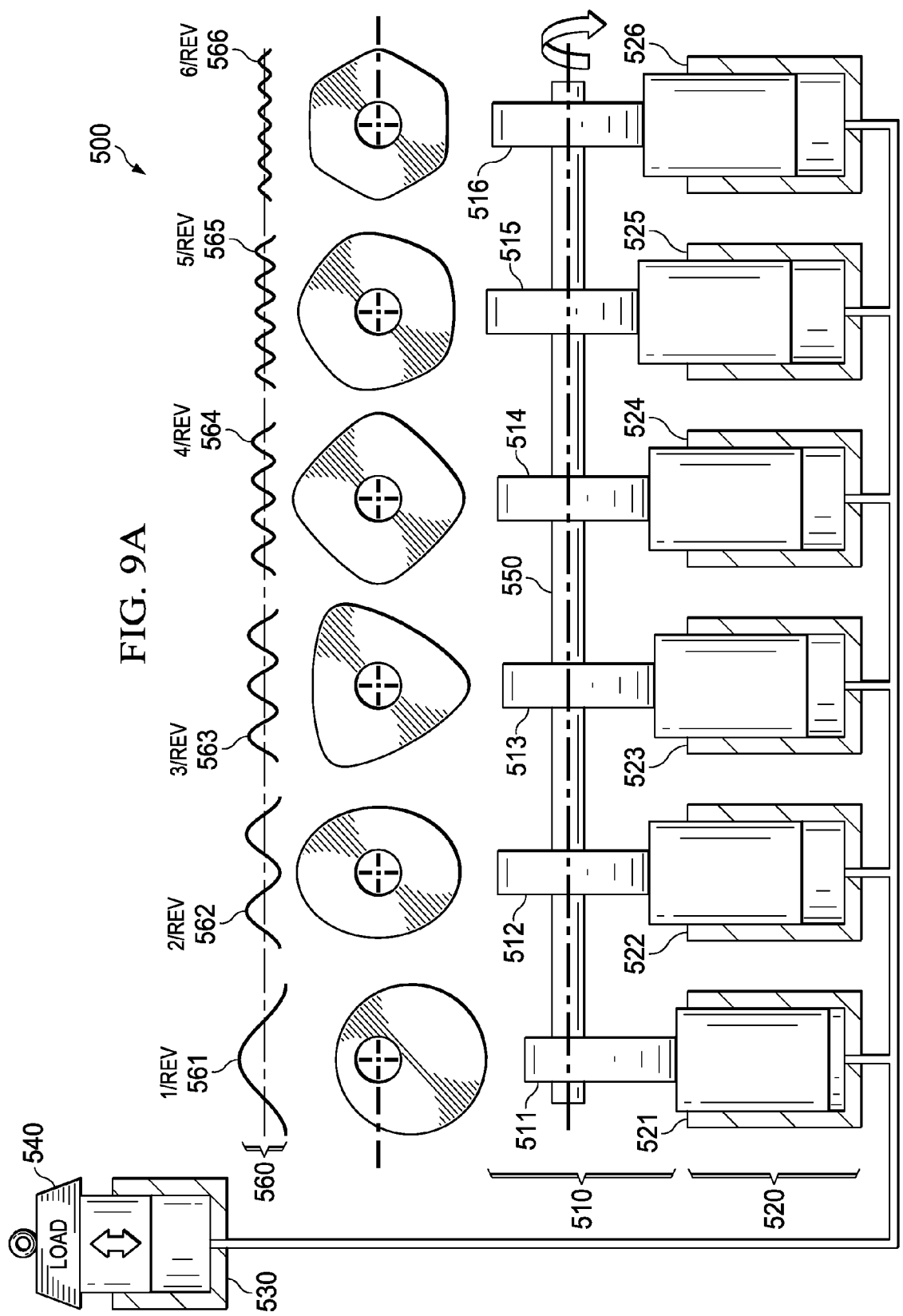
FIG. 9A shows yet another example hydraulic actuation system according to one embodiment.

FIG. 9A shows a hydraulic actuation system 500 according to one example embodiment. Hydraulic actuation system 500 features a cam assembly 510, piston assemblies 520, and an actuator 530 operable to move a load 540. Each cam of cam assembly 510 is operable to oscillate a corresponding piston of piston assemblies 520 according to the sinusoidal oscillation patterns 560 shown in FIG. 9A.

In the example of FIG. 9A, cam assembly features six cams 511-516 coupled to a cam shaft 550. Each cam 511-516 corresponds to a different oscillation frequency. Cam 511, for example, is a single-lobed cam that oscillates piston 521 once per revolution of cam shaft 550, as shown by sinusoidal oscillation pattern 561. Cam 512 is a two-lobed cam that oscillates piston 522 twice per revolution of cam shaft 550, as shown by sinusoidal oscillation pattern 562. Cam 513 is a three-lobed cam that oscillates piston 523 three times per revolution of cam shaft 550, as shown by sinusoidal oscillation pattern 563. Cam 514 is a four-lobed cam that oscillates piston 524 four times per revolution of cam shaft 550, as shown by sinusoidal oscillation pattern 564. Cam 515 is a five-lobed cam that oscillates piston 525 five times per revolution of cam shaft 550, as shown by sinusoidal oscillation pattern 565. Cam 516 is a six-lobed cam that oscillates piston 526 six times per revolution of cam shaft 550, as shown by sinusoidal oscillation pattern 566.

A precise waveform may be generated by hydraulically summing the outputs from each piston assembly 520. For example, FIG. 9B shows the sum of each sinusoidal oscillation pattern 560. As shown in FIG. 9B, the sum of each sinusoidal oscillation pattern 560 may result in a summed oscillation pattern 570 that is not sinusoidal.

With these concepts in mind, teachings of certain embodiments recognize the capability to implement IBC on a rotor system, as discussed in greater detail below.

Partial-Authority IBC

Figure 10B:
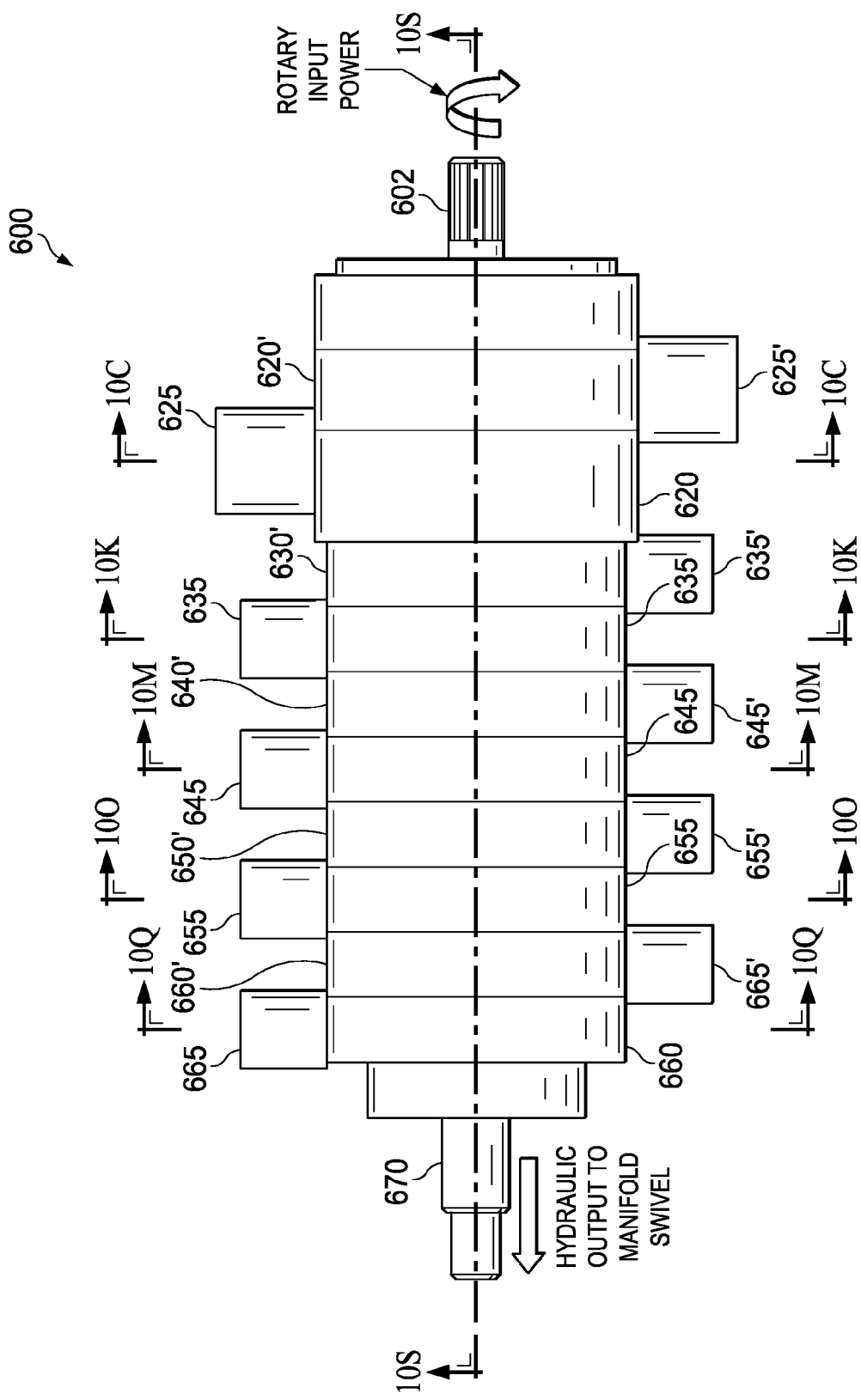
FIGS. 10A-10S show a radial fluid device and the frequencies of blade motions produced during operation of the radial fluid device according to one example embodiment.
Figure 10C:
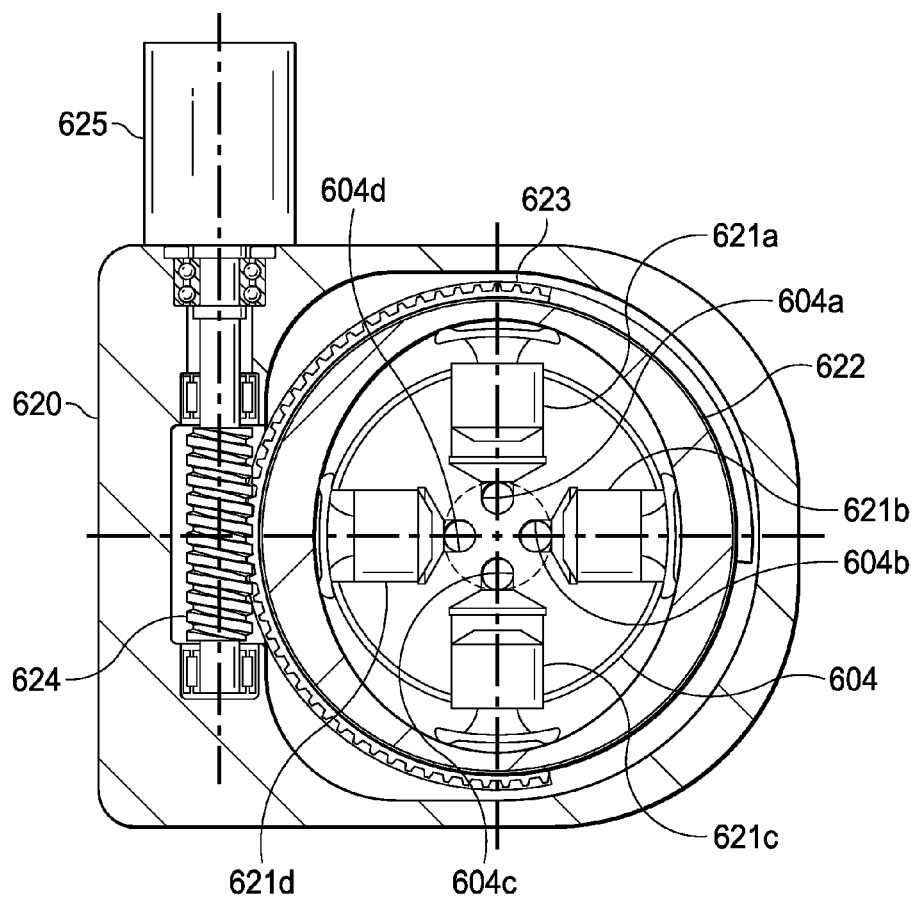
Figure 10D:
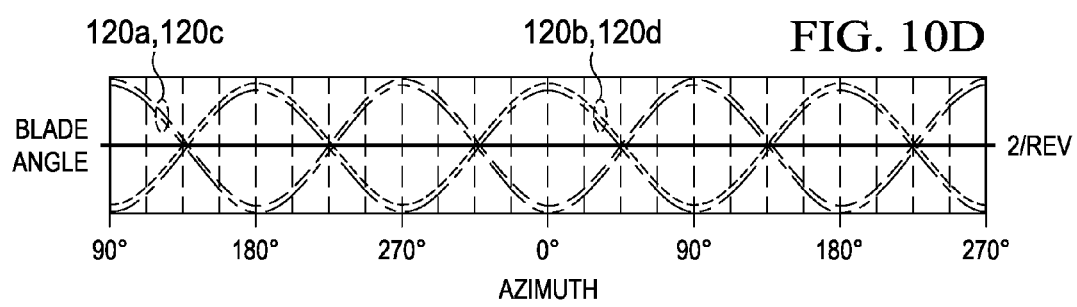
Figure 10E:
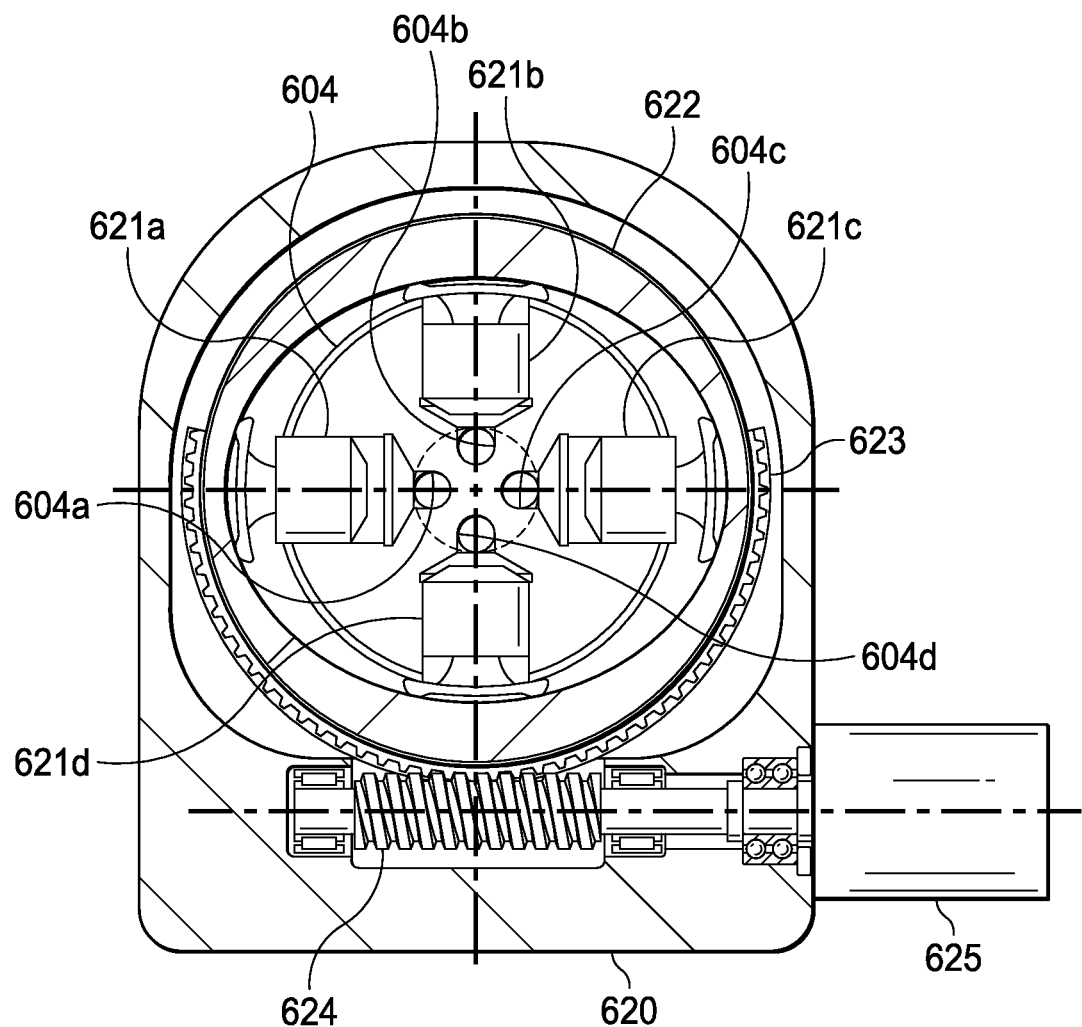
Figure 10F:
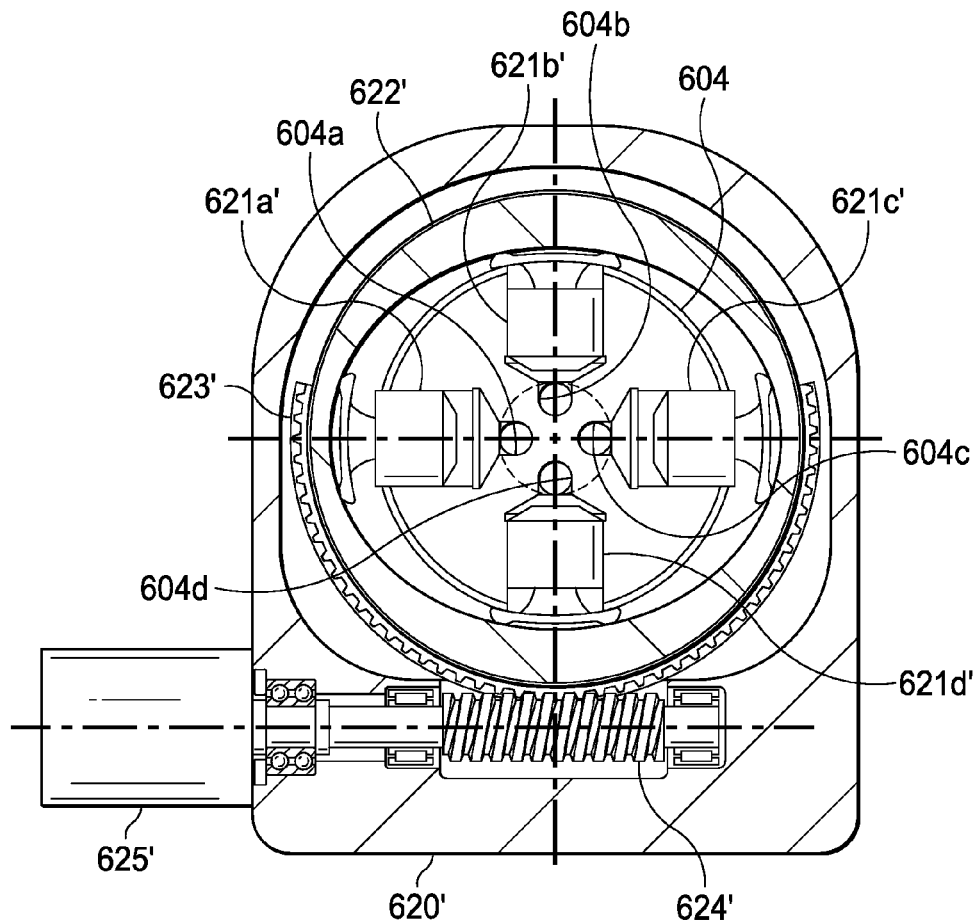
Figure 10G:
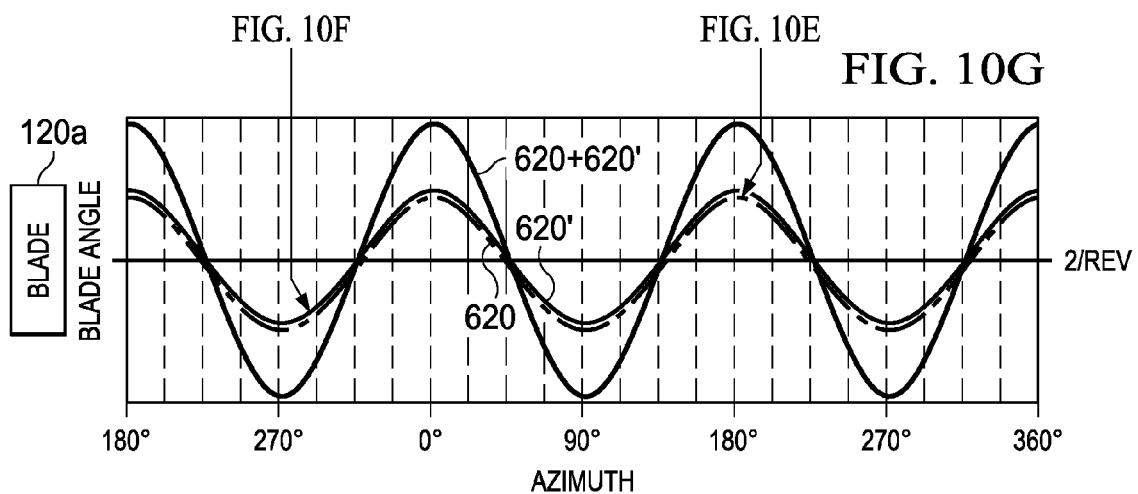
Figure 10H:
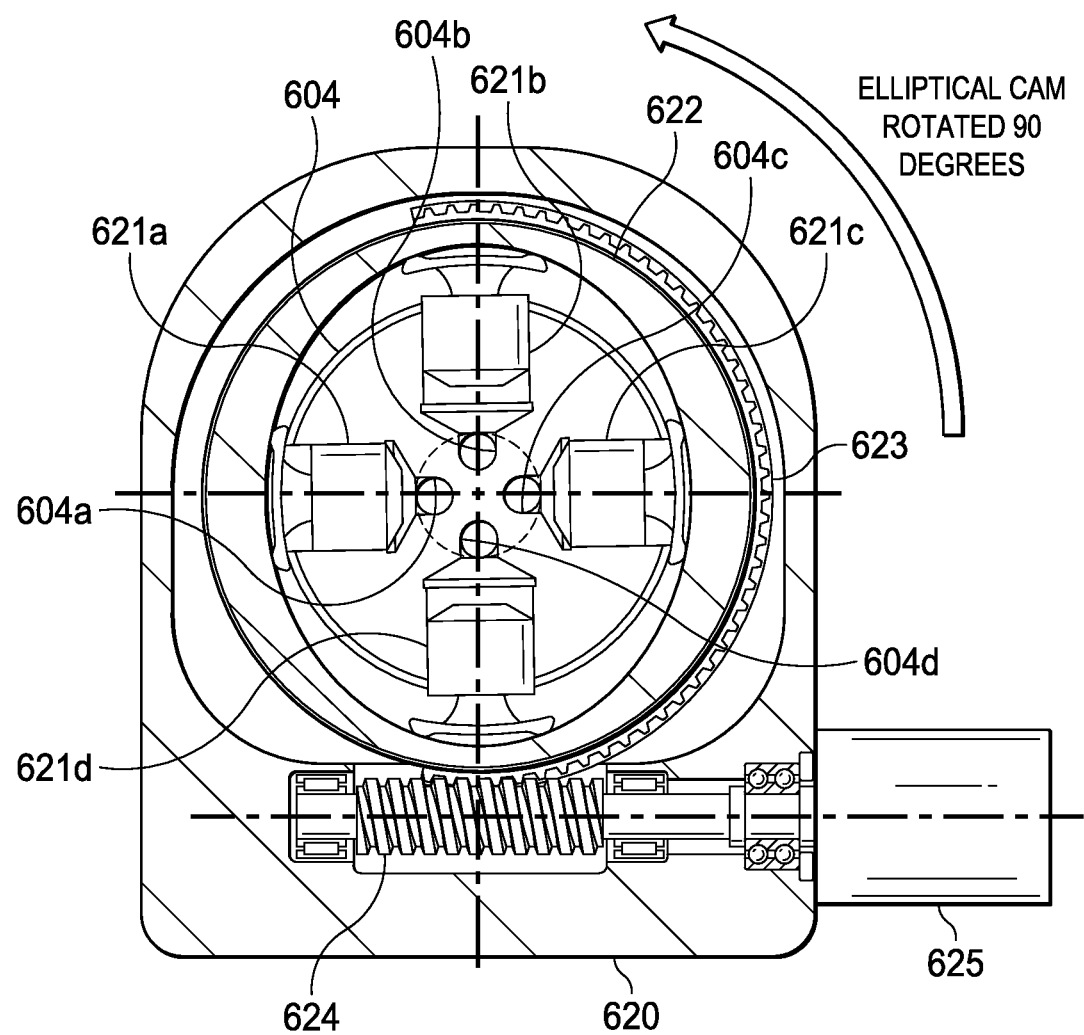
Figure 10I:
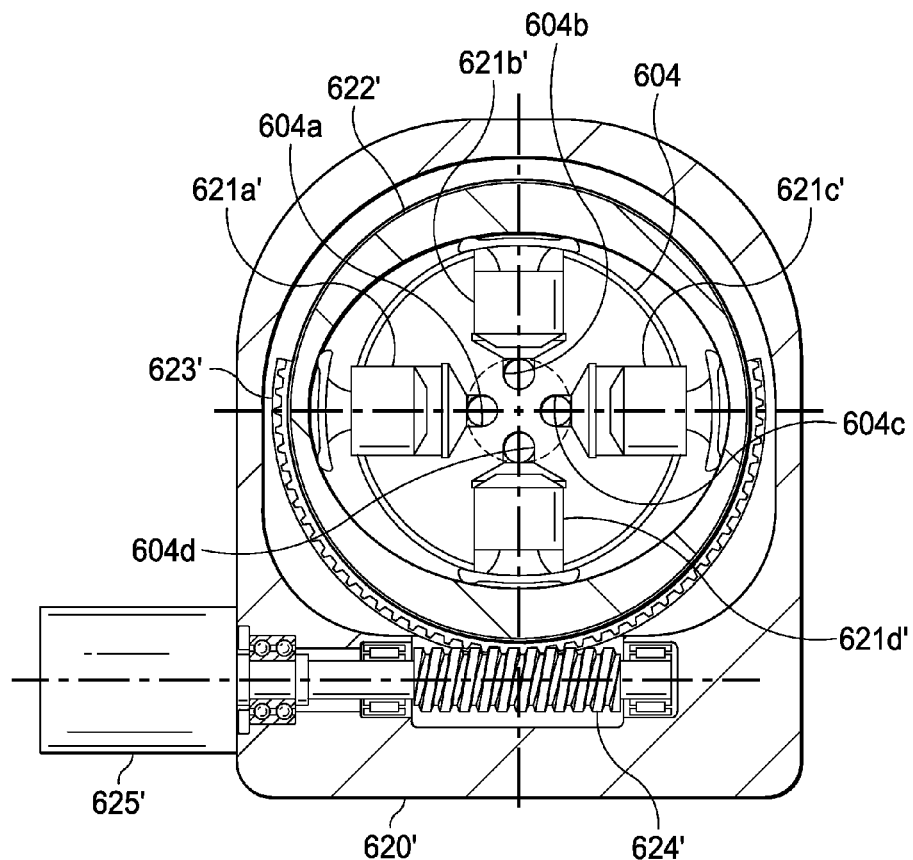
Figure 10J:
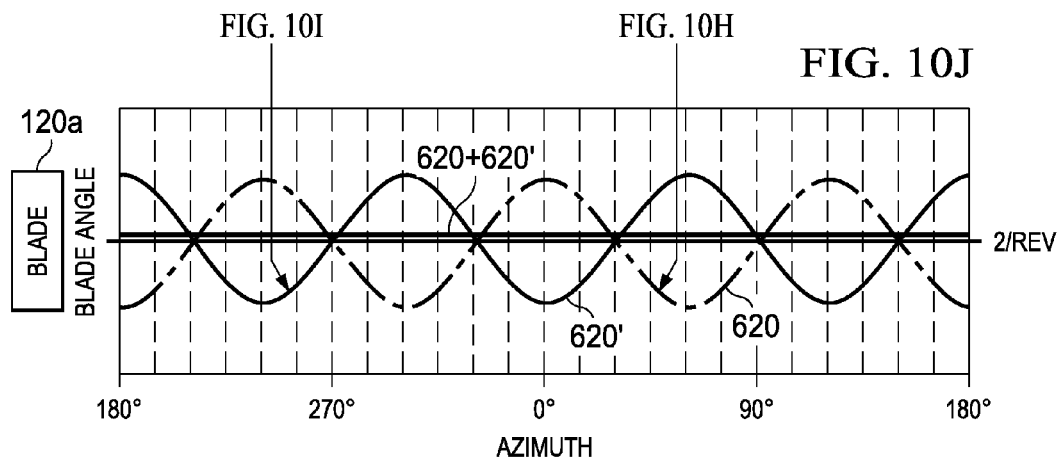
Figure 10K:
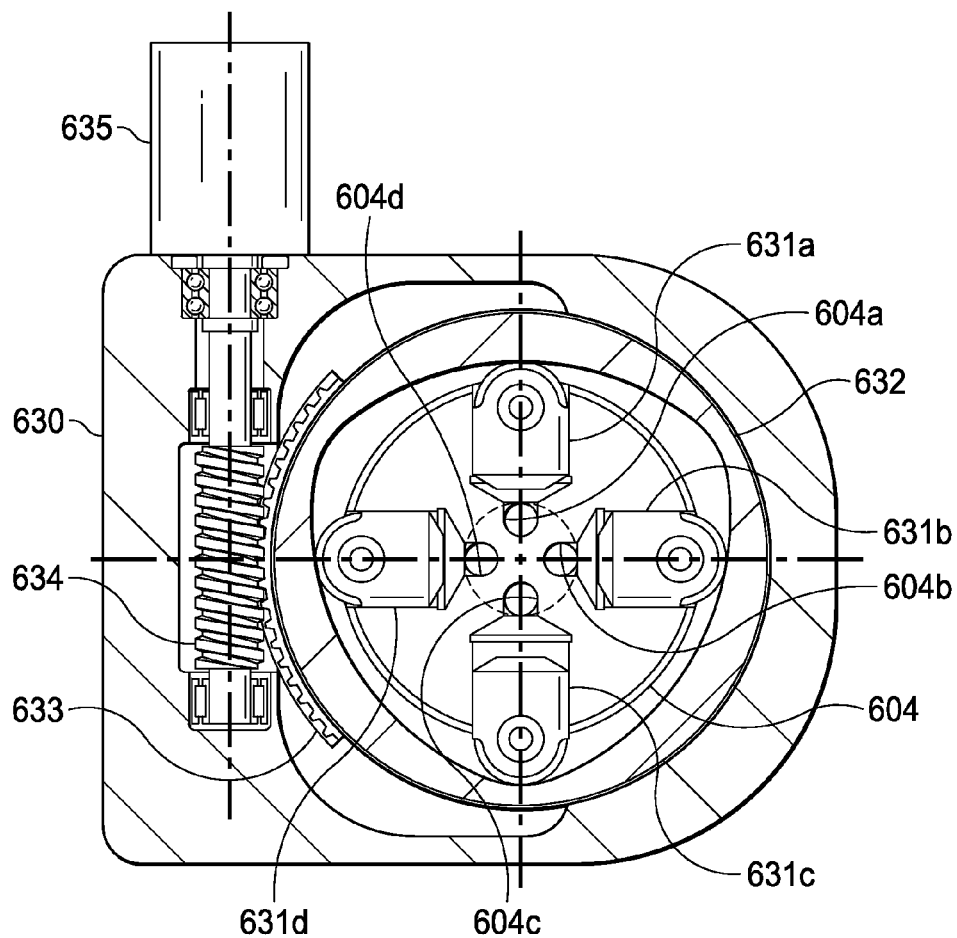
Figure 10L:
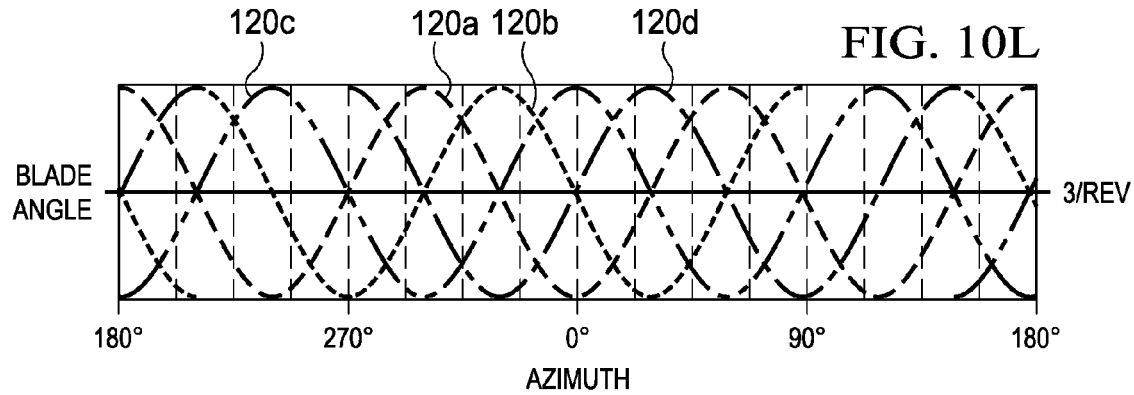
Figure 10M:
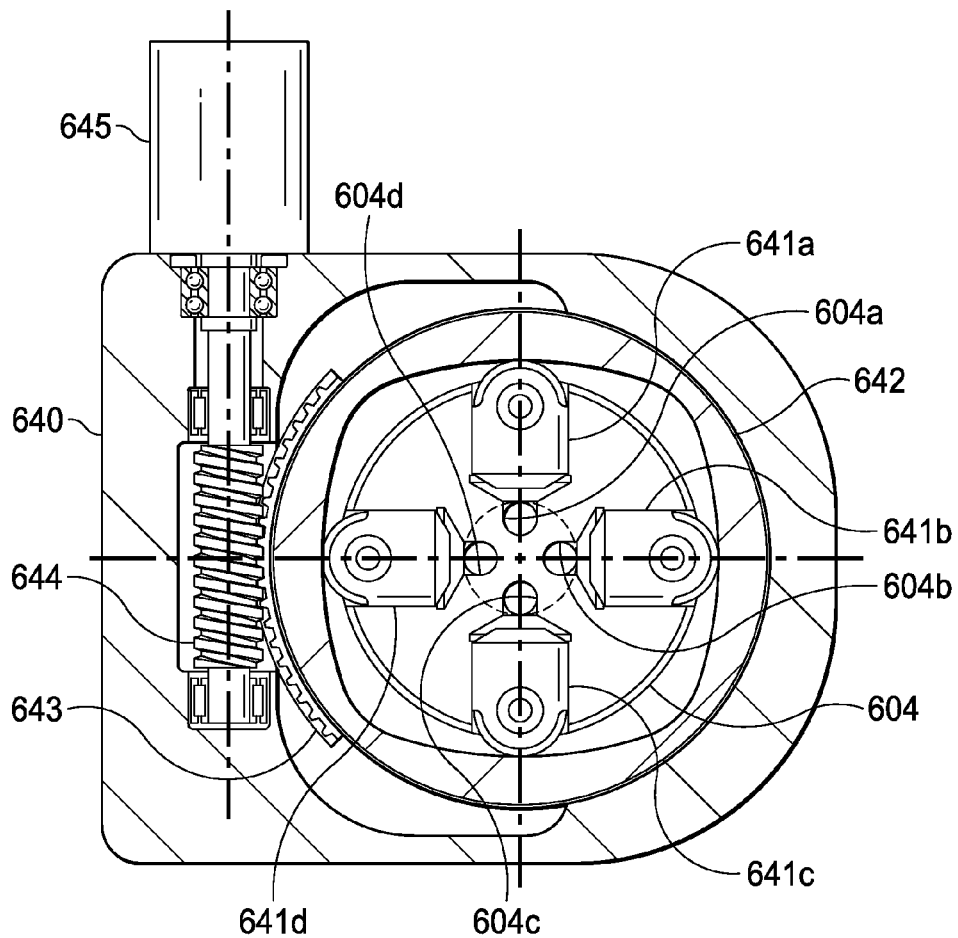
Figure 10N:
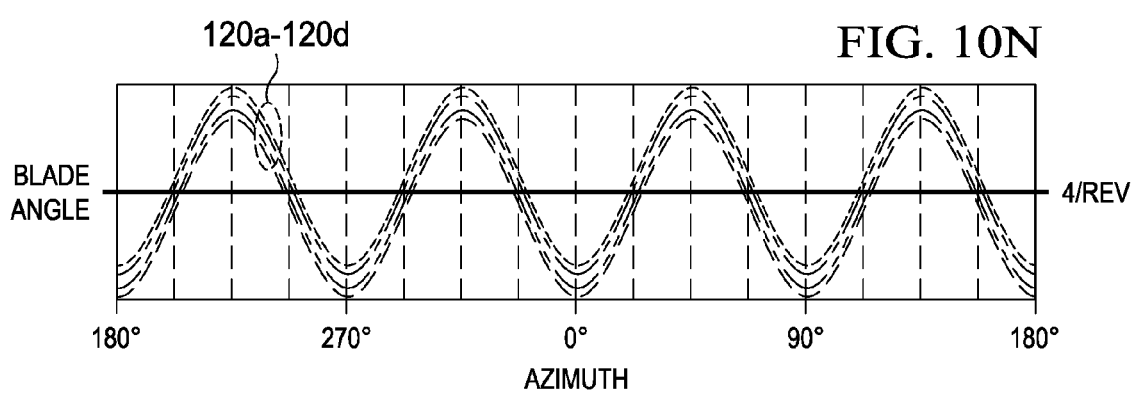
Figure 10Q:
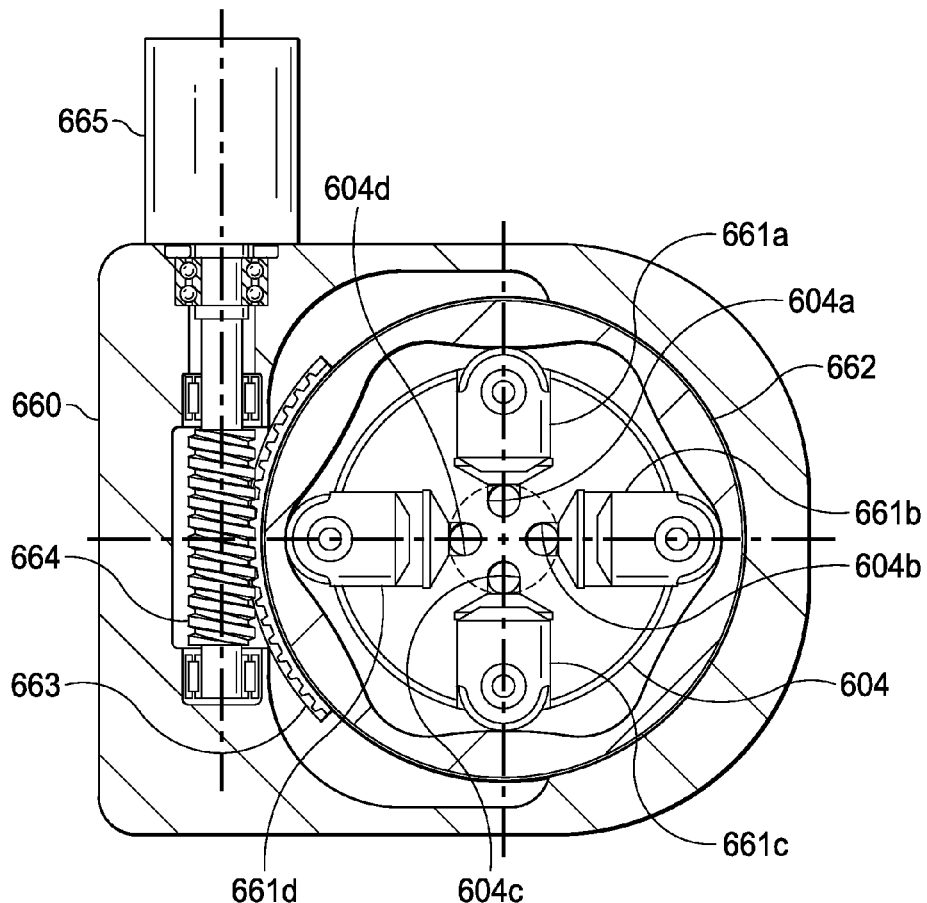
Figure 10R:
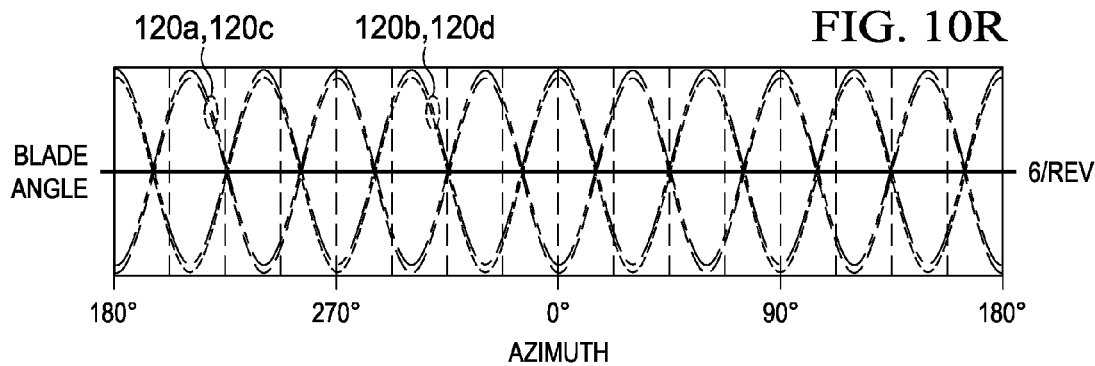
Figure 10S:
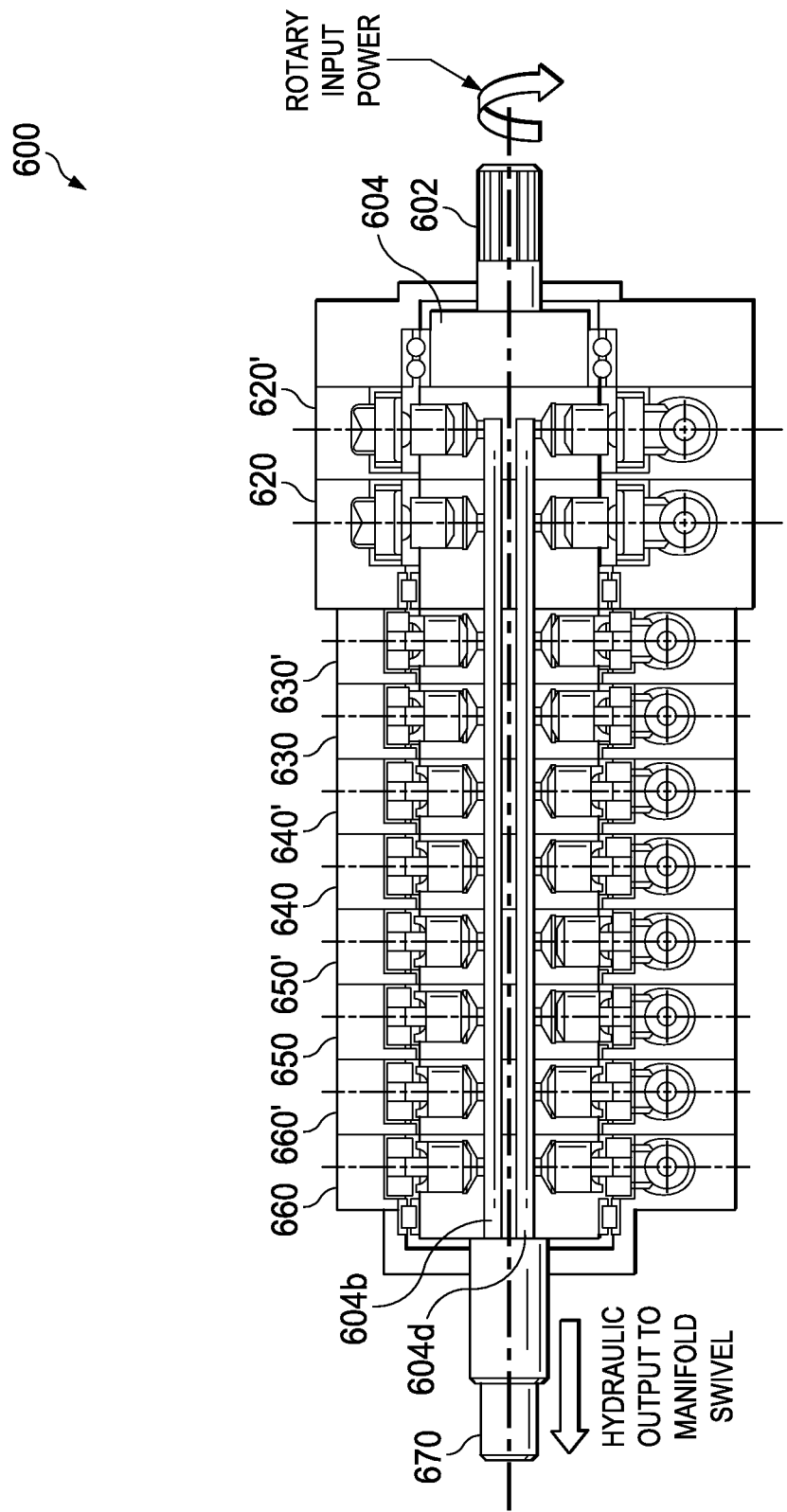

FIGS. 10A-10S show a radial fluid device 600 according to one example embodiment. Teachings of certain embodiments recognize that radial fluid device 600 may generate sinusoidal waveform amplitude and synchronization displacement control to multiple actuators from a single unit. As will be explained in greater detail below, the shape and synchronization of these sinusoidal displacement changes may be defined by the corresponding volumetric sum of hydraulic fluid required to displace each IBC actuator to replicate desired cyclic harmonic, collective harmonic, and reactionless blade motions. In this manner, radial fluid device 600 may emulate the hydraulic summation capabilities of hydraulic actuation system 500. In addition, teachings of certain embodiments recognize that radial fluid device 600 may emulate the power conservation and regeneration capabilities of hydraulic actuation system 400 by utilizing aiding actuator loads to drive radial fluid device 600 as a hydraulic motor.

FIG. 10A shows a side view of radial fluid device 600, and FIG. 10B shows a top view of radial fluid device 600. Radial fluid device 600 features multiple stacked radial piston sections rotating together in conjunction with a common cylinder block 604 (not shown in FIGS. 10A and 10B). In the example of FIGS. 10A-10S, radial fluid device 600 features stacked radial piston sections 620-660 and 620'-660' rotating together with shaft 602 and cylinder block 604.

As will be shown in greater detail below, shaft 602 is coupled to cylinder block 604. In some embodiments, shaft 602 is removably coupled to cylinder block 604. For example, different shafts 602 may have different gear splines, and an installer may choose from among different shafts 602 for use with radial fluid device 600.

Cylinder block 604 rotates within radial fluid device 600. In the example of FIGS. 10A-10S, the axis of rotation of cylinder block 604 is coaxial with shaft 602. Bearings may separate cylinder block 604 from the non-rotating body of radial fluid device 600.

Each pump section pair (e.g., sections 620 and 620', 630 and 630', etc.) is dedicated to generating the desired waveform for a specific frequency. In the example of FIGS. 10A-10S, the pump section pairs are dedicated to generating desired waveforms for 2/rev through 6/rev. In this example, the fundamental cyclic motions (1/rev) are generated by a mechanical swashplate, such as swashplate 116 of FIG. 2.

Although the pump section pairs in radial fluid device 600 are dedicated to generating desired waveforms for 2/rev through 6/rev, teachings of certain embodiments recognize that other fluid devices may include pump sections dedicated to generating more, fewer, or different desired waveforms. For example, the performance benefits provided by some frequencies may be minimal, and the pump sections generating these frequencies would be eliminated. As one example, a variation of radial fluid device 600 may only feature pump sections dedicated to 2/rev (reactionless) and 4/rev (collective harmonic), with the fundamental cyclic motions (1/rev) generated by a mechanical swashplate.

Separate section frequencies from each pump section pair in radial fluid device 600 may be hydraulically summed together to generate a final desired waveform to each actuator, such as described above with regard to FIG. 9B. In particular, as will be explained in greater detail below, manifold 670 transmits the hydraulically summed fluids from radial fluid device 600 to actuators corresponding to each blade in a rotor system.

FIG. 10C shows a cross-section view of pump section 620 along the cross-section line indicated in FIG. 10B. In operation, pump section 620 is operable to provide a hydraulic flow that results in reactionless blade motions (2/rev) by blades 120a-120d, as shown in FIG. 10D. In particular, as shown in FIG. 10D, adjacent blades 120a and 120b are 180 degrees out of phase, and opposite blades 120a and 120c are in phase. In this manner, the motion of blades in FIG. 10D resembles the motion of blades in FIG. 5A. As will be explained in greater detail below, teachings of certain embodiments recognize that using four equally-spaced radial pistons driven by an elliptical cam may allow the volume of fluid displaced by each piston to replicate the required 2/rev reactionless sinusoidal motion and blade synchronization.

In the example of FIG. 10C, pump section 620 features four pistons 621a-621d. Each piston 621a-621d is slidably received within a corresponding cylinder associated with chambers 604a-604d. As shown in greater detail below, each chamber 604a-604d represents a plurality of cylinders within cylinder block 604 that are in fluid communication. Each chamber 604a-604d may have an independent outlet port that exits radial fluid device 600 to control a different IBC actuator.

Pump section 620 also features a cam 622. During operation, pistons 621a-621d stroke inwards and outwards depending on the distance between cam 622 and the axis of rotation of cylinder block 604. For example, cam 622 is an elliptical cam having two lobes. As each piston 621a-621d moves from the transverse diameter of cam 622 towards the conjugate diameter of cam 622, each piston 621a-621d will be pushed closer to the axis of rotation of cylinder block 604. Likewise, as each piston 621a-621d moves from the conjugate diameter of cam 622 to the transverse diameter of cam 622, each piston 621a-621d will be pushed away from the axis of rotation of cylinder block 604. As a result, each piston 621a-621d reciprocates towards and away from the axis of rotation of cylinder block 604. Each reciprocation towards and away from the axis of rotation thus includes two strokes: a down stroke and an up stroke.

In the example of FIG. 10C, cam 622 is elliptical and thus has two lobes. The number of lobes indicates how many sinusoidal stroke motions a piston completes during one full rotation of cylinder block 604. For example, each piston 621a-621d completes two sinusoidal stroke motions during one rotation of cylinder block 604. The ability of pump section 620 to complete two sinusoidal stroke motions during one rotation corresponds to the two blade oscillations per revolution required for certain reactionless blade motions.

Rotating cam 622 may change when pistons 621a-621d begin their strokes. For example, rotating cam 622 changes the location of the transverse diameter of cam 622 and thus changes where each piston 621a-621d begins a down stroke. As will be explained in greater detail below, moving cam 622 relative to the corresponding cam 622' of pump section 620' may change the amount of time between when corresponding pistons of pump sections 620 and 620' begin their downstrokes. Teachings of certain embodiments recognize that changing the amount of time between the downstrokes of corresponding pistons of pump sections 620 and 620' may change the maximum accessible cylinder volume of chambers 604a-604d and therefore change how fluid flows in and out of radial fluid device 600.

Cam gear 623, drive gear 624, and cam adjuster 625 may, in combination, adjust the position of cam 622. Cam gear 623 is coupled to cams cam 622. Drive gear 624 interact with the teeth of cam gear 623. Cam adjuster 625 rotates drive gear 624 such that drive gear 624 rotates cam gear 623. As stated above, moving cams 622 changes when pistons 621a-621d begin their strokes, and changing when pistons 621a-621d begin their strokes can change how fluid flows in and out of radial fluid device 600. Thus, teachings of certain embodiments recognize the ability to change how fluid flows in and out of radial fluid device 600 by changing the position of cam adjuster 625.

In the example of FIG. 10C, cam gear 623 is a ring gear, drive gear 624 is a worm gear, and cam adjuster 625 is an electric motor. Teachings of certain embodiments recognize that an electric-driven worm gear may be particularly suitable for adjusting phase angle and amplitude for higher harmonics (e.g., 2/rev or greater) in an IBC system. In an IBC system, high-speed changes in phase angle and amplitude may not be required or even desired for higher harmonics. For example, slow changes in elliptical cam phase angle may provide time for failure modes to be identified and bypassed before undesirable blade motions are generated. In addition, a small-diameter worm gear running on a large-diameter ring gear may provide a high-gear reduction, thus reducing the torque of the electric motor required and providing irreversibility in the event of a motor failure. In the event an electric motor should fail, the oscillatory motion may be nullified by the still operating pump section (e.g., pump section 620') by indexing it's cam to an opposing phase position.

FIGS. 10E, 10F, and 10G show pump sections 620 and 620' in operation with their cams 622 and 622' in phase. FIG. 10E shows a cross-section view of pump section 620 along the cross-section line indicated in FIG. 10A, FIG. 10F shows a cross-section view of pump section 620' along the cross-section line indicated in FIG. 10A, and FIG. 10G shows the resulting blade angle for blade 120a that is produced by pump sections 620 and 620'.

In operation, pump section 620, is operable to provide a hydraulic flow that results in reactionless blade motions (2/rev) by blades 120a-120d. As shown in FIG. 10F, pump section 620' features pistons 621a'-621d', a cam 622', a cam gear 623', a drive gear 624', and a cam adjuster 625'. Each piston 621a'-621d' is slidably received within a corresponding cylinder associated with chambers 604a-604d. In this manner, corresponding pistons 621a and 621a' share chamber 604a, corresponding pistons 621b and 621b' share chamber 604b, corresponding pistons 621c and 621c' share chamber 604c, and corresponding pistons 621d and 621d' share chamber 604d.

Cam 622' is elliptical and thus has two lobes. Each piston 621a'-621d' completes two sinusoidal stroke motions during one rotation of cylinder block 604. The ability of pump section 620' to complete two sinusoidal stroke motions during one rotation corresponds to the two blade oscillations per revolution required for certain reactionless blade motions.

Cam gear 623', drive gear 624', and cam adjuster 625' may, in combination, adjust the position of cam 622'. In some embodiments, the relative positions of cams 622 and 622' may be adjusted independently. For example, cams 622 and 622' may be rotated in either the same direction or opposite directions, and the distance of rotation of cam 622 may not necessarily match the distance of rotation of 622'.

FIG. 10G shows the resulting blade angle for blade 120a that is produced by pump sections 620 and 620' when cams 622 and 622' are in phase. In this example, both pump sections 620 and 620' are in phase such that pistons 621a and 621a' complete their upstrokes and begin their downstrokes at zero degrees and 180 degrees azimuth. In this configuration, the sum of the sinusoidal waves generated by pump sections 620 and 620' is effectively double the contributing sinusoidal waves.

FIGS. 10H, 10I, and 10J show pump sections 620 and 620' in operation when their cams 622 and 622' are 90 degrees out of phase. FIG. 10E shows a cross-section view of pump section 620 along the cross-section line indicated in FIG. 10A, FIG. 10F shows a cross-section view of pump section 620' along the cross-section line indicated in FIG. 10A, and FIG. 10G shows the resulting blade angle for blade 120a that is produced by pump sections 620 and 620' when cams 622 and 622' are 90 degrees out of phase. As shown in FIG. 10H, cam 622 has been rotated 90 degrees relative to its position shown in FIG. 10E.

In this example, both pump sections 620 and 620' are 90 degrees out of phase such that pistons 621a and 621a' complete their upstrokes and begin their downstrokes 90 degrees apart. In this configuration, the contributing sinusoidal waves generated by pump sections 620 and 620' effectively cancel out. Thus, pump sections 620 and 620' effectively have no impact on flow in or out of chamber 604a and therefore do not cause any reactionless motions by blade 120a.

The examples of FIGS. 10G and 10J show how rotating cams 622 and 622' in opposite directions relative to one another may change the effective flow volume of chamber 604a and thus change the amplitude of the total sinusoidal wave produced by the combination of pump sections 620 and 620'. Teachings of certain embodiments recognize the ability to change the phase of the total sinusoidal wave produced by the combination of pump sections 620 and 620' in addition to changing the amplitude. In particular, rotating cams 622 and 622' in the same direction may change when the total sinusoidal wave reaches peak amplitude without changing the magnitude of the peak amplitude.

In the example of FIGS. 10C-10J, pump sections 620 and 620' include two-lobed (elliptical) cams capable of generating certain reactionless blade motions. Teachings of certain embodiments recognize that radial fluid device 600 may also include additional pump sections capable of generating different blade motions.

FIG. 10K shows a cross-section view of pump section 630 along the cross-section line indicated in FIG. 10B. In operation, pump section 630 is operable to provide a hydraulic flow that results in cyclic blade motions (3/rev) by blades 120a-

120*d*, as shown in FIG. 10L. In this manner, the motion of blades in FIG. 10L resembles the motion of blades in FIG. 3B.

Radial fluid device 600 also includes a corresponding pump section 630'. Pump sections 630 and 630' may operate together to generate cyclic blade motions (3/rev) similarly to how pump sections 620 and 620' operate together to generate reactionless blade motions (2/rev).

As shown in FIG. 10K, pump section 630 features pistons 631*a*-631*d*, a cam 632, a cam gear 633, a drive gear 634, and a cam adjuster 635. Each piston 631*a*-631*d* is slidably received within a corresponding cylinder associated with chambers 604*a*-604*d*. Similarly, each piston 631*a*'-631*d*' of pump section 630' is also slidably received within a corresponding cylinder associated with chambers 604*a*-604*d*. In this manner, corresponding pistons 631*a* and 631*a*' share chamber 604*a*, corresponding pistons 631*b* and 631*b*' share chamber 604*b*, corresponding pistons 631*c* and 631*c*' share chamber 604*c*, and corresponding pistons 631*d* and 631*d*' share chamber 604*d*. In addition, pistons 631*a* and 631*a*', pistons 631*b* and 631*b*', pistons 631*c* and 631*c*', and pistons 631*d* and 631*d*' share chambers with pistons of the other pump sections of radial fluid device 600.

Cam 632 has three lobes. Each piston 631*a*-631*d* completes three sinusoidal stroke motions during one rotation of cylinder block 604. The ability of pump section 630 to complete three sinusoidal stroke motions during one rotation corresponds to the three blade oscillations per revolution required for certain cyclic blade motions.

Cam gear 633, drive gear 634, and cam adjuster 635 may, in combination, adjust the position of cam 632. In some embodiments, the relative positions of cams 632 and 632' may be adjusted independently. For example, cams 632 and 632' may be rotated in either the same direction or opposite directions, and the distance of rotation of cam 632 may not necessarily match the distance of rotation of 632'.

FIG. 10M shows a cross-section view of pump section 640 along the cross-section line indicated in FIG. 10B. In operation, pump section 640 is operable to provide a hydraulic flow that results in collective blade motions (4/rev) by blades 120*a*-120*d*, as shown in FIG. 10N. In this manner, the motion of blades in FIG. 10N resembles the motion of blades in FIGS. 4A-4D.

Radial fluid device 600 also includes a corresponding pump section 640'. Pump sections 640 and 640' may operate together to generate collective blade motions (4/rev) similarly to how pump sections 620 and 620' operate together to generate reactionless blade motions (2/rev).

As shown in FIG. 10M, pump section 640 features pistons 641*a*-641*d*, a cam 642, a cam gear 643, a drive gear 644, and a cam adjuster 645. Each piston 641*a*-641*d* is slidably received within a corresponding cylinder associated with chambers 604*a*-604*d*. Similarly, each piston 641*a*'-641*d*' of pump section 640' is also slidably received within a corresponding cylinder associated with chambers 604*a*-604*d*. In this manner, corresponding pistons 641*a* and 641*a*' share chamber 604*a*, corresponding pistons 641*b* and 641*b*' share chamber 604*b*, corresponding pistons 641*c* and 641*c*' share chamber 604*c*, and corresponding pistons 641*d* and 641*d*' share chamber 604*d*. In addition, pistons 641*a* and 641*a*', pistons 641*b* and 641*b*', pistons 641*c* and 641*c*', and pistons 641*d* and 641*d*' share chambers with pistons of the other pump sections of radial fluid device 600.

Cam 642 has four lobes. Each piston 641*a*-641*d* completes four sinusoidal stroke motions during one rotation of cylinder block 604. The ability of pump section 640 to complete four sinusoidal stroke motions during one rotation corresponds to the four blade oscillations per revolution required for certain collective blade motions.

Cam gear 643, drive gear 644, and cam adjuster 645 may, in combination, adjust the position of cam 642. In some embodiments, the relative positions of cams 642 and 642' may be adjusted independently. For example, cams 642 and 642' may be rotated in either the same direction or opposite directions, and the distance of rotation of cam 642 may not necessarily match the distance of rotation of 642'.

FIG. 10O shows a cross-section view of pump section 650 along the cross-section line indicated in FIG. 10B. In operation, pump section 650 is operable to provide a hydraulic flow that results in cyclic blade motions (5/rev) by blades 120*a*-120*d*, as shown in FIG. 10P. In this manner, the motion of blades in FIG. 10P resembles the motion of blades in FIG. 3C.

Radial fluid device 600 also includes a corresponding pump section 650'. Pump sections 650 and 650' may operate together to generate cyclic blade motions (5/rev) similarly to how pump sections 620 and 620' operate together to generate reactionless blade motions (2/rev).

As shown in FIG. 10M, pump section 650 features pistons 651*a*-651*d*, a cam 652, a cam gear 653, a drive gear 654, and a cam adjuster 655. Each piston 651*a*-651*d* is slidably received within a corresponding cylinder associated with chambers 604*a*-604*d*. Similarly, each piston 651*a*'-651*d*' of pump section 650' is also slidably received within a corresponding cylinder associated with chambers 604*a*-604*d*. In this manner, corresponding pistons 651*a* and 651*a*' share chamber 604*a*, corresponding pistons 651*b* and 651*b*' share chamber 604*b*, corresponding pistons 651*c* and 651*c*' share chamber 604*c*, and corresponding pistons 651*d* and 651*d*' share chamber 604*d*. In addition, pistons 651*a* and 651*a*', pistons 651*b* and 651*b*', pistons 651*c* and 651*c*', and pistons 651*d* and 651*d*' share chambers with pistons of the other pump sections of radial fluid device 600.

Cam 652 has five lobes. Each piston 651*a*-651*d* completes five sinusoidal stroke motions during one rotation of cylinder block 604. The ability of pump section 630 to complete five sinusoidal stroke motions during one rotation corresponds to the five blade oscillations per revolution required for certain cyclic blade motions.

Cam gear 653, drive gear 654, and cam adjuster 655 may, in combination, adjust the position of cam 652. In some embodiments, the relative positions of cams 652 and 652' may be adjusted independently. For example, cams 652 and 652' may be rotated in either the same direction or opposite directions, and the distance of rotation of cam 652 may not necessarily match the distance of rotation of 652'.

FIG. 10Q shows a cross-section view of pump section 660 along the cross-section line indicated in FIG. 10B. In operation, pump section 660 is operable to provide a hydraulic flow that results in reactionless blade motions (6/rev) by blades 120*a*-120*d*, as shown in FIG. 10R. In this manner, the motion of blades in FIG. 10R resembles the motion of blades in FIG. 5B.

Radial fluid device 600 also includes a corresponding pump section 660'. Pump sections 660 and 660' may operate together to generate reactionless blade motions (6/rev) similarly to how pump sections 620 and 620' operate together to generate reactionless blade motions (2/rev).

As shown in FIG. 10M, pump section 660 features pistons 661*a*-661*d*, a cam 662, a cam gear 663, a drive gear 664, and a cam adjuster 665. Each piston 661*a*-661*d* is slidably received within a corresponding cylinder associated with chambers 604*a*-604*d*. Similarly, each piston 661*a*'-661*d*' of pump section 660' is also slidably received within a corresponding cylinder associated with chambers 604a-604d. In this manner, corresponding pistons 661a and 661a' share chamber 604a, corresponding pistons 661b and 661b' share chamber 604b, corresponding pistons 661c and 661c' share chamber 604c, and corresponding pistons 661d and 661d' share chamber 604d. In addition, pistons 661a and 661a', pistons 661b and 661b', pistons 661c and 661c', and pistons 661d and 661d' share chambers with pistons of the other pump sections of radial fluid device 600.

Cam 662 has six lobes. Each piston 661a-661d completes six sinusoidal stroke motions during one rotation of cylinder block 604. The ability of pump section 660 to complete six sinusoidal stroke motions during one rotation corresponds to the six blade oscillations per revolution required for certain reactionless blade motions.

Cam gear 663, drive gear 664, and cam adjuster 665 may, in combination, adjust the position of cam 662. In some embodiments, the relative positions of cams 662 and 662' may be adjusted independently. For example, cams 662 and 662' may be rotated in either the same direction or opposite directions, and the distance of rotation of cam 662 may not necessarily match the distance of rotation of 662'.

FIG. 10S shows a cross-section view of radial fluid device 600 along the cross-section line indicated in FIG. 10B. As shown in FIG. 10S, all pump sections generating frequencies 2/rev through 6/rev are situated about the same cylinder block 604. In addition, all pump sections share the same chambers 604a-604d. Each chamber 604a-604d is ported out of radial fluid device 600 through manifold 670. Manifold 670 may enable fluid communication between each chamber 604a-604d and a corresponding actuator with rotor blades 120a-120d (e.g., fluid communication between chamber 604a and the actuator associated with rotor blade 120a).

Teachings of certain embodiments recognize that radial fluid device 600 may provide for IBC in a relatively compact space. For example, a 9000 pound helicopter featuring a four-bladed rotor system operating at 3000 PSI operating pressure may utilize a radial fluid device such as radial fluid device 600 that measures approximately 6 inches by 6 inches by 11 inches (not including the cam adjusters). In this example, pump sections 620 and 620' may be sized to provide 20% of normal cyclic authority while all other frequencies may be sized to provide 10% of normal cyclic authority.

In some embodiments, cylinder block 604 may rotate at the same speed as drive shaft 112b. Teachings of certain embodiments recognize that rotating cylinder block 604 at the same speed as drive shaft 112b may allow harmonic outputs from radial fluid device 600 to be synchronized with the rotor blades 120a-120d rotating about drive shaft 112b. In the example of FIG. 10S, an exterior power source rotates shaft 602 at the same speed as drive shaft 112b, which causes cylinder block 604 to also rotate at the same speed. Teachings of certain embodiments recognize that radial fluid device 600 may be well suited to operate at the same speed as drive shaft 112b. For example, helicopter hydraulic pumps in other settings may operate at approximately 5000 RPM and industrial radial pumps of similar displacements as radial fluid device 600 may operate at approximately 1500 RPM, whereas as rotor speeds are typically lower than these speeds (e.g., 400 to 500 RPM).

In the example of FIGS. 10A-10S, radial fluid device 600 is configured to provide IBC in a four blade rotor system. Teachings of certain embodiments recognize, however, recognize that the concepts described with regard to radial fluid device 600 may be adapted to support IBC for rotor systems with more or fewer blades (e.g., two blades, three blades, five blades, six blades, seven blades, etc.) by adapting the arrangement of pistons, cams, and porting. For example, FIGS. 11A-11K shows a radial fluid device 700 configured to provide IBC in a five blade rotor system.

Figure 11A:
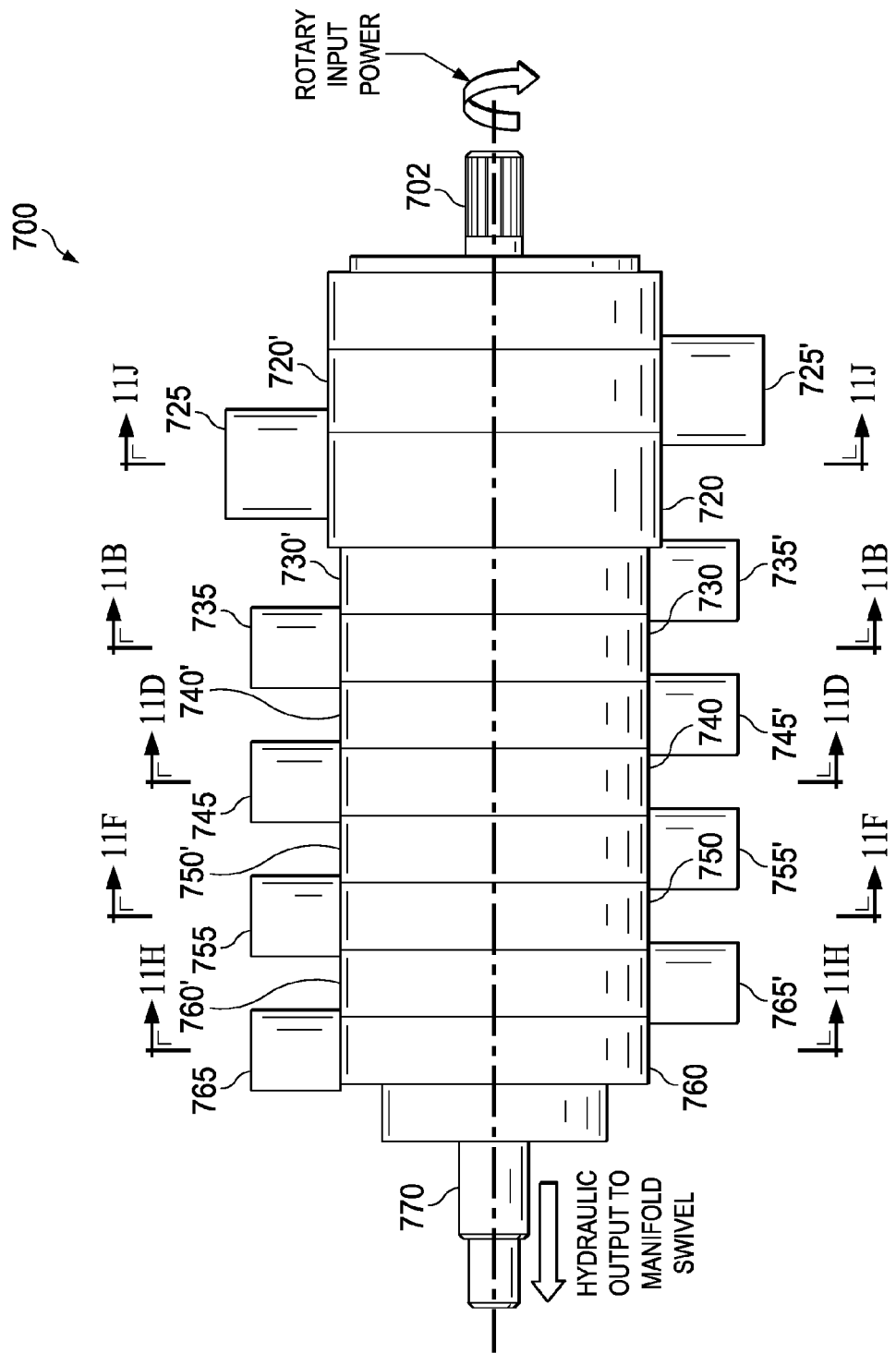
FIGS. 11A-11K show an alternative embodiment of the radial fluid device of FIGS. 10A-10S and the frequencies of blade motions produced during operation of this alternative embodiment.

FIG. 11A shows a top view of radial fluid device 700. Radial fluid device 700 features multiple stacked radial piston sections rotating together in conjunction with a common cylinder block 6704 (not shown in FIG. 10A). In the example of FIGS. 11A-11J, radial fluid device 700 features stacked radial piston sections 720-760 and 720'-760' rotating together with shaft 702 and cylinder block 704.

As will be shown in greater detail below, shaft 702 is coupled to cylinder block 704. In some embodiments, shaft 702 is removably coupled to cylinder block 704. For example, different shafts 702 may have different gear splines, and an installer may choose from among different shafts 702 for use with radial fluid device 600.

Cylinder block 704 rotates within radial fluid device 700. In the example of FIGS. 11A-11J, the axis of rotation of cylinder block 704 is coaxial with shaft 702. Bearings may separate cylinder block 704 from the non-rotating body of radial fluid device 700.

Each pump section pair (e.g., sections 720 and 720', 730 and 730', etc.) is dedicated to generating the desired waveform for a specific frequency. In the example of FIGS. 11A-11J, the pump section pairs are dedicated to generating desired waveforms for 2/rev through 6/rev. In this example, the fundamental cyclic motions (1/rev) are generated by a mechanical swashplate, such as swashplate 116 of FIG. 2.

Although the pump section pairs in radial fluid device 700 are dedicated to generating desired waveforms for 2/rev through 6/rev, teachings of certain embodiments recognize that other fluid devices may include pump sections dedicated to generating more, fewer, or different desired waveforms. For example, the performance benefits provided by some frequencies may be minimal, and the pump sections generating these frequencies would be eliminated. As one example, a variation of radial fluid device 700 may only feature pump sections dedicated to 2/rev (reactionless) and 4/rev (collective harmonic), with the fundamental cyclic motions (1/rev) generated by a mechanical swashplate.

Separate section frequencies from each pump section pair in radial fluid device 700 may be hydraulically summed together to generate a final desired waveform to each actuator, such as described above with regard to FIG. 9B. In particular, as will be explained in greater detail below, manifold 770 transmits the hydraulically summed fluids from radial fluid device 700 to actuators corresponding to each blade in a rotor system.

Figure 11B:
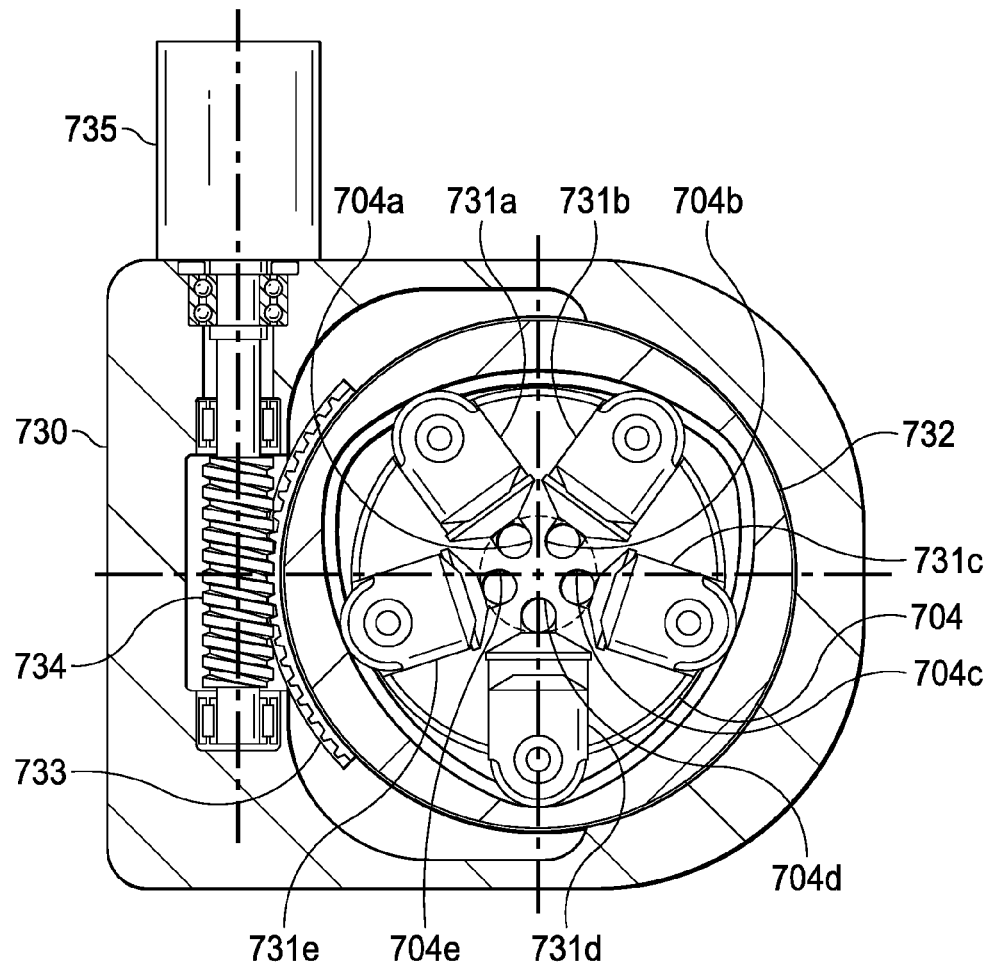
Figure 11C:
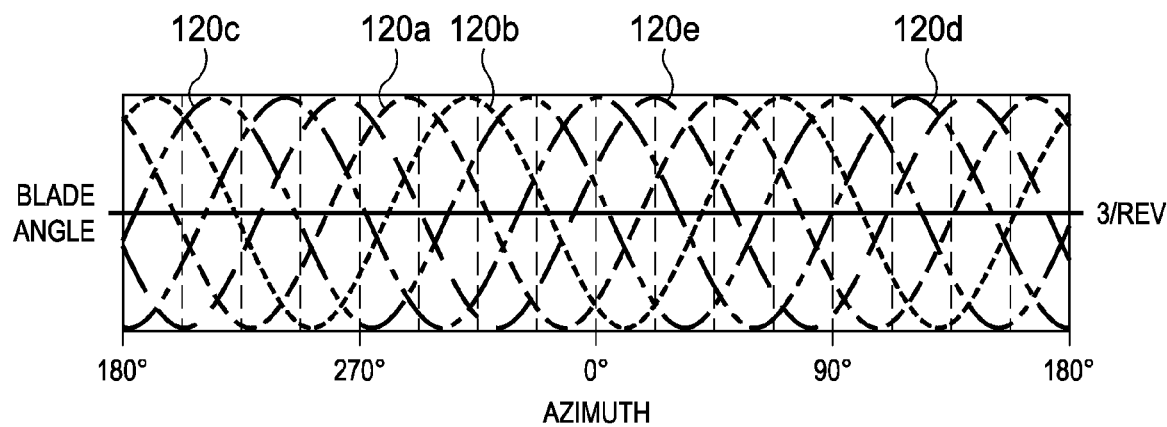

In this example embodiments, pump sections 730-760 and 730'-760' of radial fluid device 700 may operate in a similar manner to pump sections 630-660 and 630'-660' of radial fluid device 600. For example, FIG. 11B shows a cross-section view of pump section 730 along the cross-section line indicated in FIG. 11A. In operation, pump section 730 is operable to provide a hydraulic flow that results in cyclic blade motions (3/rev) by blades 120a-120d, as shown in FIG. 11C. In this manner, the motion of blades in FIG. 11C resembles the motion of blades in FIG. 3B.

Radial fluid device 700 also includes a corresponding pump section 730'. Pump sections 730 and 730' may operate together to generate cyclic blade motions (3/rev) similarly to how pump sections 730 and 730' operate together to generate cyclic blade motions (3/rev).

As shown in FIG. 11B, pump section 730 features pistons 731a-731e, a cam 732, a cam gear 733, a drive gear 734, and a cam adjuster 735. Each piston 731a-731e is slidably received within a corresponding cylinder associated with chambers 704*a*-704*e*. Similarly, each piston 731*a*'-731*e*' of pump section 730' is also slidably received within a corresponding cylinder associated with chambers 704*a*-704*e*. In this manner, corresponding pistons 731*a* and 731*a*' share chamber 704*a*, corresponding pistons 731*b* and 731*b*' share chamber 704*b*, corresponding pistons 731*c* and 731*c*' share chamber 704*c*, corresponding pistons 731*d* and 731*d*' share chamber 704*d*, and corresponding pistons 731*e* and 731*e*' share chamber 704*e*. In addition, pistons 731*a* and 731*a*', pistons 731*b* and 731*b*', pistons 731*c* and 731*c*', pistons 731*dc* and 731*d*', and pistons 731*e* and 731*e*' share chambers with pistons of the other pump sections of radial fluid device 700.

Cam gear 733, drive gear 734, and cam adjuster 735 may, in combination, adjust the position of cam 732. In some embodiments, the relative positions of cams 732 and 732' may be adjusted independently. For example, cams 732 and 732' may be rotated in either the same direction or opposite directions, and the distance of rotation of cam 732 may not necessarily match the distance of rotation of 732'.

Figure 11D:
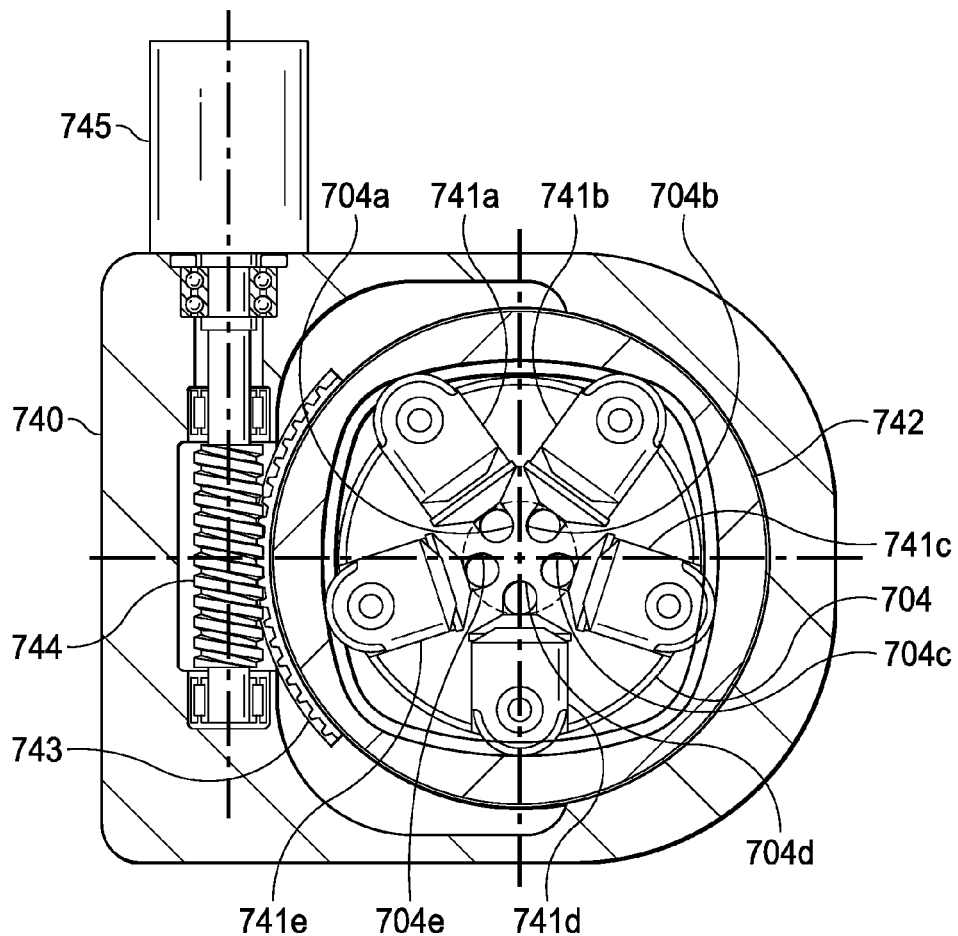
Figure 11E:
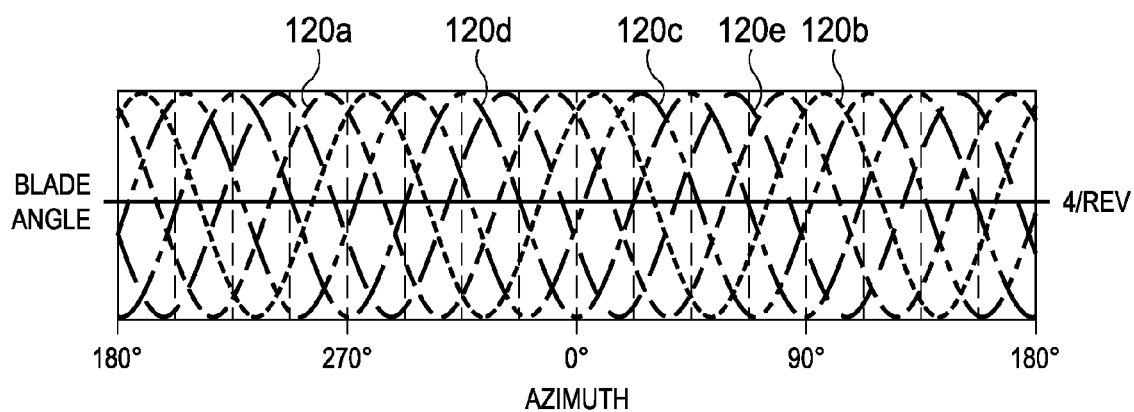

FIG. 11D shows a cross-section view of pump section 740 along the cross-section line indicated in FIG. 11A. In operation, pump section 740 is operable to provide a hydraulic flow that results in collective blade motions (4/rev) by blades 120*a*-120*d*, as shown in FIG. 11E. In this manner, the motion of blades in FIG. 11E resembles the motion of blades in FIGS. 4A-4D.

Radial fluid device 700 also includes a corresponding pump section 740'. Pump sections 740 and 740' may operate together to generate collective blade motions (4/rev) similarly to how pump sections 640 and 640' operate together to generate collective blade motions (4/rev).

As shown in FIG. 11D, pump section 740 features pistons 741*a*-741*e*, a cam 742, a cam gear 743, a drive gear 744, and a cam adjuster 745. Each piston 741*a*-741*e* is slidably received within a corresponding cylinder associated with chambers 704*a*-704*e*. Similarly, each piston 741*a*'-741*e*' of pump section 740' is also slidably received within a corresponding cylinder associated with chambers 704*a*-704*e*. In this manner, corresponding pistons 741*a* and 741*a*' share chamber 704*a*, corresponding pistons 741*b* and 741*b*' share chamber 704*b*, corresponding pistons 741*c* and 741*c*' share chamber 704*c*, corresponding pistons 741*d* and 741*d*' share chamber 704*d*, and corresponding pistons 741*e* and 741*e*' share chamber 704*e*. In addition, pistons 741*a* and 741*a*', pistons 741*b* and 741*b*', pistons 741*c* and 741*c*', pistons 741*d* and 741*d*', and pistons 741*e* and 741*e*' share chambers with pistons of the other pump sections of radial fluid device 700.

Cam gear 743, drive gear 744, and cam adjuster 745 may, in combination, adjust the position of cam 742. In some embodiments, the relative positions of cams 742 and 742' may be adjusted independently. For example, cams 742 and 742' may be rotated in either the same direction or opposite directions, and the distance of rotation of cam 742 may not necessarily match the distance of rotation of 742'.

Figure 11F:
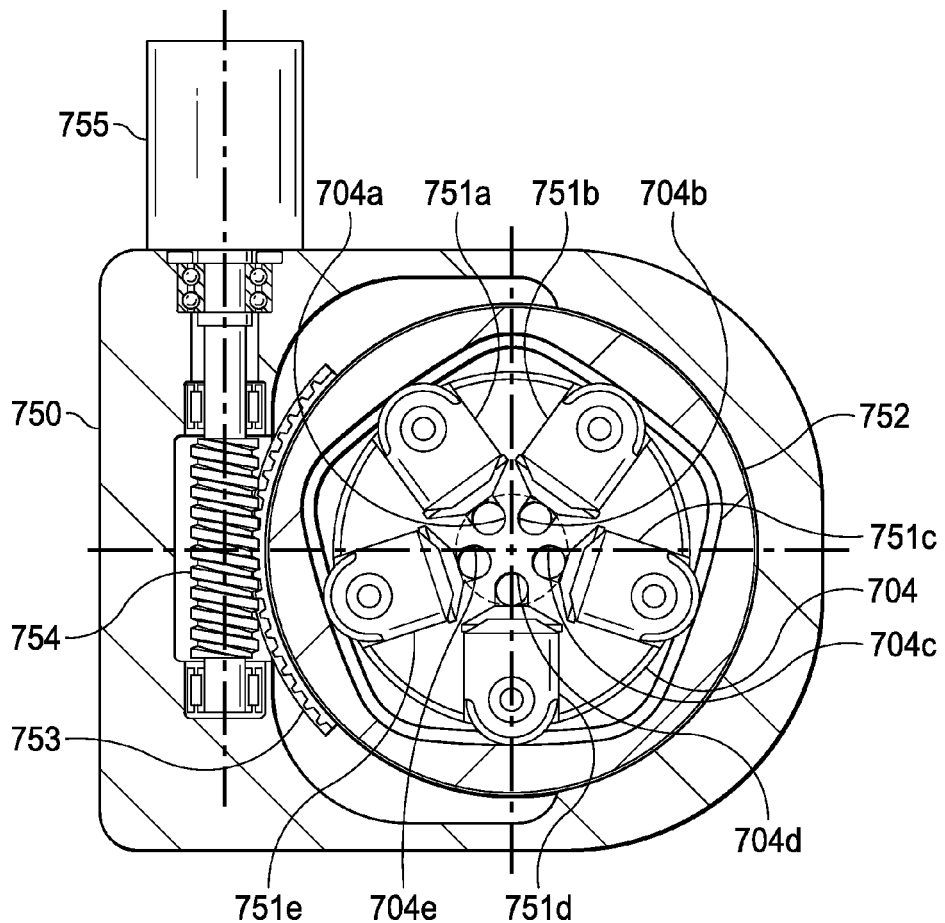
Figure 11G:
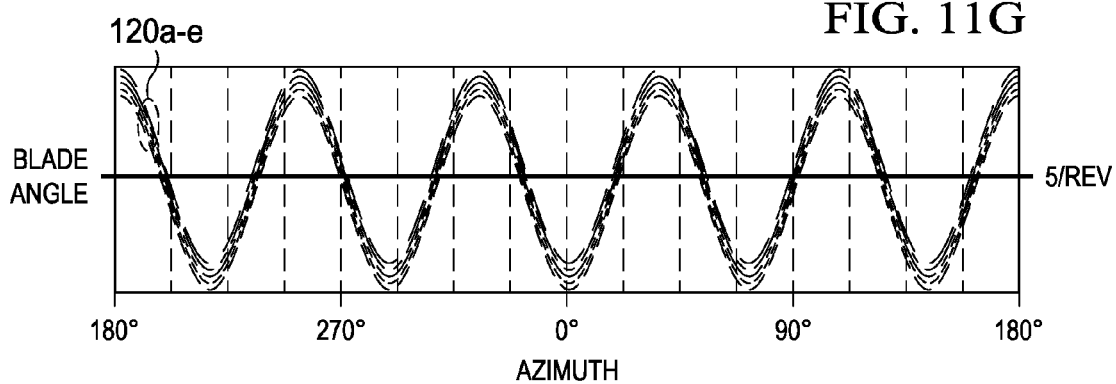

FIG. 11F shows a cross-section view of pump section 750 along the cross-section line indicated in FIG. 11A. In operation, pump section 750 is operable to provide a hydraulic flow that results in cyclic blade motions (5/rev) by blades 120*a*-120*d*, as shown in FIG. 11G. In this manner, the motion of blades in FIG. 11G resembles the motion of blades in FIG. 3C.

Radial fluid device 700 also includes a corresponding pump section 750'. Pump sections 750 and 750' may operate together to generate cyclic blade motions (5/rev) similarly to how pump sections 650 and 650' operate together to generate cyclic blade motions (5/rev).

As shown in FIG. 11F, pump section 750 features pistons 751*a*-751*e*, a cam 752, a cam gear 753, a drive gear 754, and a cam adjuster 755. Each piston 751*a*-751*e* is slidably received within a corresponding cylinder associated with chambers 704*a*-704*e*. Similarly, each piston 751*a*'-751*e*' of pump section 750' is also slidably received within a corresponding cylinder associated with chambers 704*a*-704*e*. In this manner, corresponding pistons 751*a* and 751*a*' share chamber 704*a*, corresponding pistons 751*b* and 751*b*' share chamber 704*b*, corresponding pistons 751*c* and 751*c*' share chamber 704*c*, corresponding pistons 751*d* and 751*d*' share chamber 704*d*, and corresponding pistons 751*e* and 751*e*' share chamber 704*e*. In addition, pistons 751*a* and 751*a*', pistons 751*b* and 751*b*', pistons 751*c* and 751*c*', pistons 751*d* and 751*d*', and pistons 751*e* and 751*e*' share chambers with pistons of the other pump sections of radial fluid device 700.

Cam gear 753, drive gear 754, and cam adjuster 755 may, in combination, adjust the position of cam 752. In some embodiments, the relative positions of cams 752 and 752' may be adjusted independently. For example, cams 752 and 752' may be rotated in either the same direction or opposite directions, and the distance of rotation of cam 752 may not necessarily match the distance of rotation of 752'.

Figure 11H:
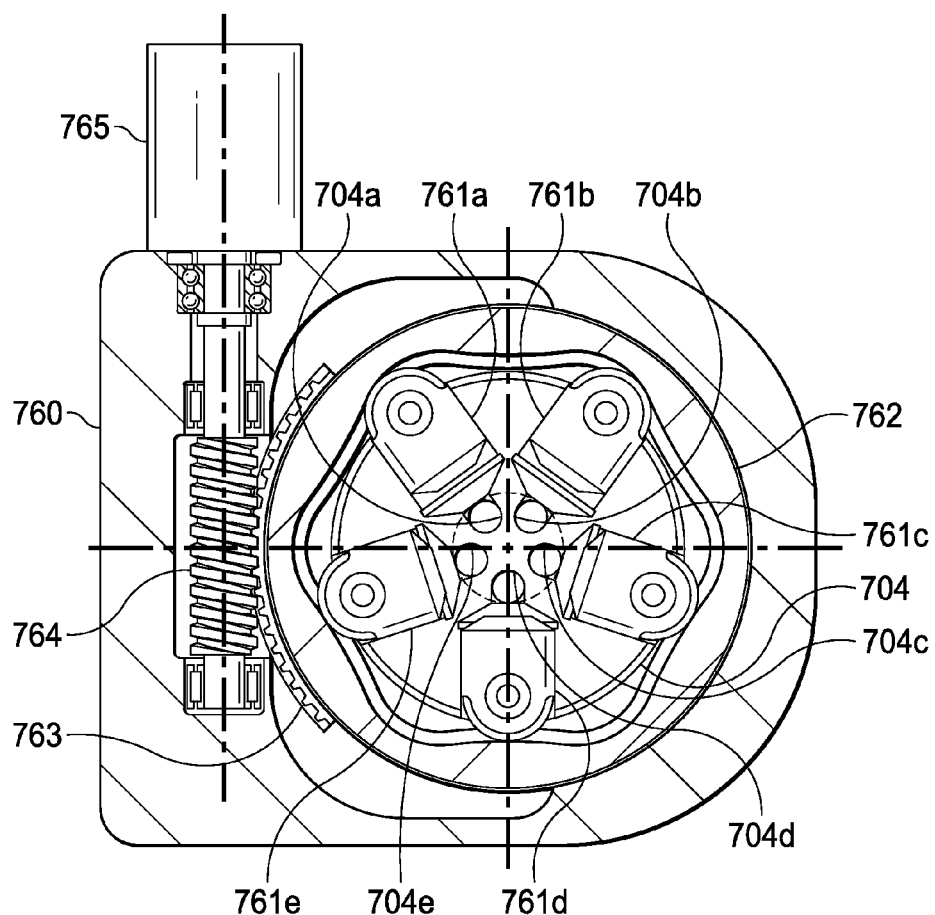
Figure 11I:
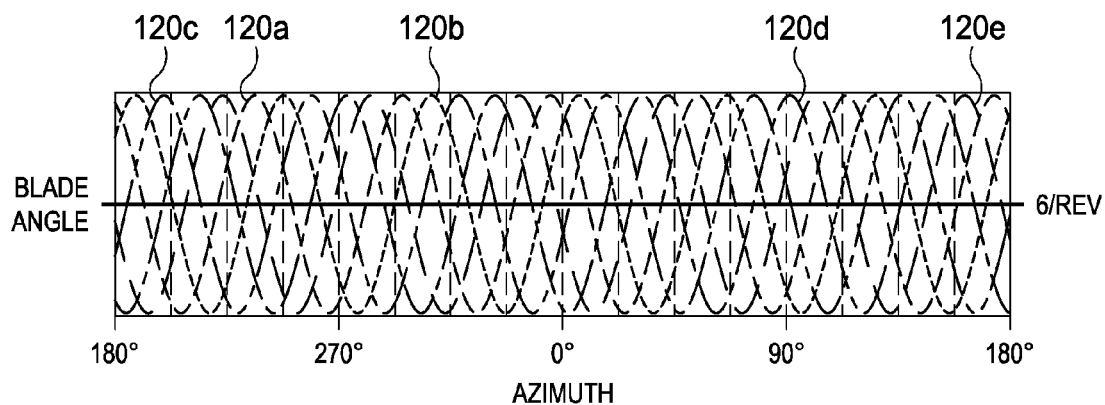

FIG. 11H shows a cross-section view of pump section 760 along the cross-section line indicated in FIG. 11A. In operation, pump section 760 is operable to provide a hydraulic flow that results in reactionless blade motions (6/rev) by blades 120*a*-120*d*, as shown in FIG. 11I. In this manner, the motion of blades in FIG. 11I resembles the motion of blades in FIG. 5B.

Radial fluid device 700 also includes a corresponding pump section 760'. Pump sections 760 and 760' may operate together to generate reactionless blade motions (6/rev) similarly to how pump sections 660 and 660' operate together to generate reactionless blade motions (6/rev).

As shown in FIG. 11H, pump section 760 features pistons 761*a*-761*e*, a cam 762, a cam gear 763, a drive gear 764, and a cam adjuster 765. Each piston 761*a*-761*e* is slidably received within a corresponding cylinder associated with chambers 704*a*-704*e*. Similarly, each piston 761*a*'-761*e*' of pump section 760' is also slidably received within a corresponding cylinder associated with chambers 704*a*-704*e*. In this manner, corresponding pistons 761*a* and 761*a*' share chamber 704*a*, corresponding pistons 761*b* and 761*b*' share chamber 704*b*, corresponding pistons 761*c* and 761*c*' share chamber 704*c*, corresponding pistons 761*d* and 761*d*' share chamber 704*d*, and corresponding pistons 761*e* and 761*e*' share chamber 704*e*. In addition, pistons 761*a* and 761*a*', pistons 761*b* and 761*b*', pistons 761*c* and 761*c*', pistons 761*d* and 761*d*', and pistons 761*e* and 761*e*' share chambers with pistons of the other pump sections of radial fluid device 700.

Cam gear 763, drive gear 764, and cam adjuster 765 may, in combination, adjust the position of cam 762. In some embodiments, the relative positions of cams 762 and 762' may be adjusted independently. For example, cams 762 and 762' may be rotated in either the same direction or opposite directions, and the distance of rotation of cam 762 may not necessarily match the distance of rotation of 762'.

In the examples of FIGS. 11B-11I, each piston is ported sequentially to a corresponding blade actuator with the 72 degree radial spacing for the five-blade frequencies of 3/rev, 4/rev, 5/rev, and 6/rev. For 2/rev reactionless motion using an elliptical cam, however, teachings of certain embodiments recognize that piston ports may be crossed in pump section 720 for a five-bladed rotor system. In particular, cross-porting may allow fluid device 700 to use pistons with 72 degree spacing to generate blade motions of 144 degree spacing, which may satisfy requirements of 2/rev reactionless motions.

Figure 11J:
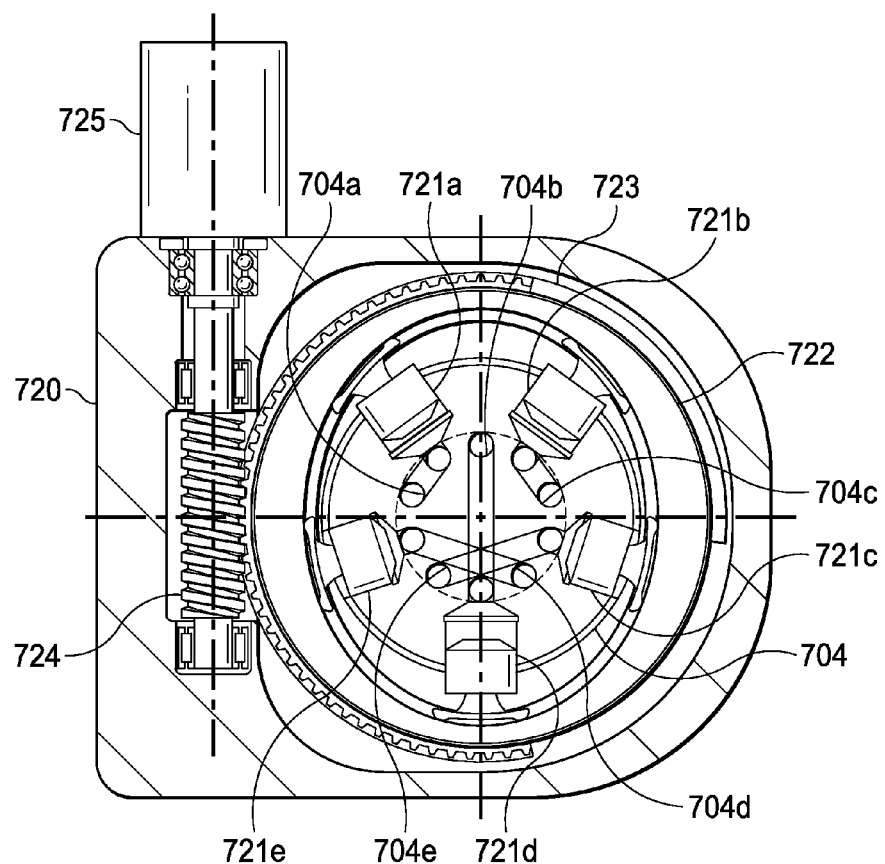
Figure 11K:
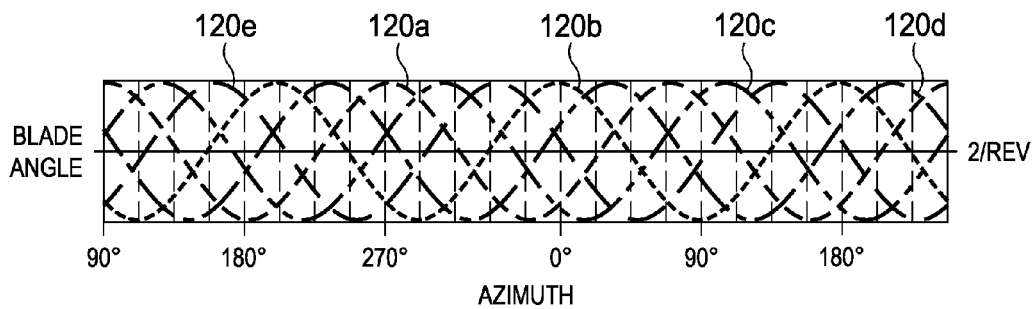

FIG. 11J shows a cross-section view of pump section 720 along the cross-section line indicated in FIG. 11A. In operation, pump section 720 is operable to provide a hydraulic flow that results in reactionless blade motions (2/rev) by blades 120a-120d, as shown in FIG. 11K. In this manner, the motion of blades in FIG. 11K resembles the motion of blades in FIG. 5A.

Radial fluid device 700 also includes a corresponding pump section 720'. Pump sections 720 and 720' may operate together to generate reactionless blade motions (2/rev) similarly to how pump sections 620 and 620' operate together to generate reactionless blade motions (2/rev), except that the piston ports in pump section 720 are crossed for a five-bladed rotor system.

As shown in FIG. 11J, pump section 720 features pistons 721a-721e, a cam 722, a cam gear 723, a drive gear 724, and a cam adjuster 725. Each piston 721a-721e is slidably received within a cylinder associated with chambers 704a-704e. However, unlike pump sections 730-760, the correspondence between pistons 721a-721e and chambers 704a-704e is crossed for some pistons. In the example of FIG. 11J, piston 721a is slidably received within a cylinder associated with chamber 704a, piston 721b is slidably received within a cylinder associated with chamber 704c, piston 721c is slidably received within a cylinder associated with chamber 704e, piston 721d is slidably received within a cylinder associated with chamber 704b, and piston 721e is slidably received within a cylinder associated with chamber 704d. Similarly, piston 721a' is slidably received within a cylinder associated with chamber 704a, piston 721b' is slidably received within a cylinder associated with chamber 704c, piston 721c' is slidably received within a cylinder associated with chamber 704e, piston 721d' is slidably received within a cylinder associated with chamber 704b, and piston 721e' is slidably received within a cylinder associated with chamber 704d. In this manner, corresponding pistons 721a and 721a' share chamber 704a, corresponding pistons 721b and 721b' share chamber 704c, corresponding pistons 721c and 721c' share chamber 704e, corresponding pistons 721d and 721d' share chamber 704b, and corresponding pistons 721e and 721e' share chamber 704d. In addition, pistons 721a and 721a', pistons 721b and 721b', pistons 721c and 721c', pistons 721d and 721d', and pistons 721e and 721e' share chambers with pistons of the other pump sections of radial fluid device 700.

Cam gear 723, drive gear 724, and cam adjuster 725 may, in combination, adjust the position of cam 722. In some embodiments, the relative positions of cams 722 and 722' may be adjusted independently. For example, cams 722 and 722' may be rotated in either the same direction or opposite directions, and the distance of rotation of cam 722 may not necessarily match the distance of rotation of 722'.

Implementing Partial-Authority IBC

As stated above, radial fluid device 600 may provide sinusoidal waveform amplitude and synchronization displacement control to multiple actuators for use in a partial-authority IBC system. For example, radial fluid device 600 may include pump section pairs dedicated to generating desired waveforms for 2/rev through 6/rev. In this example, the fundamental cyclic motions (1/rev) are generated by a mechanical swashplate, such as swashplate 116 of FIG. 2. As will be explained in greater detail below, teachings of certain embodiments recognize the capability to convert harmonic pressure changes in hydraulic fluid within radial fluid device 600 into movements of blades 120a-120d.

Figure 12A:
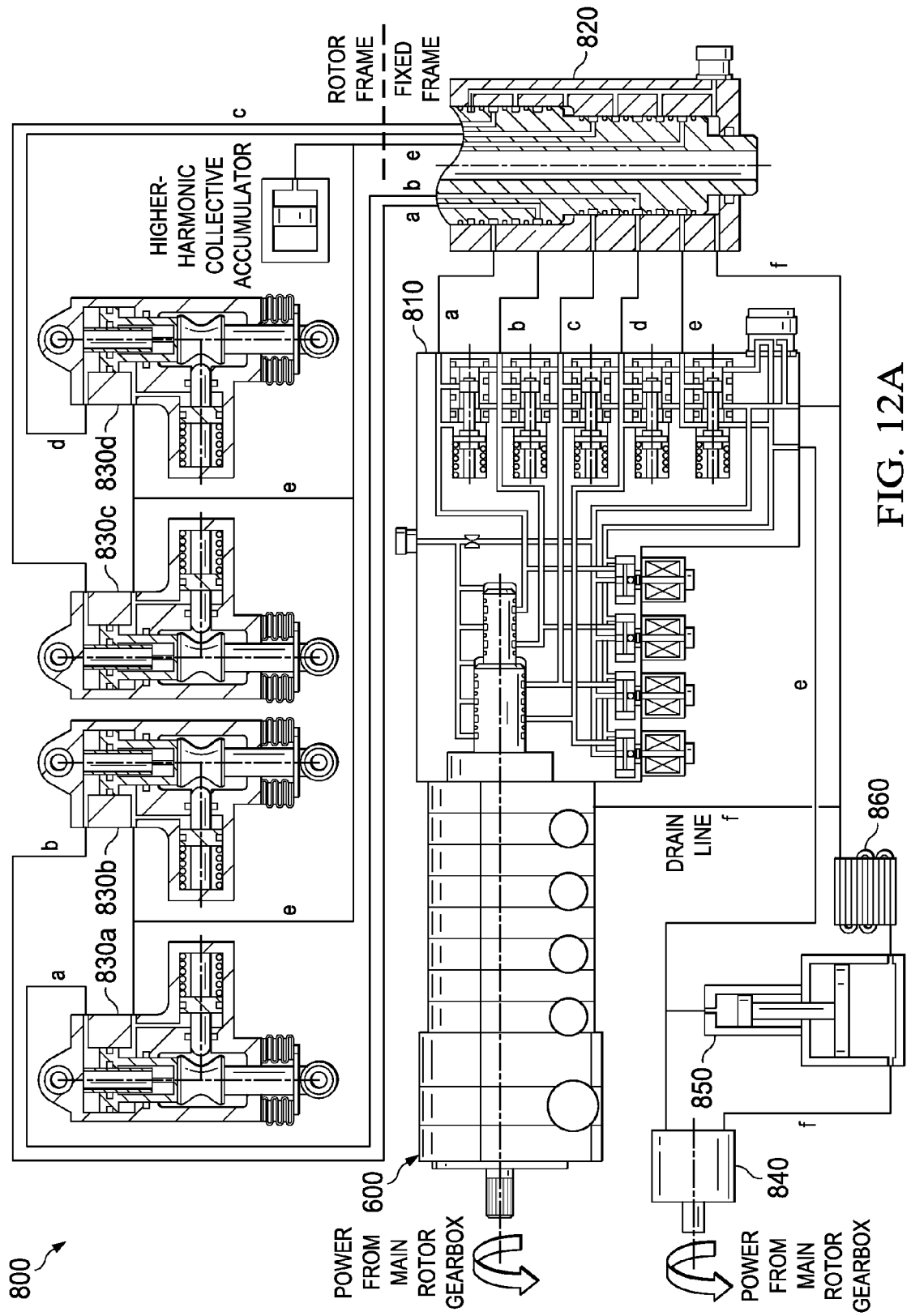
FIGS. 12A-12E show an individual blade control (IBC) system featuring the radial fluid device of FIGS. 10A-10S according to one example embodiment.

FIG. 12A shows an IBC system 800 according to one example embodiment. IBC system 800 is a partial-authority IBC system that features radial fluid device 600, a hydraulic control manifold 810, a hydraulic swivel 820, four pitch link actuators 830a-830d (corresponding to rotor blades 120a-120d), a hydraulic pump 840, a hydraulic reservoir 850, and a heat exchanger 860.

As shown in FIGS. 12A-12E, IBC system 800 may include a variety of fluid lines that provide fluid communication between multiple components. For convenience, some of these fluid lines have been labeled "a," "b," "c," "d," "e," or "f." In these example embodiments, labels "a"-"d" correspond with chambers 604a-604d and blades 120a-120d. For example, fluid line "a" may represent a fluid line in the path between chamber 604a and blade 120a. Fluid line "e" may refer to system fluid, and fluid line "f" may refer to return fluid, both of which are described in greater detail below.

In operation, according to one example embodiment, radial fluid device 600 provides hydraulic fluid to hydraulic control manifold 810. Hydraulic control manifold directs the fluid through hydraulic swivel 820, which is configured to transfer the fluid flow from the fixed-frame portion of the rotorcraft to the rotating-frame portion of the rotorcraft. In one example embodiment, hydraulic swivel 820 provides the fluid up along the drive shaft to pitch link actuators 830a-830d, which converts pressure changes in the supplied hydraulic fluid into movements of rotor blades 120a-120d.

In addition to providing fluid from radial fluid device 600 to pitch link actuators 830a-830d, IBC system 800 also provides system fluid from hydraulic pump 840 to pitch link actuators 830a-830d. This system fluid represents a constant-pressure fluid supply. Teachings of certain embodiments recognize that the supply fluid may not necessarily stay constant, such as due to leakage or other effects that may change the pressure of the supply fluid. The supply fluid may be provided to pitch link actuators 830a-830d to provide a balance against the pressures of the hydraulic fluid from radial fluid device 600. Excess fluid may also be accumulated through hydraulic control manifold 810 and hydraulic swivel 820, passed through heat exchanger 860, and stored in hydraulic reservoir 850 before being resupplied to hydraulic pump 840.

Figure 12B:
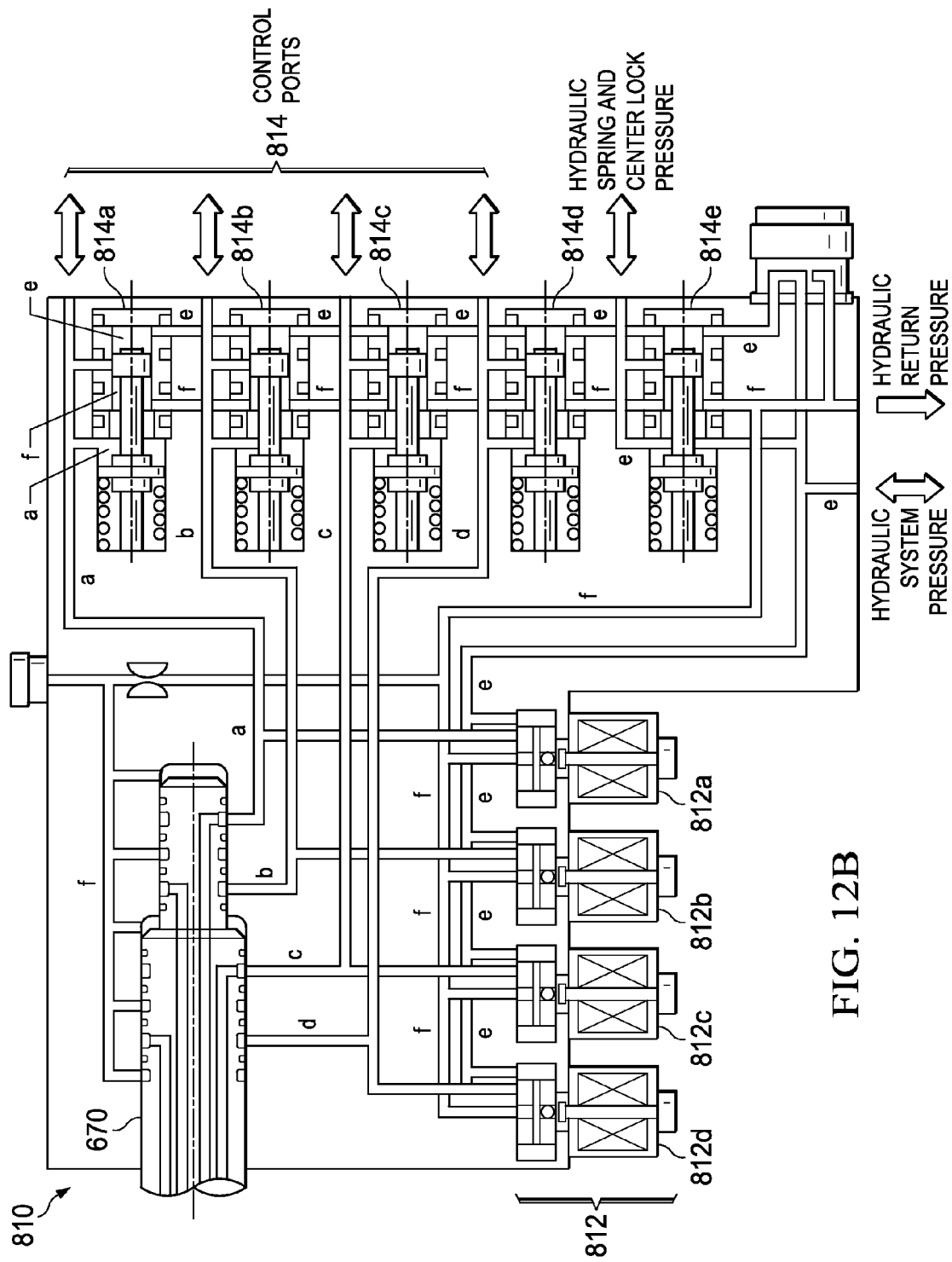

FIG. 12B shows hydraulic control manifold 810 according to one example embodiment. Hydraulic control manifold 810 features valves 812 and control ports 814.

In operation, according to one example embodiment, hydraulic control manifold 810 receives fluid from chambers 604a-604d of radial fluid device 600 and communicates the fluid to valves 812 and control ports 814. In this example embodiment, hydraulic control manifold 810 receives the fluid from chambers 604a-604d through manifold 670, which rotates with cylinder block 604. Manifold 670 includes ports for each chamber 604a-604d. In addition, manifold 670 includes seals around each port for chambers 604a-604d. Furthermore, manifold 670 includes return ports to accumulate leaking hydraulic fluid and return the accumulated hydraulic fluid to reservoir 850.

Radial fluid device 600 may not include provisions for independently trimming pitch link actuator stroke position to equalize their lengths and maintain IBC operation about a center stroke. Accordingly, hydraulic control manifold 810 may include valves 812 operable to trim the position of each pitch link actuator 830a-830d and to compensate for leaking hydraulic fluid. In one example embodiment, valves 812 are three-way direct drive valves.

Valves 812 may add supply fluid to fluid lines a-d if the fluid pressure falls below a threshold. Alternatively, valves 812 may remove fluid from fluid lines a-d associated if the fluid pressure rises about a threshold. In one example embodiment, valves 812 receives measurements from position sensors associated with pitch link actuators 830a-830d and then adds fluid to or removes fluid from the fluid lines a-d based on the received measurements. The measurements from the position sensors may indicate, for example, the amount of fluid that has leaked from various fluid lines within IBC system 800. As another example, the measurements from the position sensors may indicate whether fluid line pressure should be adjusted to trim the position of each pitch link actuators 830a-830d.

In one example embodiment, valves 812 may adjust for drift and leakage in IBC system 800, but valves 812 may not drive high-frequency changes in system pressure. Rather, high-frequency changes may be implemented by radial fluid device 600. Teachings of certain embodiments recognize that only using valves for low-frequency changes in system pressure may reduce the necessary size of the valves and increase longevity of the valves.

Control ports 814 communicate fluid between hydraulic control manifold 810 and hydraulic swivel 820. Teachings of certain embodiments recognize that control ports 814 may also terminate fluid flow in the event of some system failures. In the example of FIG. 12B, each control port 814 is equipped with a solenoid bypass valve. In the event of a partial-authority system failure requiring isolation from the conventional flight control system, for example, IBC system 800 may remove power to the solenoid bypass valves associated with each control port 814. In response, control ports 814 cut off pressure to their pressure relief/bypass valves, causing them to redirect system fluid to the hydraulic fluid return lines f that lead back to reservoir 850. Redirecting system fluid prevents the system fluid from reaching the pitch link actuators 830a-830d, which as will be explained in greater detail below, causes the pitch link actuators 830a-830d to lock at their center stroke position.

Figure 12C:
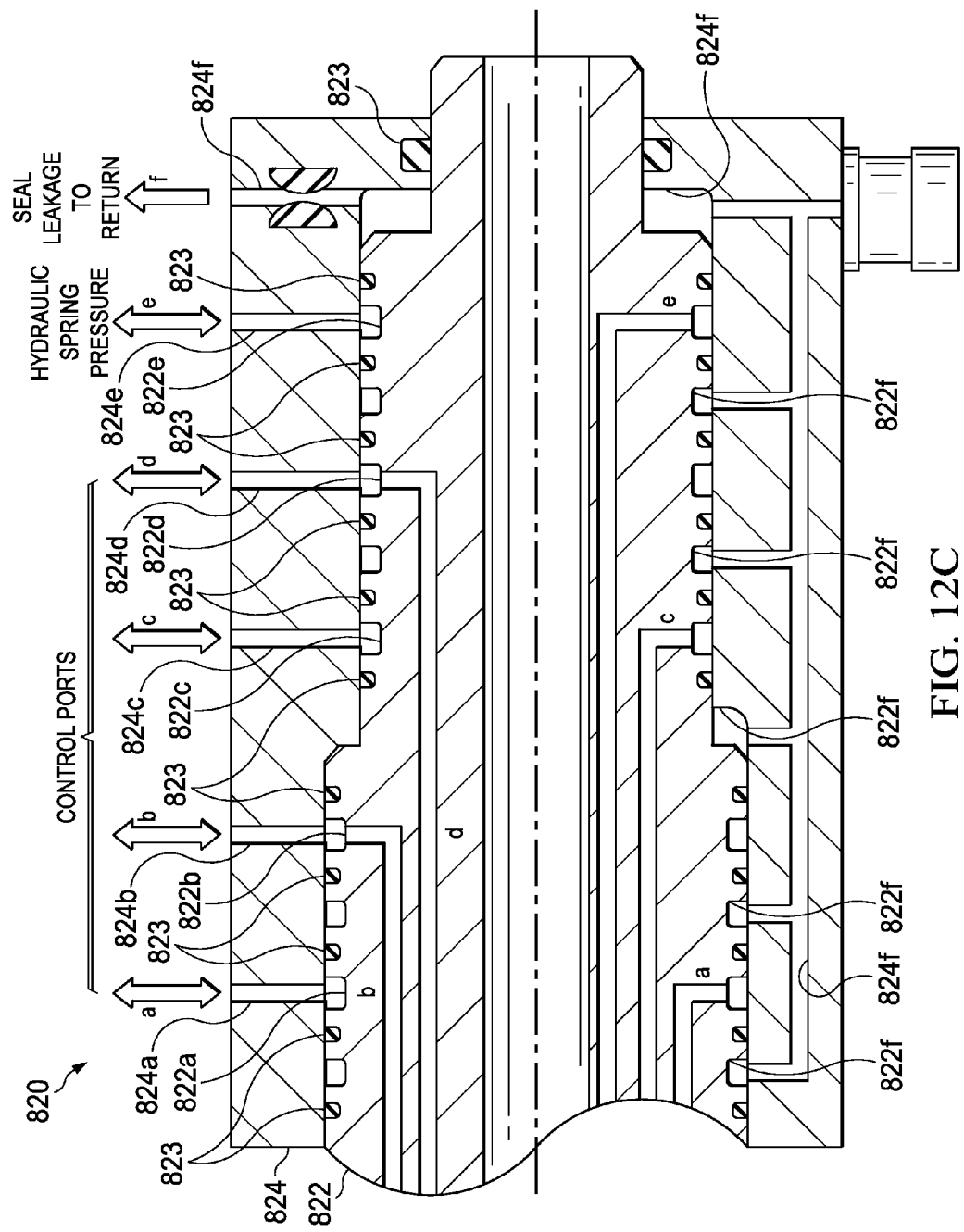

FIG. 12C shows hydraulic swivel 820 according to one example embodiment. Hydraulic swivel 820 includes a rotating portion 822 and a stationary portion 824. Rotating portion 822 includes ports 822a-822d that communicates fluid between pitch link actuators 830a-830d and non-rotating portion 824. Rotating portion 822 also includes port 822e, which communicates system fluid between pitch link actuators 830a-830d and non-rotating portion 824. Rotating portion 822 includes port 822f, which communicates return fluid between pitch link actuators 830a-830d and non-rotating portion 824.

Rotating portion also includes rotary seals 823 between each port 822a-822f. Teachings of certain embodiments recognize that providing both port 822f for return fluid and seals 823 may extend seal life and reduce or eliminate issues associated with nuisance leakage.

Rotating portion also includes wiring for communicating signals from pitch link actuators 830a-830d to the non-rotating portions of IBC system 800. In one example embodiment, the wiring includes wires for each position sensor associated with the pitch link actuators 830a-830d plus three common wires providing excitation power.

Stationary portion 824 includes fluid lines 824a-824d that communicates fluid between ports 822a-822d and fluid lines a-d. Stationary portion 824 also includes fluid line 824e, which communicates fluid between port 822e and fluid line e. Stationary portion 824 includes fluid line 824f, which communicates fluid between port 822f and fluid line f.

Figure 12E:
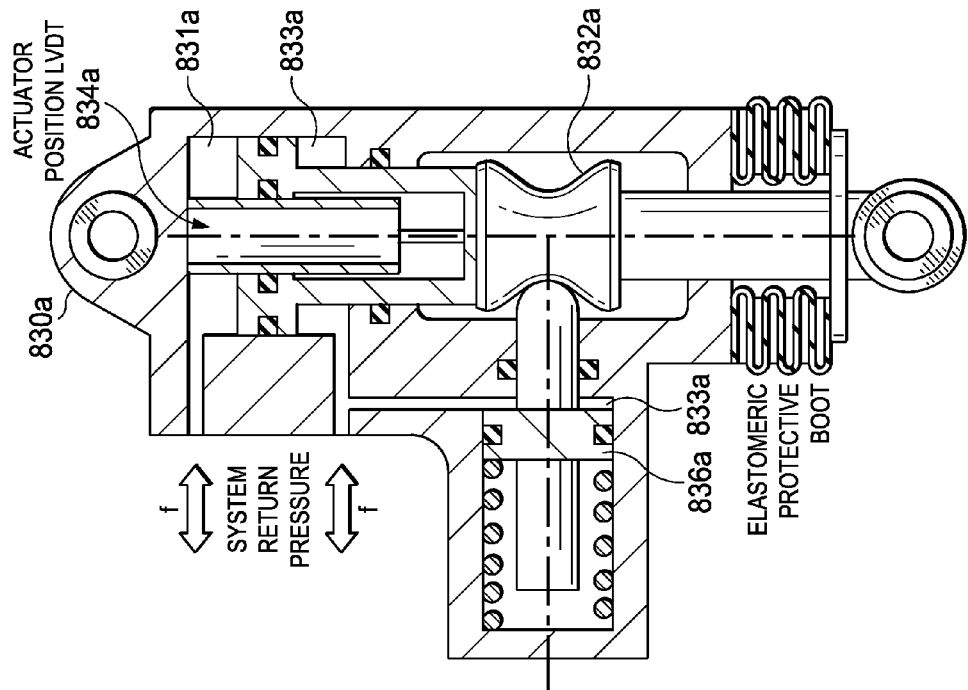
Figure 12D:
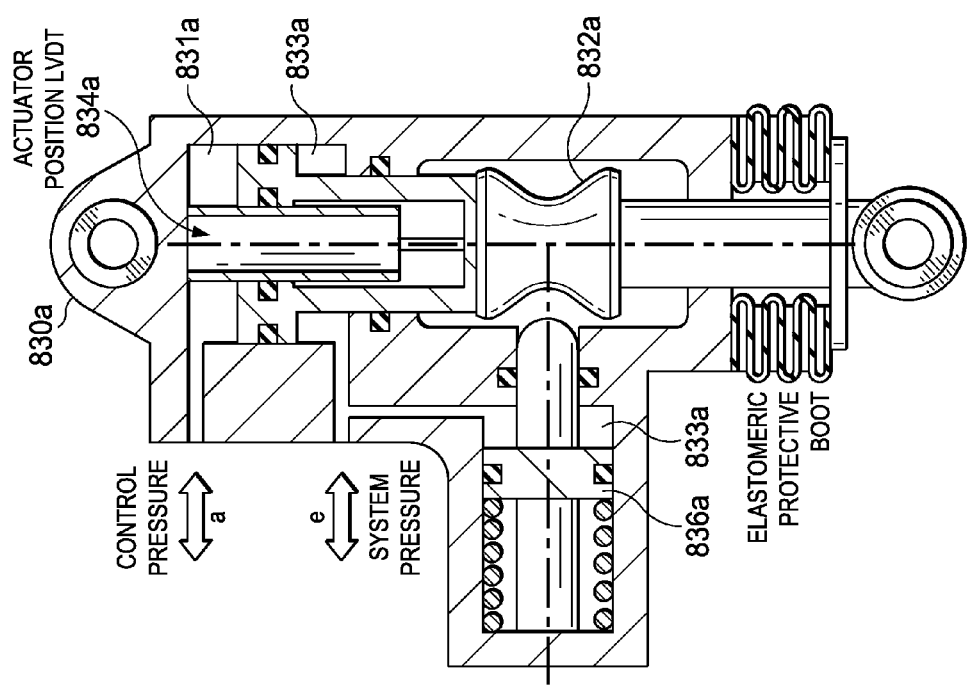

FIG. 12D shows pitch link actuator 830a according to one example embodiment. Pitch link actuator 830a is operable to change the position of blade 120a during operation of rotorcraft 100. Similarly, pitch link actuators 830b-830d are operable change the positions of blades 120b-120d, respectively.

In one example embodiment, pitch link actuator 830a may be coupled between hub 114 and swashplate 116 such that pitch link actuator 830a may change the distance between hub 114 and swashplate 116. In this example, pitch link actuator 830a is coupled between hub 114 and swashplate 116 but not necessarily coupled to hub 114 and/or swashplate 116. For example, pitch link actuator 830a may be coupled to other components in mechanical communication with hub 114 and/or swashplate 116. In addition, pitch link actuator 830a may only change one measurement of a distance between hub 114 and swashplate 116. For example, pitch link actuator 830a may change the distance between hub 114 and swashplate 116 proximate to pitch link actuator 830a, whereas the distance between hub 114 and swashplate 116 proximate to pitch link actuator 830b may remain the same.

In the example of FIG. 12D, pitch link actuator 830a includes a linear hydraulic actuator that includes a piston 832a that separates a control chamber 831a from a system chamber 833a. Control chamber 831a receives fluid from line a. System chamber 833a receives controlled system fluid from line e. In operation, piston 832a moves in response to a pressure difference between fluid in control chamber 831a and fluid in system chamber 833a.

In the example of FIG. 12D, piston 832a is unbalanced. The piston area on the side of control chamber 831a is greater than the piston area on the side of system chamber 833a. In this example, system fluid in system chamber 833a may prevent hydraulic cavitation from occurring by creating a constant-force, hydraulic-spring effect on piston 832a.

Teachings of certain embodiments recognize that pitch link actuators 830a-830d may conserve hydraulic power during operation. For example, during higher-harmonic cyclic and reactionless motions, the total net flow used by pitch link actuators 830a-830d may be near zero due to the summed opposing sinusoidal flow demands canceling. For example, during reactionless motions, a downstroke by piston 832a may be offset by an upstroke by piston 832b.

On the other hand, higher-harmonic collective motions may require significantly more fluid to move all blades sinusoidally in unison. In this example, pitch link actuators 830a-830d may push a large volume of fluid back into the remaining components of IBC system 800 or pull a large volume of fluid out of the remaining components of IBC system 800. Teachings of certain embodiments recognize, however, that hydraulic accumulator may capture and recover this hydraulic energy on the rotor-frame side of IBC system 800. In the example of FIG. 12A, the hydraulic accumulator is connected to the system fluid line e.

In the example of FIG. 12D, pitch link actuator 830a also includes a position sensor 834a. Position sensor 834a may measure the displacement distance of piston 832a. One example of position sensor 834a may include a linear variable differential transformer. Position sensor 834a may be used as part of a feedback control system. For example, the cams of radial fluid device 600 may be programmed so as to produce an expected displacement distance of piston 832a. If position sensor 834a measures a displacement distance different from the expected displacement distance, one or more problems could be the cause. For example, IBC system 800 could be leaking fluid, which may change the pressure difference between fluid in chambers 831a and 833a, which would change the displacement distance of piston 832a. In response, IBC system 800 may take one or more corrective actions. As one example, the cams of radial fluid device 600 may be repositioned to achieve the expected displacement distance. As another example, valves 812 may add fluid to or remove fluid from the fluid lines (e.g., fluid lines a-e) to adjust the fluid pressures in pitch link actuator 830a. In some embodiments, adjusting the cams of radial fluid device 600 may be more appropriate for making large changes in fluid pressure, whereas adjusting valves 812 may be more appropriate for smaller changes or trimming of fluid pressure.

In the example of FIG. 12D, pitch link actuator 830a also includes a stroke lock 836a. Stroke lock 836a may prevent piston 832a from moving in the event of system failure. As shown in FIG. 12D, stroke lock 836a separates the system fluid from a spring. The spring provides an opposing force to the pressure from the system fluid. If, for example, the pressure from the system fluid is reduced or eliminated, force from the spring pushes the spring lock 836a towards piston 832a and prevents piston 832a from moving, as shown in FIG. 12E. Such a scenario might occur, for example, if control port 814e prevents system fluid from reaching pitch link actuator 830a.

Full-Authority IBC

The example radial fluid device 600, described above, generates displacement changes to drive higher-harmonic motions (e.g., 2/rev through 6/rev) but does not necessarily generate fundamental cyclic motions (e.g., 1/rev). In some embodiments, it may be possible for radial fluid device 600 to provide fundamental cyclic motions by providing a single-lobed pump section similar to pump section 620. In some circumstances, however, fundamental cyclic motions must be implemented more quickly than higher-harmonic motions because the pilot may steer the direction of the rotorcraft through fundamental cyclic motions. In these circumstances, the radial piston approach used by radial fluid device 600 to implement higher-harmonic motions may be too slow for fundamental cyclic motions. Thus, in some embodiments, the higher-harmonic approach described with regard to radial fluid device 600 may not be suitable for fundamental cyclic motions.

In some embodiments, it may also be possible to implement fundamental cyclic motions using the valves 812 of IBC system 800. For example, valves 812 may be capable of changing fluid line pressures so as to implement fundamental cyclic motions on pitch link actuators 830a-830d. As explained above, however, valves 812 may be more suitable for implementing small pressure changes, whereas fundamental cyclic motions may require large pressure changes in the fluid lines. Increasing the valve flow gain in valves 812 to implement these large pressure changes may increase the risk of hard-over failures. In addition, the power consumed and heat generated by valves 812 in this scenario may raise additional issues.

Teachings of certain embodiments recognize the capability to generate fundamental cyclic actuator motions quickly while still protecting against hard-over failures, conserving hydraulic power, and minimizing heat generation. Teachings of certain embodiments also recognize the capability to eliminate the mechanical rotor swashplate from a rotor system by hydraulically generating the fundamental cyclic motions.

Figure 13B:
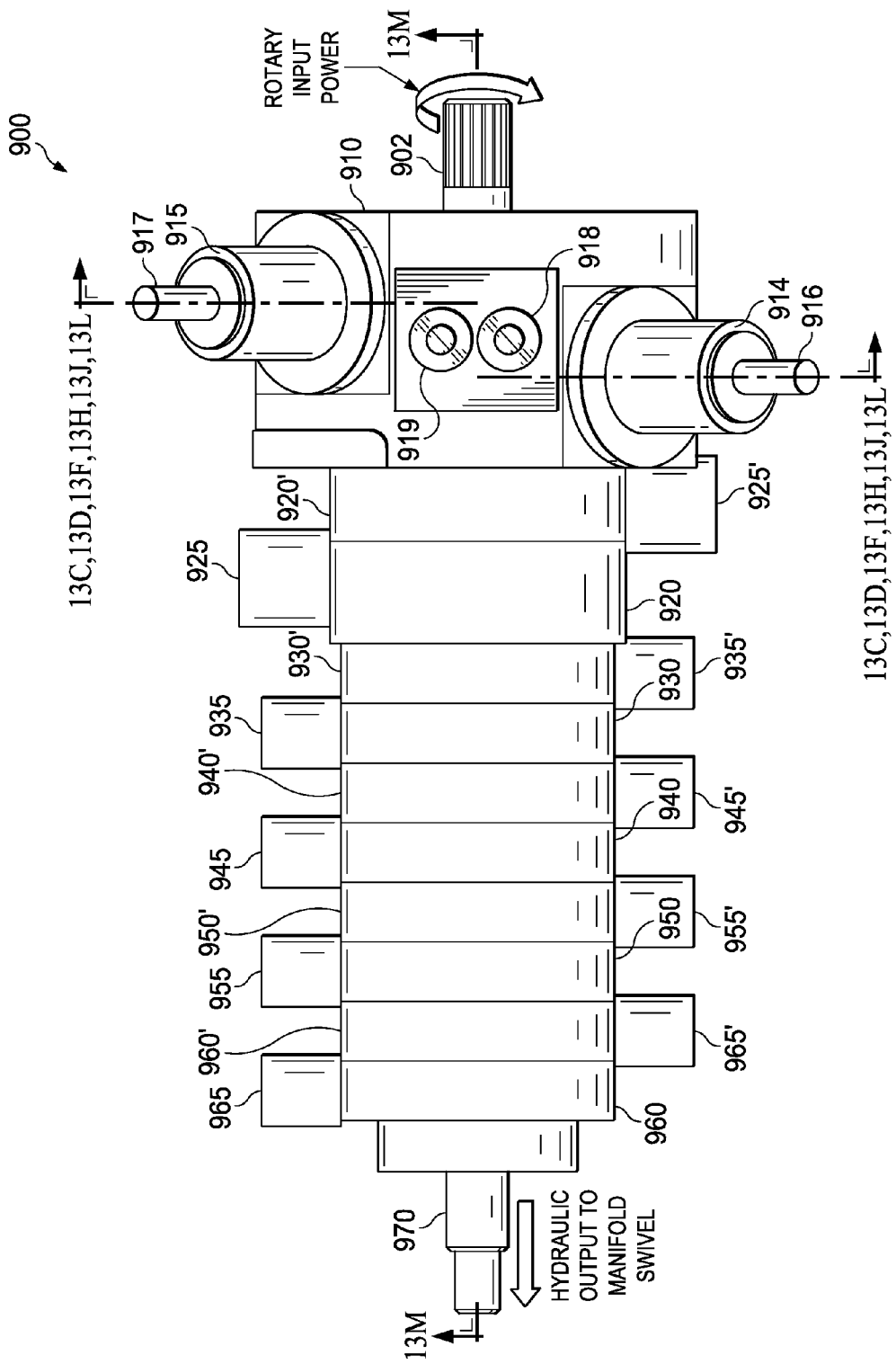

FIGS. 13A-M show a radial fluid device 900 according to one example embodiment. FIG. 13A shows a side view of radial fluid device 900, and FIG. 13B shows a top view of radial fluid device 900. Radial fluid device 900 features multiple stacked radial piston sections rotating together in conjunction with a common cylinder block 904 (not shown in FIGS. 13A and 13B).

In the example of FIGS. 13A-13M, radial fluid device 900 features a fundamental cyclic pump 910 as well as stacked radial piston sections 920-960 and 920'-960' rotating together with shaft 902, cylinder block 904, and manifold 970. Embodiments of stacked radial piston sections 920-960 and 920'-960' may resemble and operate similarly to stacked radial piston sections 620-660 and 620'-660'.

As will be shown in greater detail below, shaft 902 is coupled to cylinder block 904. In some embodiments, shaft 902 is removably coupled to cylinder block 904. For example, different shafts 902 may have different gear splines, and an installer may choose from among different shafts 902 for use with radial fluid device 600.

Cylinder block 904 rotates within radial fluid device 900. In the example of FIGS. 10A-10M, the axis of rotation of cylinder block 904 is coaxial with shaft 902. Bearings may separate cylinder block 904 from the non-rotating body of radial fluid device 900.

Fundamental cyclic pump 910 and each pump section pair (e.g., sections 920 and 920', 930 and 930', etc.) are dedicated to generating the desired waveform for a specific frequency. In the example of FIGS. 13A-13M, fundamental cyclic pump 910 is dedicated to generating desired waveforms for fundamental cyclic motions (1/rev), and the pump section pairs are dedicated to generating desired waveforms for 2/rev through 6/rev.

Although the pump section pairs in radial fluid device 900 are dedicated to generating desired waveforms for 2/rev through 6/rev, teachings of certain embodiments recognize that other fluid devices may include pump sections dedicated to generating more, fewer, or different desired waveforms. For example, the performance benefits provided by some frequencies may be minimal, and the pump sections generating these frequencies would be eliminated. As one example, a variation of radial fluid device 900 may only feature pump sections dedicated to 2/rev (reactionless) and 4/rev (collective harmonic), with the fundamental cyclic motions (1/rev) generated by fundamental cyclic pump 910.

Separate section frequencies from fundamental cyclic pump 910 and each pump section pair in radial fluid device 900 may be hydraulically summed together to generate a final desired waveform to each actuator, such as described above with regard to FIG. 9B. In particular, as will be explained in greater detail below, manifold 970 transmits the hydraulically summed fluids from radial fluid device 900 to actuators corresponding to each blade in a rotor system.

Figure 13C:
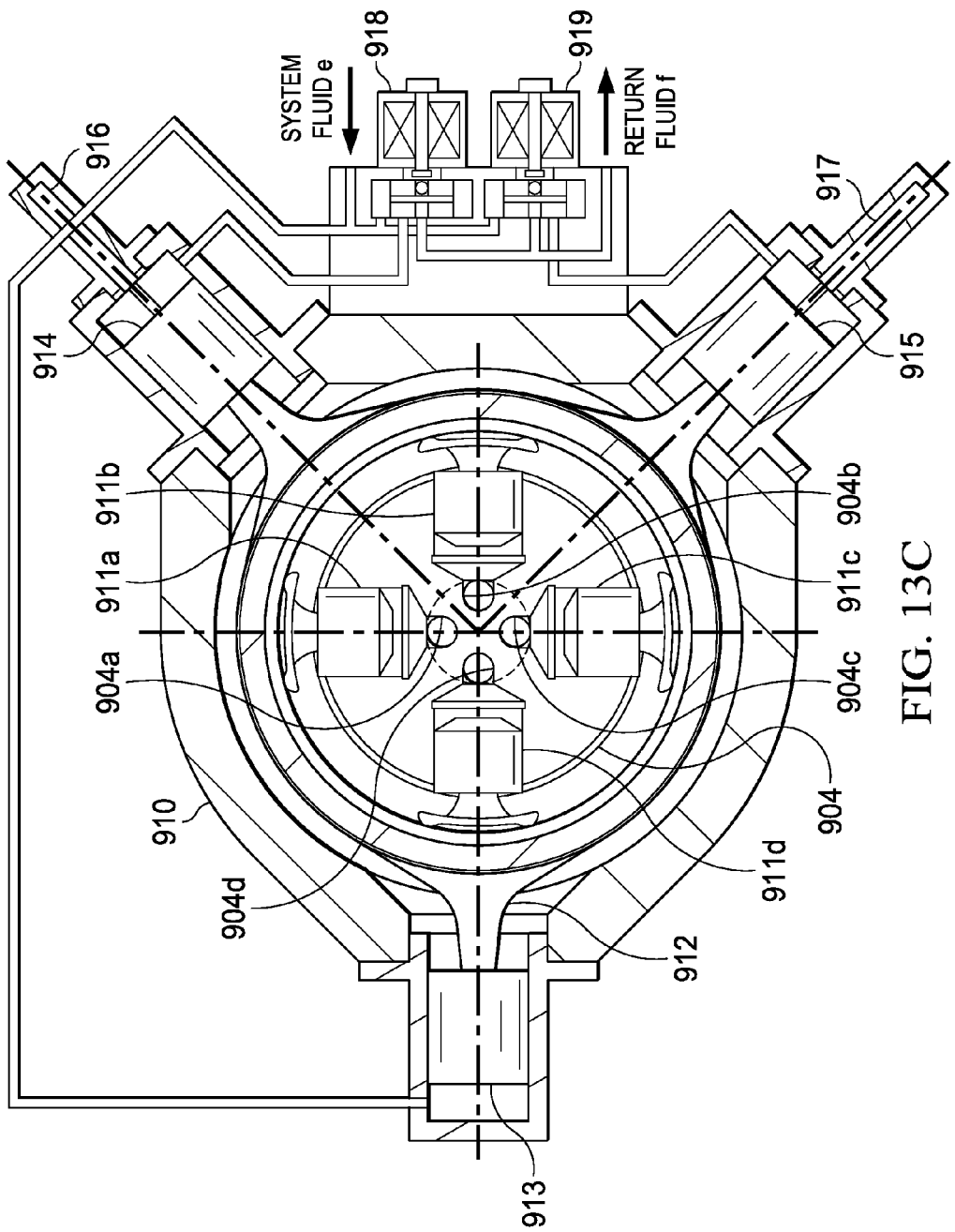

FIG. 13C shows a cross-section view of fundamental cyclic pump 910 along the cross-section line indicated in FIG. 13B. Fundamental cyclic pump 910 features four pistons 911a-911d. Each piston 911a-911d is slidably received within a corresponding cylinder associated with chambers 904a-904d. Each chamber 904a-904d represents a plurality of cylinders within cylinder block 904 that are in fluid communication. Each chamber 904a-904d may have an independent outlet port that exits radial fluid device 900 to control a different IBC actuator.

Fundamental cyclic pump 910 also features cam 912. During operation, pistons 911a-911d stroke inwards and outwards depending on the distance between cam 912 and the axis of rotation of cylinder block 904. Each piston 911a-911d reciprocates towards and away from the axis of rotation of cylinder block 604. Each reciprocation towards and away from the axis of rotation thus includes two strokes: a down stroke and an up stroke.

In the example of FIG. 13C, cam 912 is a circular cam and has one lobe. The number of lobes indicates how many sinusoidal stroke motions a piston completes during one full rotation of cylinder block 904. For example, each piston 911a-911d completes one sinusoidal stroke motion during one rotation of cylinder block 904. The ability of fundamental cyclic pump 910 to complete one sinusoidal stroke motion during one rotation corresponds to the one blade oscillation per revolution required for fundamental cyclic motions.

Repositioning cam 912 may change the displacement distance for each piston 911a-911d. In the example of FIG. 13C, positioning pistons 913, 914, and 915 may reposition cam 912. In this example, positioning piston 913 is coupled to cam 912, and positioning pistons 914 and 915 are coupled to a crank associated with cam 912.

Cam 912 may be repositioned by varying the pressure in at least one of the cylinders associated with positioning pistons 913, 914, and 915. Positioning pistons 913, 914, and 915 may allow cam 912 to be translated in two perpendicular axis, similar to swashplate lateral and longitudinal motions. The housing surrounding cam 912 may be dimensioned to provide stops limiting lateral and longitudinal cyclic travel.

In the example of FIG. 13C, fluid in the cylinder associated with positioning piston 913 is maintained at a relatively constant system pressure, and fluid in the cylinders associated with positioning pistons 914 and 915 may be varied to reposition cam 912. Positioning piston 913 may operate as a hydraulic spring to oppose the forces exerted by positioning pistons 914 and 915.

In the example of FIG. 13C, fundamental cyclic pump 910 includes position sensors 916 and 917. Position sensors 916 and 917 may measure the displacement distance of positioning pistons 914 and 915, respectively. One example of position sensor may include a linear variable differential transformer.

Valves 918 and 919 may provide fluid to the cylinders associated with positioning pistons 913, 914, and/or 915. In some embodiments, valves 918 and 919 may change the size of their orifices to vary the pressure of fluid in the cylinders associated with positioning pistons 914 and 95. In one example embodiment, valves 918 and 919 are three-way direct drive valves. In some embodiments, valves 918 and 919 may be single coil or dual coil three-way valves.

In some circumstances, if cylinder block 904 is rotating (such as at rotor speed) and cam 912 is positioned concentric with the input shaft axis, pistons 911a-911d do not stroke. This scenario results in no fluid displacement control changes being sent to the IBC actuators for fundamental cyclic motions.

Figure 13D:
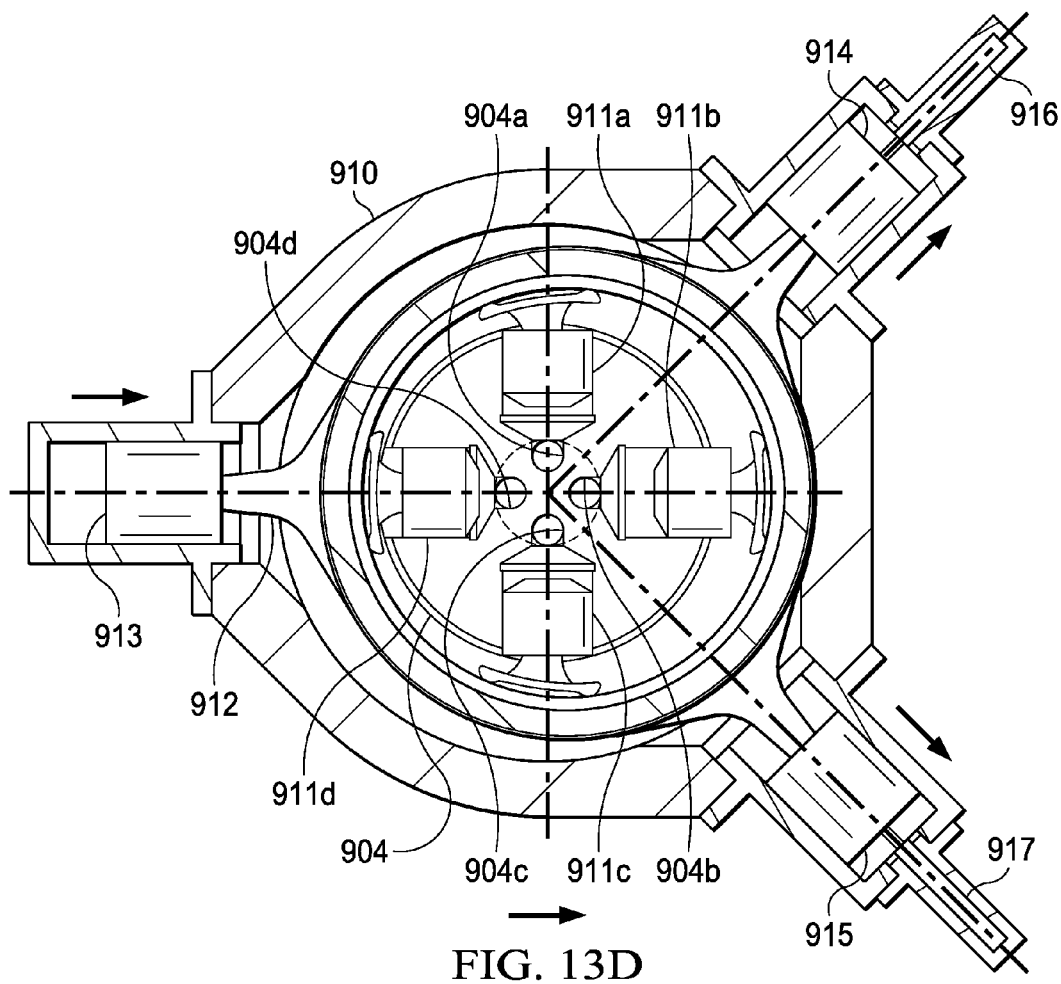
Figure 13E:
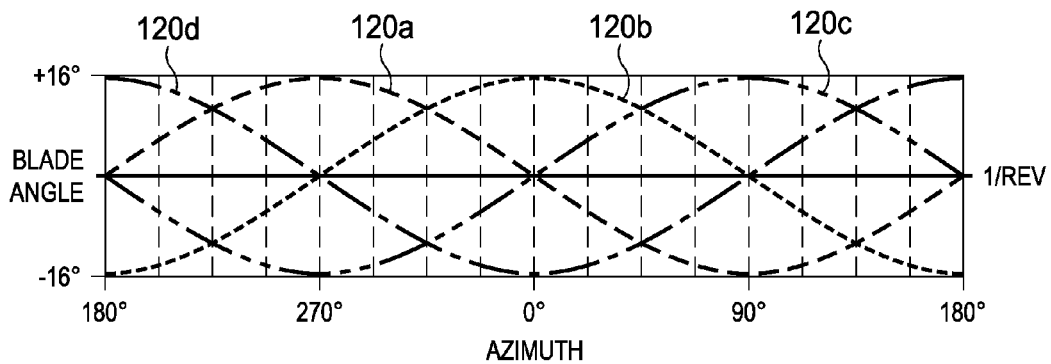

Translating cam 912 away from this concentric position, however, may result in fluid displacement control changes being sent to the IBC actuators for fundamental cyclic motions. FIG. 13D, for example, shows how retracting positioning pistons 914 and 915 may reposition cam 912. The example of FIG. 13D may correspond to a full-forward longitudinal cyclic position in some scenarios. Moving cam 912 as shown in FIG. 13D results in fundamental cyclic motions by each blade 120a-120d, as shown in FIG. 13E.

Figure 13F:
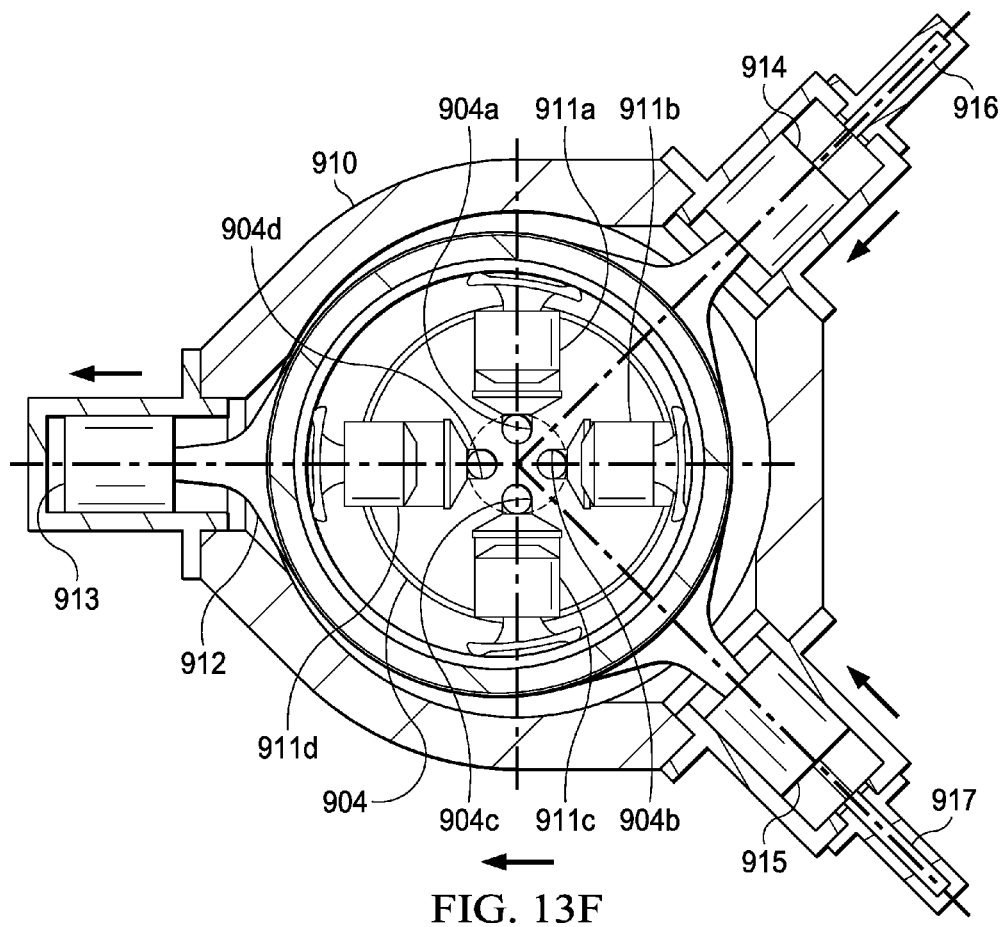
Figure 13G:
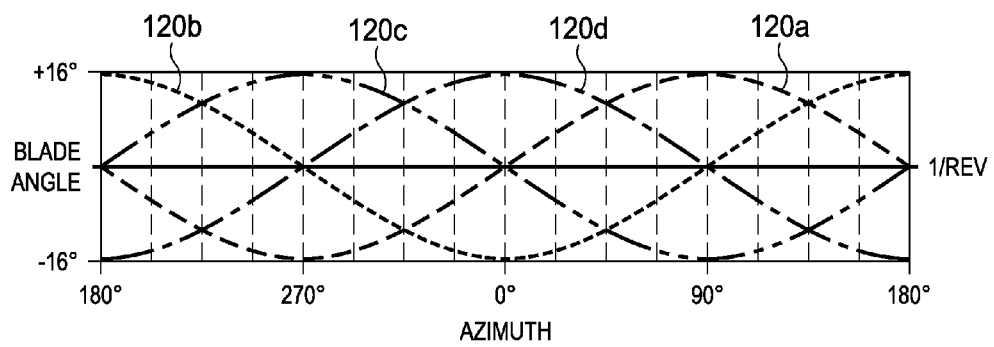

As another example, FIG. 13F shows how extending positioning pistons 914 and 915 may reposition cam 912. The example of FIG. 13F may correspond to a full-aft cyclic position in some scenarios. Moving cam 912 as shown in FIG. 13F results in fundamental cyclic motions by each blade 120a-120d, as shown in FIG. 13G. Comparing the examples of FIGS. 13E and 13G, blade 120a in FIG. 13E is 180 degrees out of phase with blade 120a in FIG. 13G.

Figure 13H:
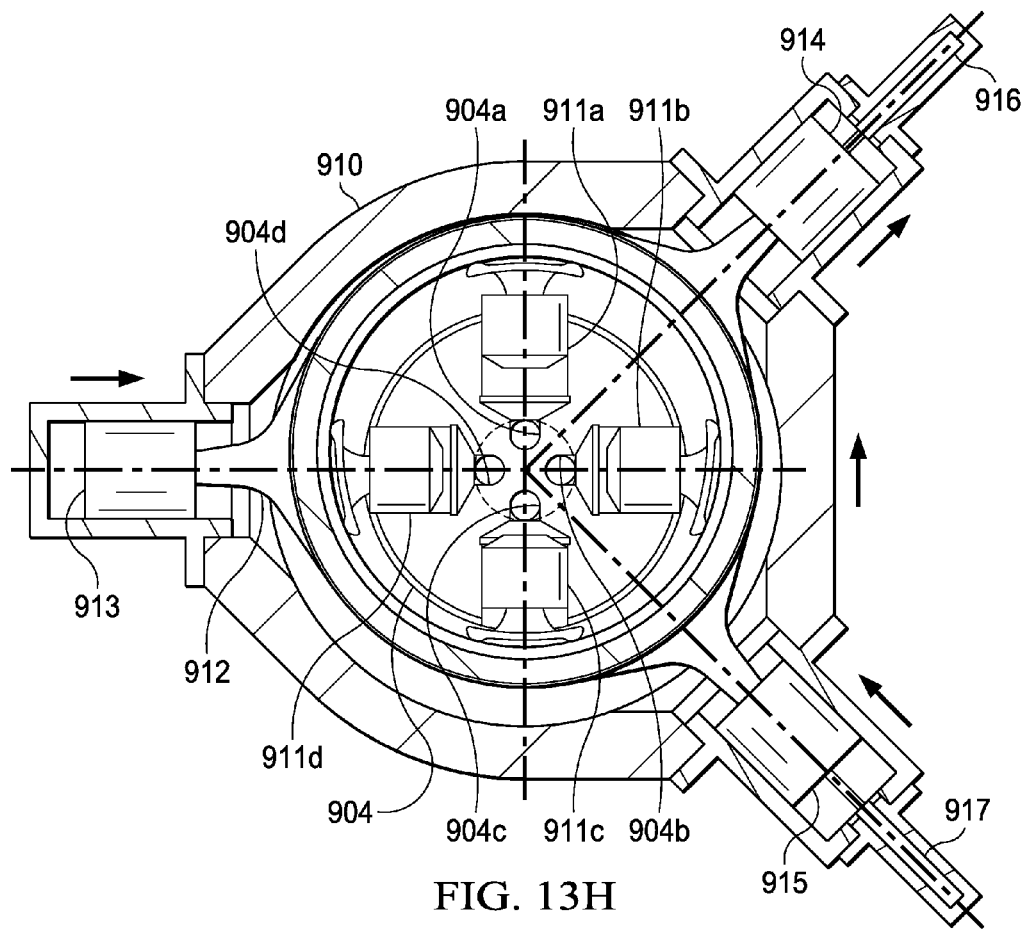
Figure 13I:
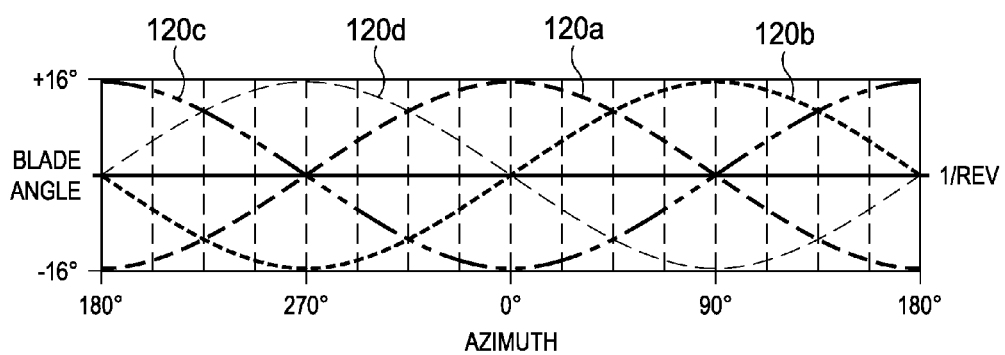

Fundamental cyclic pump 910 may also implement lateral cyclic motions as well as longitudinal cyclic motions. FIG. 13H, for example, shows how retracting positioning piston 914 and extending 915 may reposition cam 912. The example of FIG. 13H may correspond to a full-left lateral cyclic position in some scenarios. Moving cam 912 as shown in FIG. 13H results in fundamental cyclic motions by each blade 120a-120d, as shown in FIG. 13I.

Figure 13J:
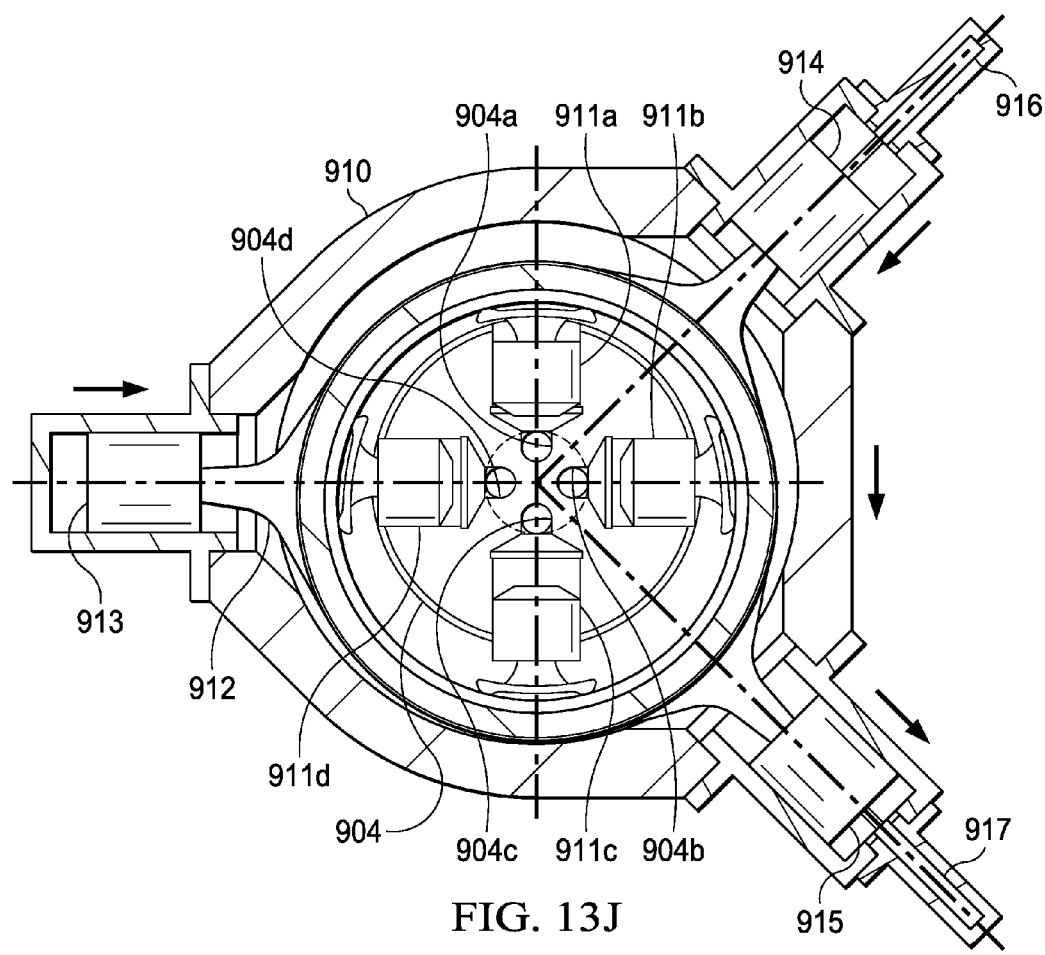
Figure 13K:
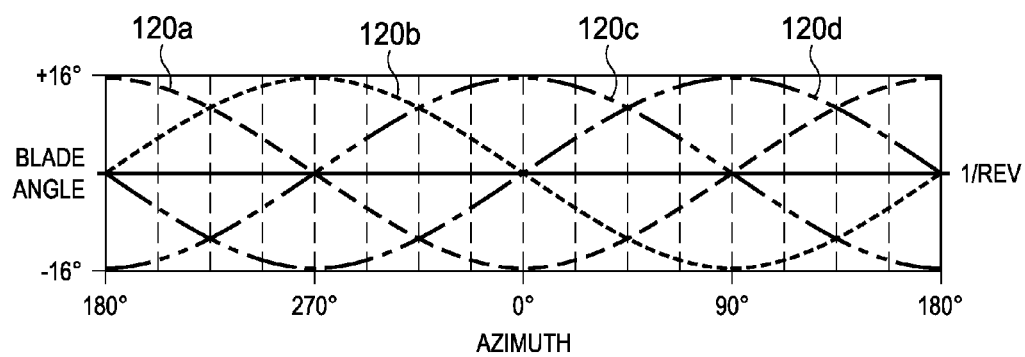

As another example, FIG. 13J shows how extending positioning piston 914 and retracting positioning piston 915 may reposition cam 912. The example of FIG. 13J may correspond to a full-right longitudinal position in some scenarios. Moving cam 912 as shown in FIG. 13J results in fundamental cyclic motions by each blade 120a-120d, as shown in FIG. 13K. Comparing the examples of FIGS. 13I and 13K, blade 120a in FIG. 13I is 180 degrees out of phase with blade 120a in FIG. 13K. Comparing the examples of FIGS. 13E and 13I, blade 120a in FIG. 13E is 90 degrees out of phase with blade 120a in FIG. 13I.

In the example of FIGS. 13A-13K, fundamental cyclic pump 910 is configured to provide fundamental cyclic motions in a four blade rotor system. Teachings of certain embodiments recognize, however, recognize that the concepts described with regard to fundamental cyclic pump 910 may be adapted to support IBC for rotor systems with more or fewer blades (e.g., two blades, three blades, five blades, six blades, seven blades, etc.).

Figure 13L:
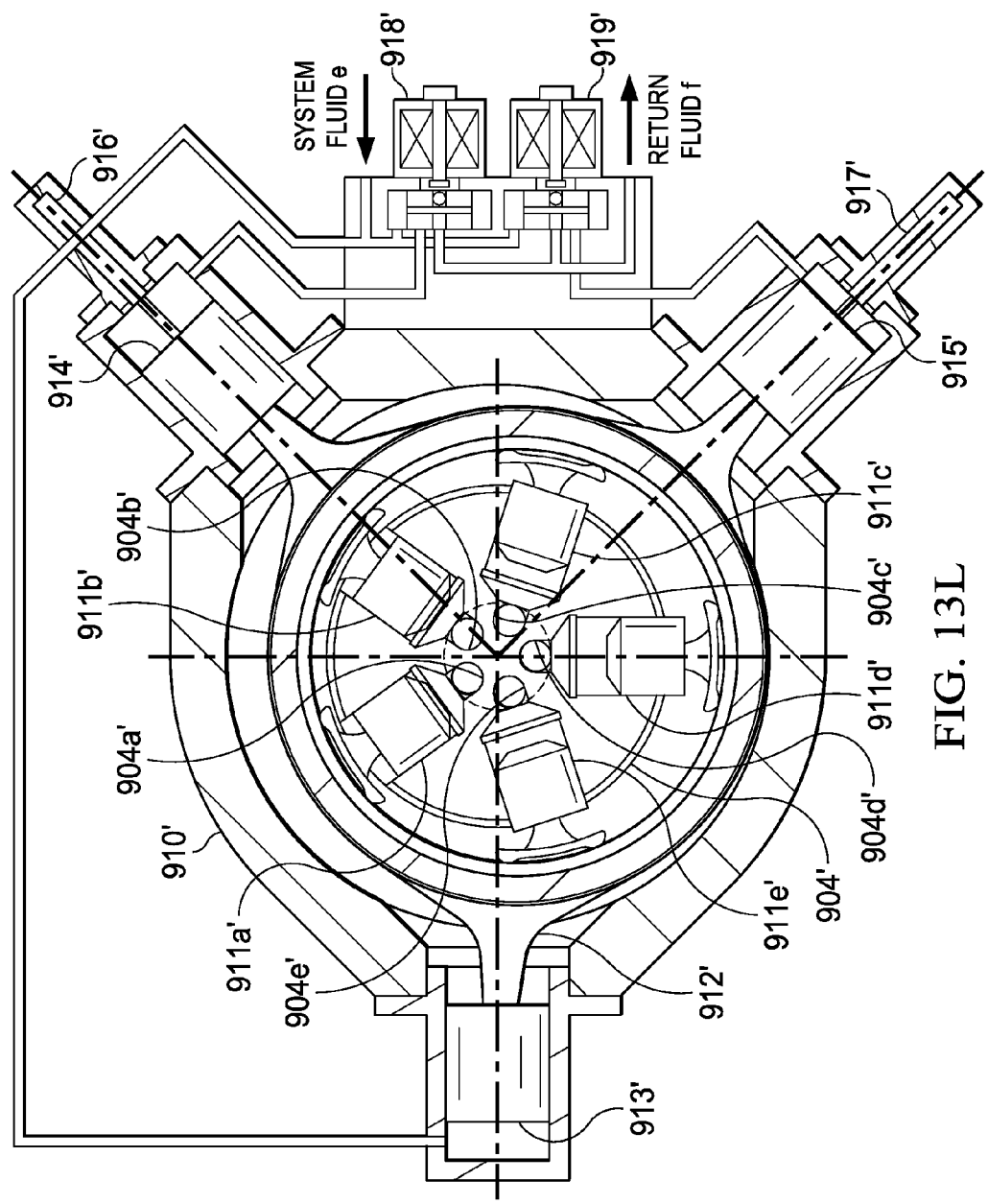
FIG. 13L show an alternative embodiment of the radial fluid device of FIGS. 13A-13K and 13M.

For example, FIG. 13L shows a fundamental cyclic pump 910' configured to provide IBC in a five-blade rotor system. In this example, fundamental cyclic pump 910' features five pistons 911a'-911e' corresponding to each blade in the five-blade rotor system. Fundamental cyclic pump 910' also features a cam 912', positioning pistons 913'-915', position sensors 916' and 917', and valves 918' and 919' that may operate in a similar manner to corresponding components in fundamental cyclic pump 910.

Figure 13M:
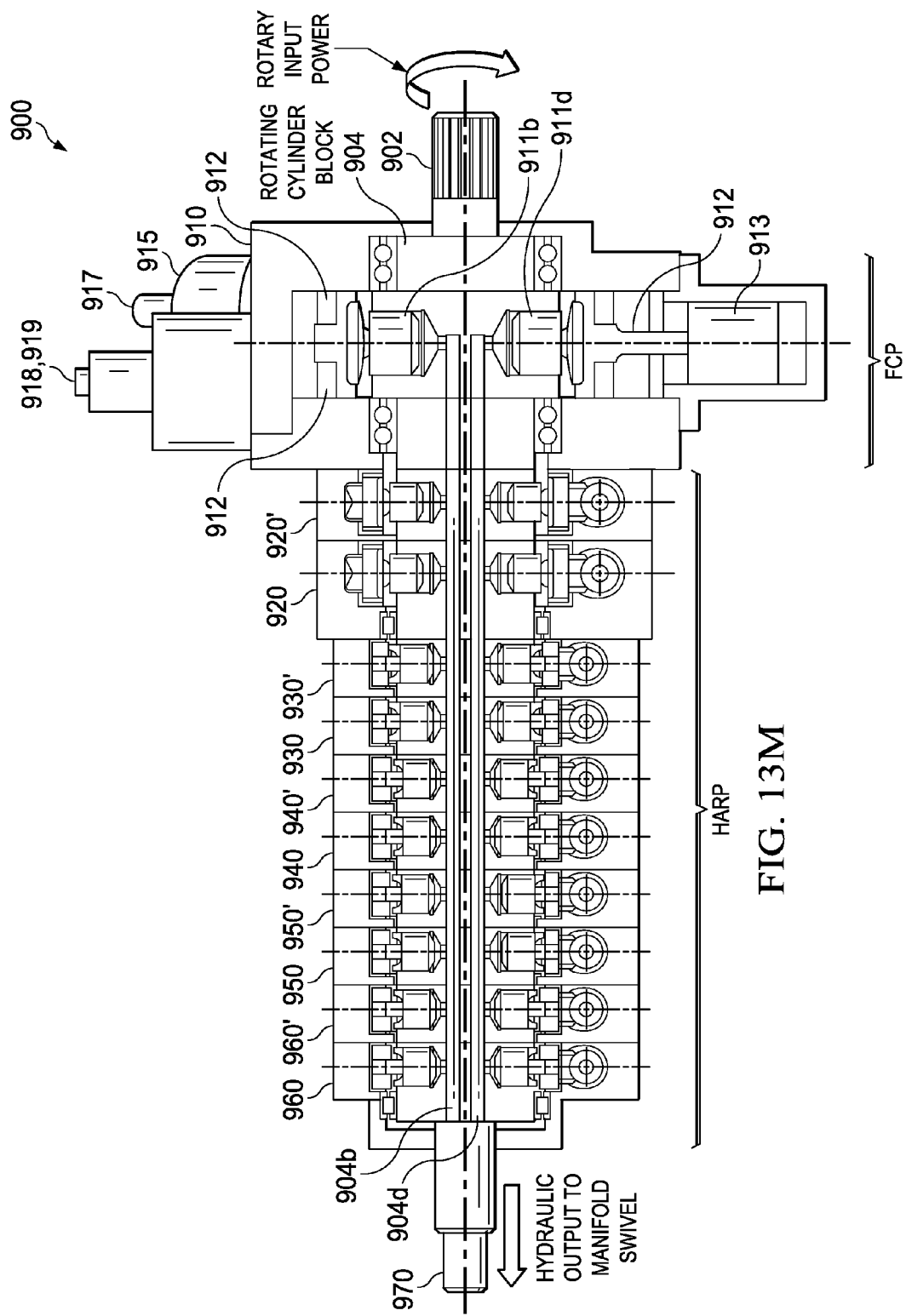

FIG. 13M shows a cross-section view of radial fluid device 900 along the cross-section line indicated in FIG. 13B. As shown in FIG. 13M, fundamental cyclic pump 910 and all pump sections generating frequencies 2/rev through 6/rev are situated about the same cylinder block 904. In addition, fundamental cyclic pump 910 and all pump sections share the same chambers 904a-904d. Each chamber 904a-904d is ported out of radial fluid device 900 through manifold 970. Manifold 970 may enable fluid communication between each chamber 904a-904d and a corresponding actuator with rotor blades 120a-120d (e.g., fluid communication between chamber 904a and the actuator associated with rotor blade 120a).

In some embodiments, cylinder block 904 may rotate at the same speed as drive shaft 112b. Teachings of certain embodiments recognize that rotating cylinder block 904 at the same speed as drive shaft 112b may allow harmonic outputs from radial fluid device 900 to be synchronized with the rotor blades 120a-120d rotating about drive shaft 112b. In the example of FIG. 13M, an exterior power source rotates shaft 902 at the same speed as drive shaft 112b, which causes cylinder block 904 to also rotate at the same speed.

Implementing Full-Authority IBC

As stated above, radial fluid device 900 may provide sinusoidal waveform amplitude and synchronization displacement control to multiple actuators for use in a full-authority IBC system. For example, radial fluid device 900 may include a fundamental cyclic pump and pump section pairs dedicated to generating desired waveforms for 1/rev through 6/rev. In this example, the mechanical swashplate, such as swashplate 116 of FIG. 2, may be eliminated of the rotor system. As will be explained in greater detail below, teachings of certain embodiments recognize the capability to convert harmonic pressure changes in hydraulic fluid within radial fluid device 900 into movements of blades 120a-120d.

Figure 14A:
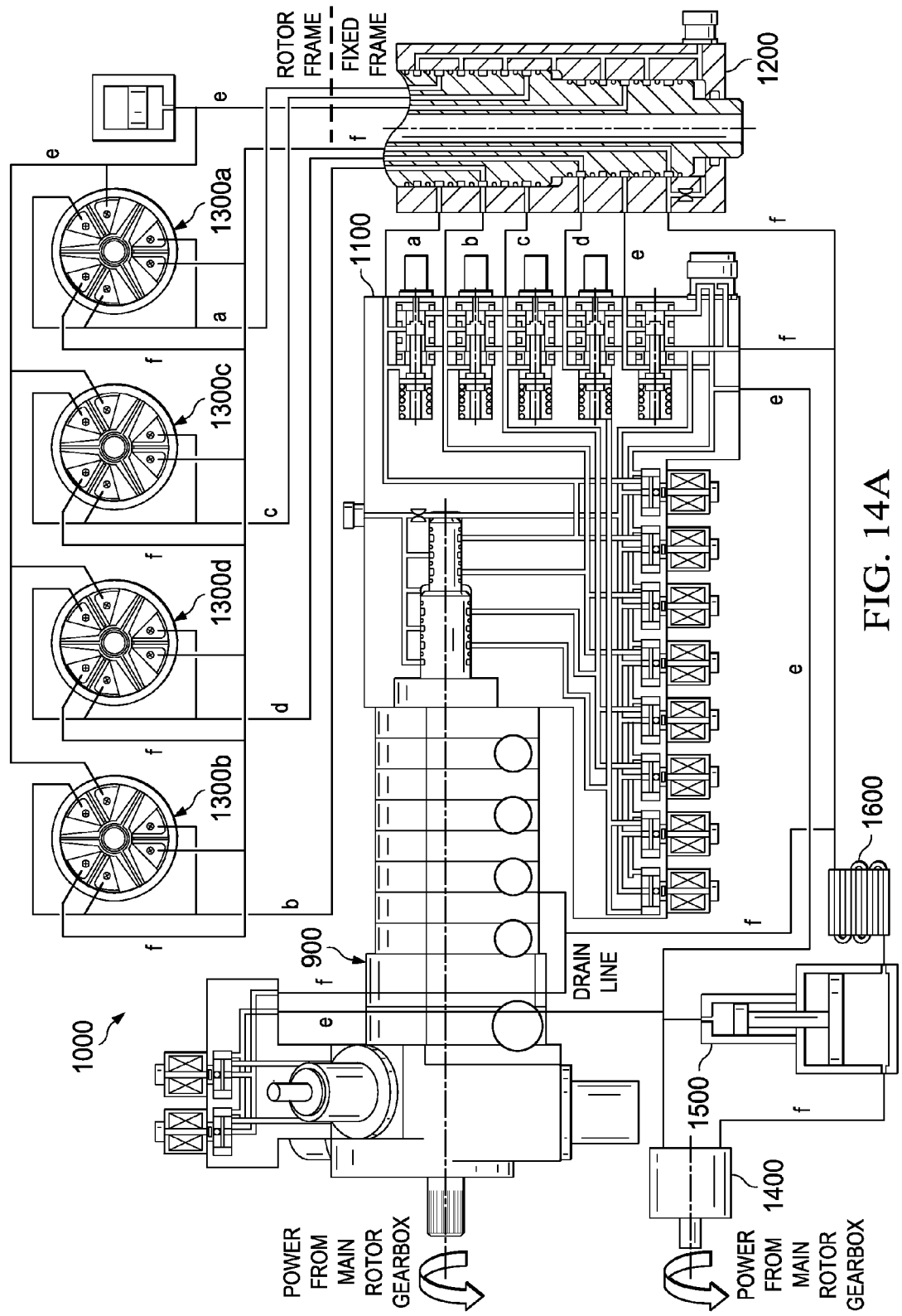
FIGS. 14A-14C show an IBC system featuring the radial fluid device of FIGS. 13A-13J and 13M according to one example embodiment.

FIG. 14A shows an IBC system 1000 according to one example embodiment. IBC system 1000 is a full-authority IBC system that features radial fluid device 900, a hydraulic control manifold 1100, a hydraulic swivel 1200, four blade actuators 1300a-1300d (corresponding to rotor blades 120a-120d), a hydraulic pump 1400, a hydraulic reservoir 1500, and a heat exchanger 1600.

As shown in FIGS. 14A-14C and 15A-15E, IBC system 1000 may include a variety of fluid lines that provide fluid communication between multiple components. For convenience, some of these fluid lines have been labeled "a," "b," "c," "d," "e," or "f." In these example embodiments, labels "a"-"d" correspond with chambers 904a-904d and blades 120a-120d. For example, fluid line "a" may represent a fluid line in the path between chamber 904a and blade 120a. Fluid line "e" may refer to system fluid, and fluid line "f" may refer to return fluid, both of which are described in greater detail below.

In operation, according to one example embodiment, radial fluid device 900 provides hydraulic fluid to hydraulic control manifold 1100. Hydraulic control manifold directs the fluid through hydraulic swivel 1200, which is configured to transfer the fluid flow from the fixed-frame portion of the rotorcraft to the rotating-frame portion of the rotorcraft. In one example embodiment, hydraulic swivel 1200 provides the fluid up along the drive shaft to blade actuators 1300a-1300d, which converts pressure changes in the supplied hydraulic fluid into movements of rotor blades 120a-120d.

In addition to providing fluid from radial fluid device 900 to blade actuators 1300a-1300d, IBC system 1000 also provides system fluid from hydraulic pump 1400 to blade actuators 1300a-1300d. This system fluid represents a constant-pressure fluid supply. Teachings of certain embodiments recognize that the supply fluid may not necessarily stay constant, such as due to leakage or other effects that may change the pressure of the supply fluid. The supply fluid may be provided to blade actuators 1300a-1300d to provide a balance against the pressures of the hydraulic fluid from radial fluid device 900. Excess fluid may also be accumulated through hydraulic control manifold 1100 and hydraulic swivel 1200, passed through heat exchanger 1600, and stored in hydraulic reservoir 1500 before being resupplied to hydraulic pump 1400.

Figure 14B:
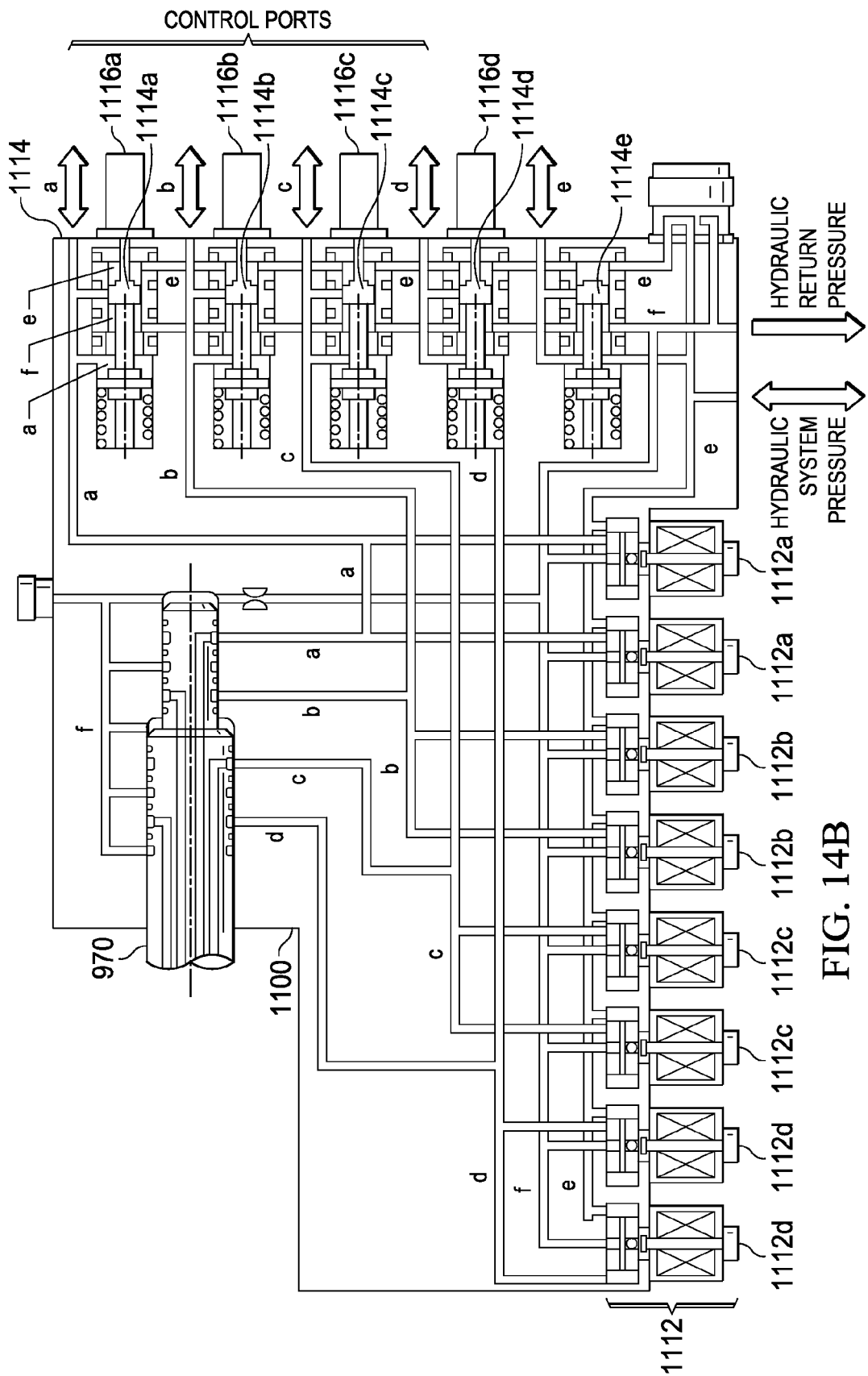

FIG. 14B shows hydraulic control manifold 1100 according to one example embodiment. Hydraulic control manifold 1100 features valves 1112 and control ports 1114.

In operation, according to one example embodiment, hydraulic control manifold 1100 receives fluid from chambers 904a-904d of radial fluid device 900 and communicates the fluid to valves 1112 and control ports 1114. In this example embodiment, hydraulic control manifold 1100 receives the fluid from chambers 904a-904d through manifold 970, which rotates with cylinder block 904. Manifold 970 includes ports for each chamber 904a-904d. In addition, manifold 970 includes seals around each port for chambers 904a-904d. Furthermore, manifold 970 includes return ports to accumulate leaking hydraulic fluid and return the accumulated hydraulic fluid to reservoir 1500.

Radial fluid device 900 may not include provisions for independently trimming blade actuator stroke position to equalize their lengths and maintain IBC operation about a center stroke. Accordingly, hydraulic control manifold 1100 may include valves 1112 operable to trim the position of each blade actuator 1300a-1300d and to compensate for leaking hydraulic fluid. In one example embodiment, valves 1112 are three-way direct drive valves.

Valves 1112 may add supply fluid to fluid lines a-d if the fluid pressure falls below a threshold. Alternatively, valves 1112 may remove fluid from fluid lines a-d if the fluid pressure rises about a threshold. In one example embodiment, valves 1112 receives measurements from position sensors associated with blade actuators 1300a-1300d and then adds fluid to or removes fluid from fluid lines a-d based on the received measurements. The measurements from the position sensors may indicate, for example, the amount of fluid that has leaked from various fluid lines within IBC system 1000. As another example, the measurements from the position sensors may indicate whether fluid line pressure should be adjusted to trim the position of each blade actuators 1300a-1300d.

In one example embodiment, valves 1112 may adjust for drift and leakage in IBC system 1000, but valves 1112 may not drive high-frequency changes in system pressure. Rather, high-frequency changes may be implemented by radial fluid device 900. Teachings of certain embodiments recognize that only using valves for low-frequency changes in system pressure may reduce the necessary size of the valves and increase longevity of the valves.

Unlike partial-authority IBC system 800, full-authority IBC system 1000 includes two valves 1112 for each rotor blade (e.g., two valves 1112a for rotor blade 120a). Teachings of certain embodiments recognize that multiple valves 1112 may be capable of providing fundamental collective input. In some embodiments, additional valves 1112 may add or remove fluid from the volume trapped between radial fluid device 900 and blade actuators 1300. Because the high-frequency flow providing fundamental cyclic and IBC is controlled by radial fluid device 900, valves 900 may be relatively low gain, thus minimizing the impact of a valve hard-over failure.

Even with a relatively low gain, a valve hard-over failure on a full-authority IBC actuator could create rotor instability if not bypassed quickly. Teachings of certain embodiments recognize that redundant systems may be appropriate for full-authority IBC systems because of the risks associated with removing the mechanical swashplate from the rotor system. Accordingly, the example full-authority IBC system 1000 includes redundant valves 1112 for each rotor blade. By incorporating two valves per IBC actuator, hard-over failures may be quickly bypassed by commanding the second valve in the opposite direction.

Control ports 1114 communicate fluid between hydraulic control manifold 1100 and hydraulic swivel 1200. Teachings of certain embodiments recognize that control ports 1114 may also terminate fluid flow in the event of some system failures. In the example of FIG. 14B, each control port 1114 is equipped with a solenoid bypass valve. In the event of a full-authority system failure requiring isolation from the conventional flight control system, for example, IBC system 1000 may remove power to the solenoid bypass valves associated with each control port 1114. In response, control ports 1114 cut off pressure to their pressure relief/bypass valves, causing them to redirect system fluid to the hydraulic fluid return lines f that lead back to reservoir 1500.

As will be explained in greater detail below with regard to FIGS. 17A and 17B, two or more radial fluid devices 900 may operate in parallel. In this scenario, damaging control force fighting between IBC actuators may occur if the displacement control outputs are not correctly synchronized. Should pressure synchronization fail or a blade actuator be inadvertently bottomed on a stationary vane, for example, damaging control pressures and actuator loads can be induced.

Teachings of certain embodiments recognize the ability to provide position sensors for synchronizing operations between multiple radial fluid devices 900. In some embodiments, position sensors may be provided on positioning pistons 913-915 (which are discussed above with regards to FIGS. 13A-13K) and/or the higher-harmonic cams of each radial fluid device 900. In these embodiments, however, the position sensors may not have the appropriate resolution to control force fights in a rigid system. Accordingly, teachings of certain embodiments recognize the capability to monitor control port pressure for each IBC actuator to control force fights between IBC actuators. In one example embodiment, each control port 1114 includes a position sensor 1116. Position sensors 1116 may measure the displacement distance of the control valve associated with each control port 1114. One example of position sensor may include a linear variable differential transformer.

In some embodiments, each control port 1114 may respond to changes in control port pressure by displacing its control valve proportionally to the pressure change. Each position sensor 1116 may measure the amount of displacement of each control valve. If control port pressure exceeds an allowable threshold, valves 1114 may port excess pressure to the return fluid system. Valves 1114 may isolate the system following a failure by applying electric power to the solenoids associated with valves 1114 and causing all control ports 1114 to port fluid to the return fluid system, effectively bypassing the entire system.

Figure 14C:
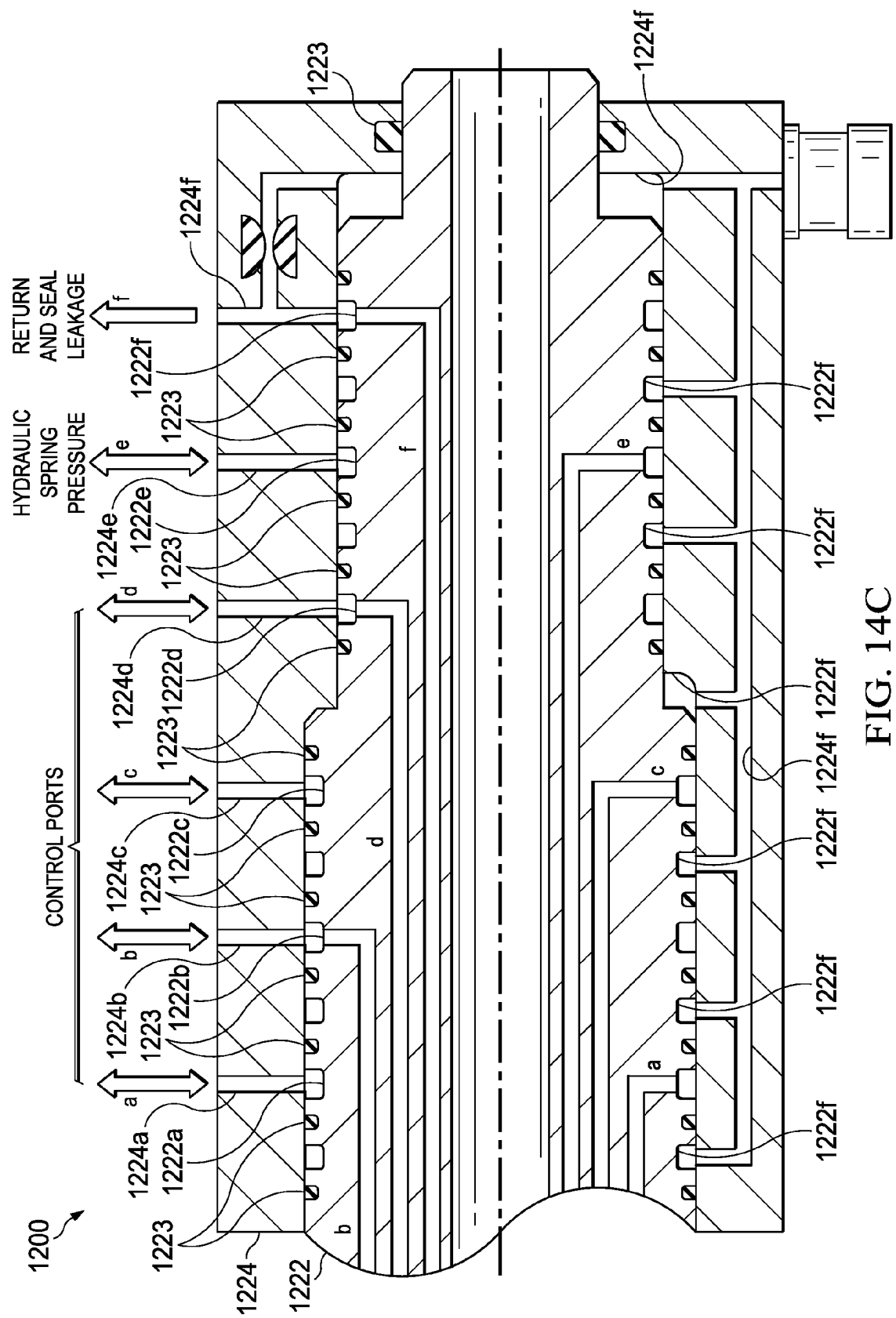

FIG. 14C shows hydraulic swivel 1200 according to one example embodiment. Hydraulic swivel 1200 includes a rotating portion 1222 and a stationary portion 1224. Rotating portion 1222 includes ports 1222a-1222d that communicates fluid between blade actuators 1300a-1300d and non-rotating portion 1224. Rotating portion 1222 also includes port 1222e, which communicates system fluid between blade actuators 1300a-1300d and non-rotating portion 1224. Rotating portion 1222 includes port 1222f, which communicates return fluid between blade actuators 1300a-1300d and non-rotating portion 1224.

Rotating portion also includes rotary seals 1223 between each port 1222a-1222f. Teachings of certain embodiments recognize that providing both port 1222f for return fluid and seals 1223 may extend seal life and reduce or eliminate issues associated with nuisance leakage.

Rotating portion also includes wiring for communicating signals from blade actuators 1300a-1300d to the non-rotating portions of IBC system 1000. In one example embodiment, the wiring includes two wires for each position sensor associated with the blade actuators 1300a-1300d plus three common wires for each blade actuator providing excitation power.

Stationary portion 1224 includes fluid lines 1224a-1224d that communicates fluid between ports 1222a-1222d and fluid lines a-d. Stationary portion 1224 also includes fluid line 1224e, which communicates fluid between port 1222e and fluid line e. Stationary portion 1224 includes fluid line 1224f, which communicates fluid between port 1222f and fluid line f.

Figure 15B:
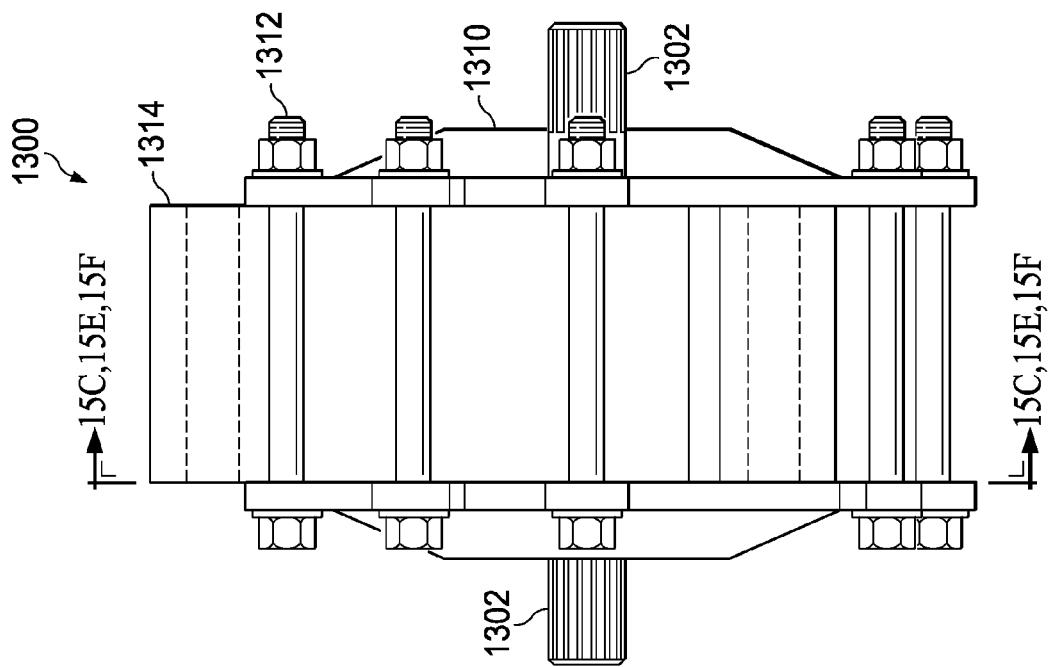
FIGS. 15A-15F show the blade actuators of the IBC system of FIGS. 14A-14C according to one example embodiment.
Figure 15A:
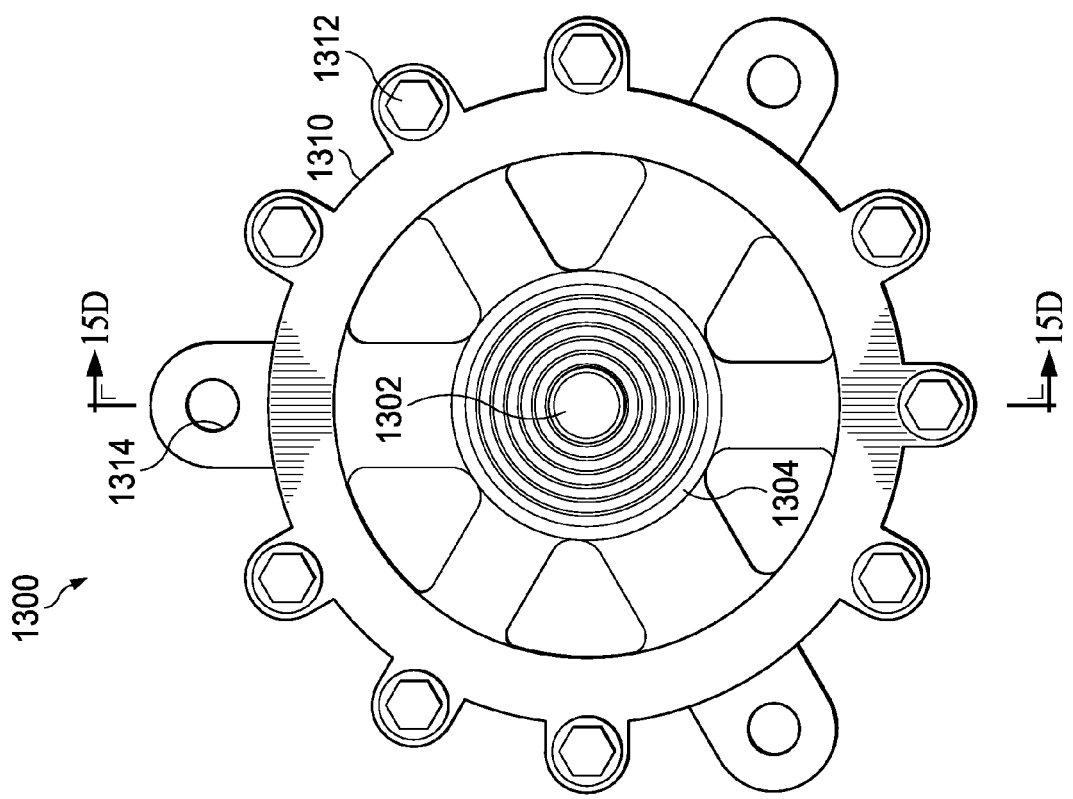

FIGS. 15A-15F show blade actuator 1300a according to one example embodiment. FIG. 15A shows a top view of blade actuator 1300a, and FIG. 15B shows a side view of blade actuator 1300a. Blade actuator 1300a is operable to change the position of blade 120a during operation of rotorcraft 100. Similarly, blade actuators 1300b-1300d are operable change the positions of blades 120b-120d, respectively.

In the example of FIGS. 15A-15F, blade actuator 1300a is a hydraulic rotary vane actuator. In some embodiments, a hydraulic rotary vane actuator may be powered at the root of each rotor blade. Teachings of certain embodiments recognize that vane actuators may have reduced leakage due to their dependency on a rotary seal, as compared to an equivalent-power linear hydraulic actuator with a sliding seal. In addition, a hydraulic vane actuator may also have a higher relative stiffness.

As shown in FIGS. 15A and 15B, blade actuator 1300a may feature a shaft 1302 and a rotary seal 1304 disposed within one or more openings of a housing 1310. As will be shown in greater detail below, shaft 1302 is coupled to a vane within housing 1310. In some embodiments, different shafts 1302 may have different gear splines, and an installer may choose from among different shafts 1302 for use with different rotor blades. Rotary seal 1304 is positioned about shaft 1302 and separates the interior of housing 1310 from the exterior of housing 1310.

In some embodiments, rotary seal 1304 is an elastomeric membrane seal. Teachings of certain embodiments recognize that an elastomeric membrane seal may be suitable in situations where shaft 1302 is limited to a certain range of motion. For example, an elastomeric seal may be coupled to shaft 1302 and may stretch as shaft 1302 rotates so long as shaft 1302 does not stretch the elastomeric seal past its elasticity limit. In some embodiments, angular travel of shaft 1302 may be limited to plus/minus 18 degrees of rotation. In these embodiments, the elastomeric membrane seal may stretch to absorb the plus/minus 18 degrees of rotation. In addition, as will be explained below with regard to FIG. 15D, the elastomeric membrane seal may not be exposed to high pressures (e.g., return fluid pressure of approximately 100 pounds per square inch), thus limiting the axial hydraulic forces pushing against the seal.

In the example of FIGS. 15A and 15B, housing 1310 includes multiple pieces connected together using bolts 1312. Housing 1310 may also include connection points 1314 for securing blade actuator 1300a to the rotorcraft.

Figure 15D:
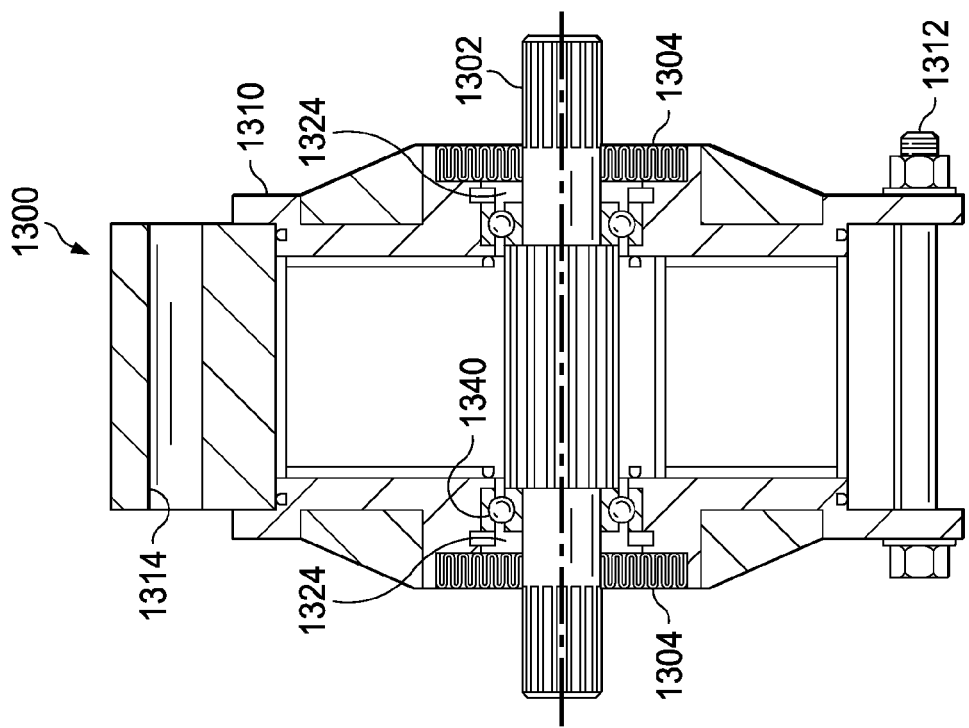
Figure 15C:
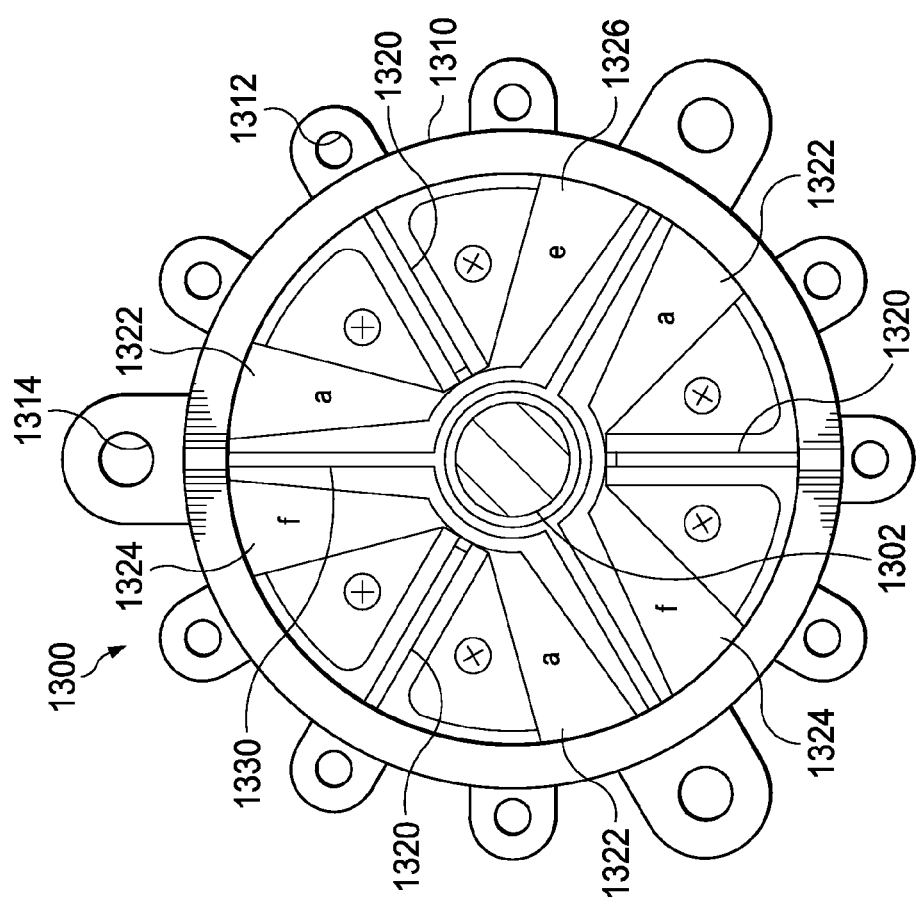

FIG. 15C shows a cross-section view of blade actuator 1300a along the cross-section line indicated in FIG. 15B. As seen in FIG. 15C, blade actuator 1300a features stationary vanes 1320 and vane impeller 1330. In this example, stationary vanes 1320 define three chambers, although other embodiments may define more or fewer chambers. Vane impeller 1330 includes three vane surfaces, each vane surface extending into a corresponding chamber between stationary vanes 1320. Vane impeller 1330 is coupled to shaft 1302 such that rotation of vane impeller 1330 results in rotation of shaft 1302.

Each chamber defined by stationary vanes 1320 includes two openings for communicating fluid into and out of the chamber. Within each chamber, the vane surface of vane impeller 1330 separates the two openings such that fluid from both openings may accumulate and pressurize on both sides of the vane surface. In operation, a difference in fluid pressure on opposite sides of a vane surface may cause the vane surface (and thus vane impeller 1330 as a whole) to rotate.

In the example of FIG. 15C, each chamber includes variable-pressure control fluid 1322 on one side of a vane surface. In two chambers, return fluid 1324 is accumulated and ported out of blade actuator 1300. In these two chambers, the pressure of the control fluid 1322 is expected to be greater than the pressure of the return fluid 1324. In the third chamber, approximately-constant system fluid 1326 is provided opposite the variable-pressure control fluid 1324. In this third chamber, the system fluid 1326 applies a constant source of hydraulic pressure to oppose pressure from the control fluid 1322 and create a hydraulic spring effect. In this example, the first two chambers, in combination, have twice the effective vane area as the third chamber, doubling the ability of the variable-pressure control fluid 1322 to move vane impeller 1330.

In some circumstances, blade actuator 1300*a* may be subject to leakage. For example, leakage across rectangular vane surfaces in a rotary vane may be higher than in piston actuators in a cylinder. Accordingly, teachings of certain embodiments recognize that leaked fluid should be ported returned to the system rather than vented to the atmosphere. Teachings of certain embodiments also recognize the ability to use this leaked fluid to provide a continuous lubrication to support bearings in blade actuator 1300*a* and create low pressure areas behind rotary seals 1304.

FIG. 15D shows a cross-section view of blade actuator 1300*a* along the cross-section line indicated in FIG. 15A. As shown in FIG. 15D, support bearings 1340 may support rotation of shaft 1302 within blade actuator 1300*a*. In this example, leaking fluid may lubricate support bearings 1340 and then be ported to the return fluid 1324. In addition, teachings of certain embodiments recognize that providing return fluid 1324 behind rotary seal 1304 may prevent rotary seal 1304 from being subject to high hydraulic forces.

Figure 15E:
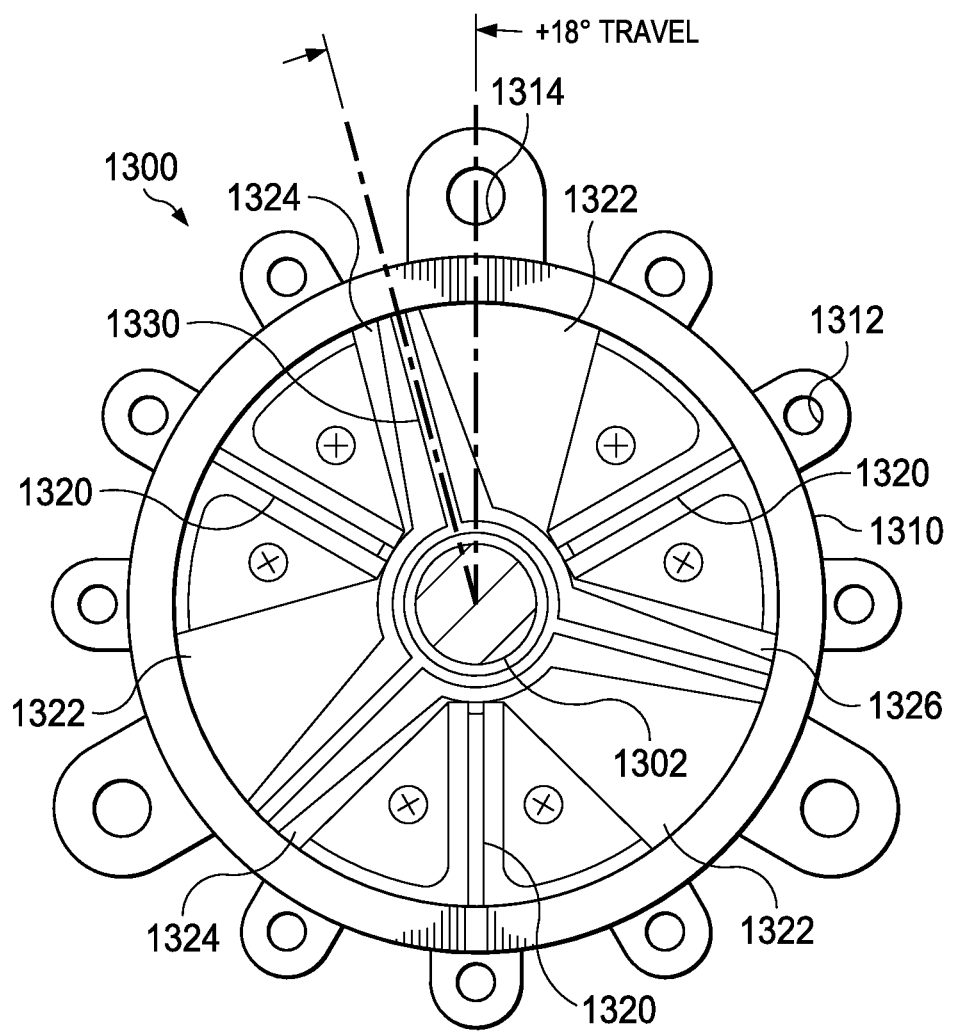
Figure 15F:
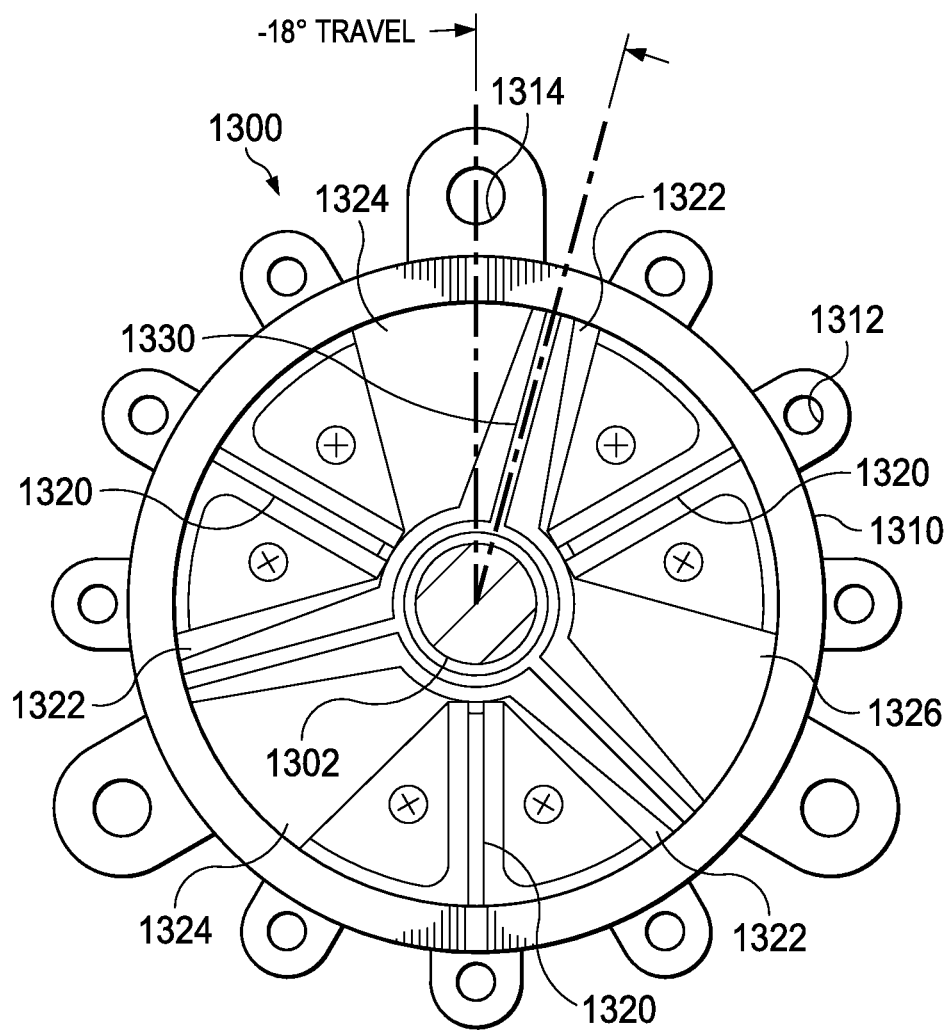

FIGS. 15E and 15F show cross-section views of blade actuator 1300*a* along the cross-section line indicated in FIG. 15B during operation of blade actuator 1300*a*. In the example of FIG. 15E, hydraulic pressure of control fluid 1322 is greater than hydraulic pressure of system fluid 1326, which forces vane impeller 1330 to rotate counter-clockwise by 18 degrees. In the example of FIG. 15E, hydraulic pressure of control fluid 1322 is less than hydraulic pressure of system fluid 1326, which forces vane impeller 1330 to rotate clockwise by 18 degrees.

Figure 16A:
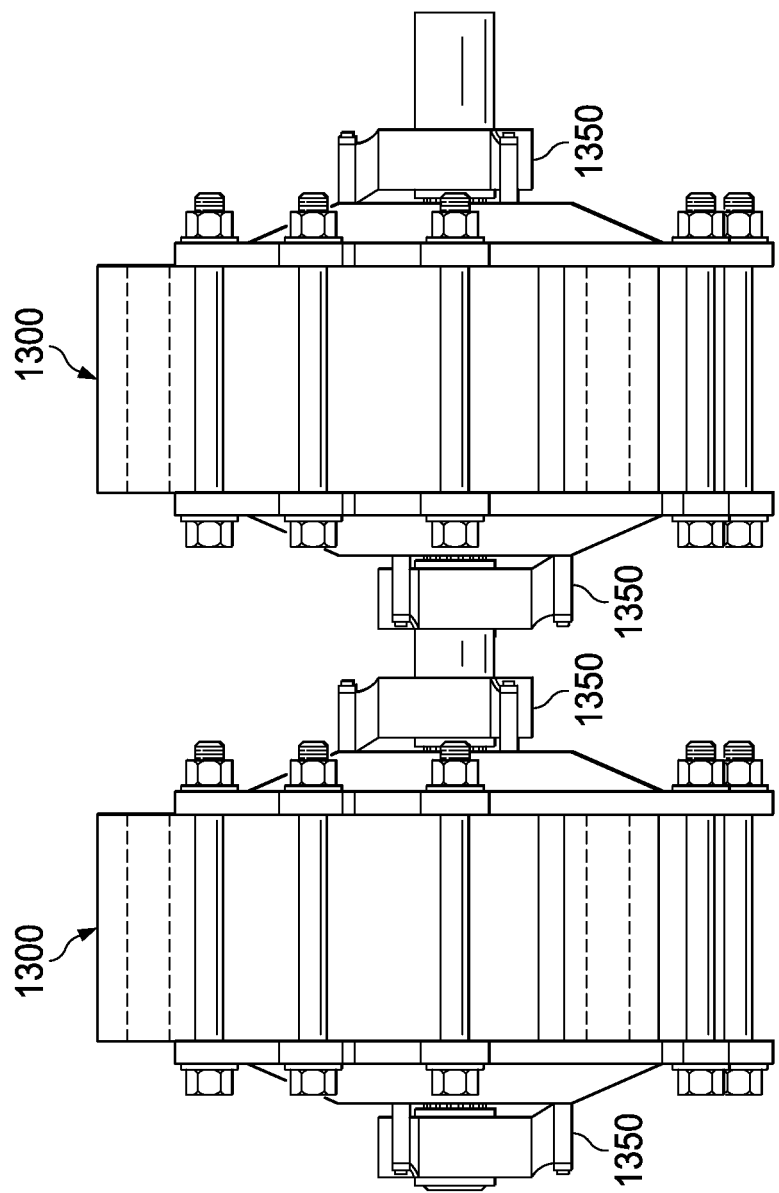
FIG. 16A shows two of the blade actuators of FIGS. 15A-15F coupled in series according to one example embodiment.
Figure 16B:
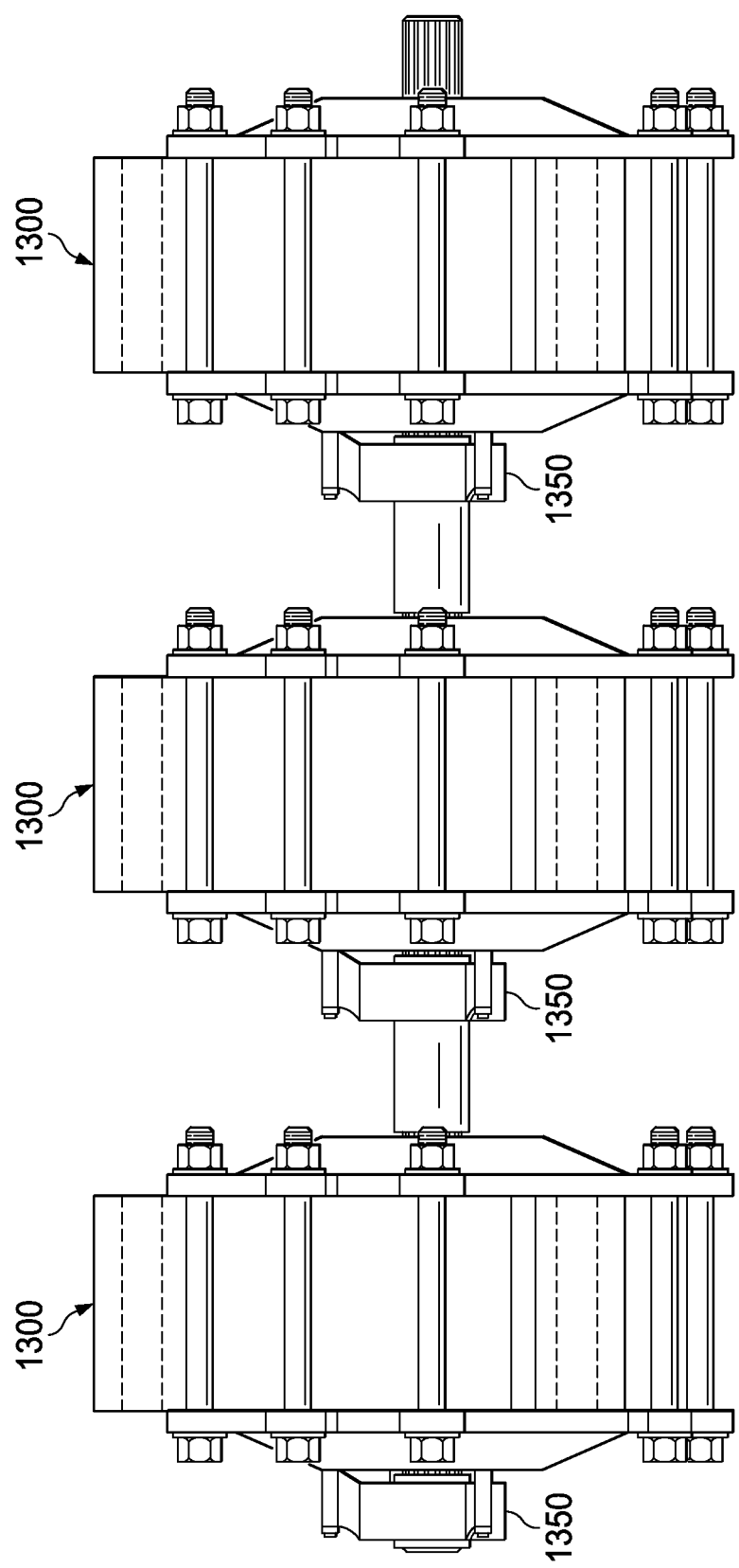
FIG. 16B shows three of the blade actuators of FIGS. 15A-15F coupled in series according to one example embodiment.

In some embodiments, multiple blade actuators 1300 may be coupled together to operate in series. Teachings of certain embodiments recognize that providing multiple blade actuators 1300 per blade may provide redundancy and reduce catastrophic failure in the event a blade actuator fails. For example, FIG. 16A shows two blade actuators 1300*a* coupled together in series, and FIG. 16B shows three blade actuators 1300*a* coupled together in series. In each of these examples, coupling assemblies 1350 couple together shafts 1302*a* from different blade actuators 1300*a*.

Figure 17A:
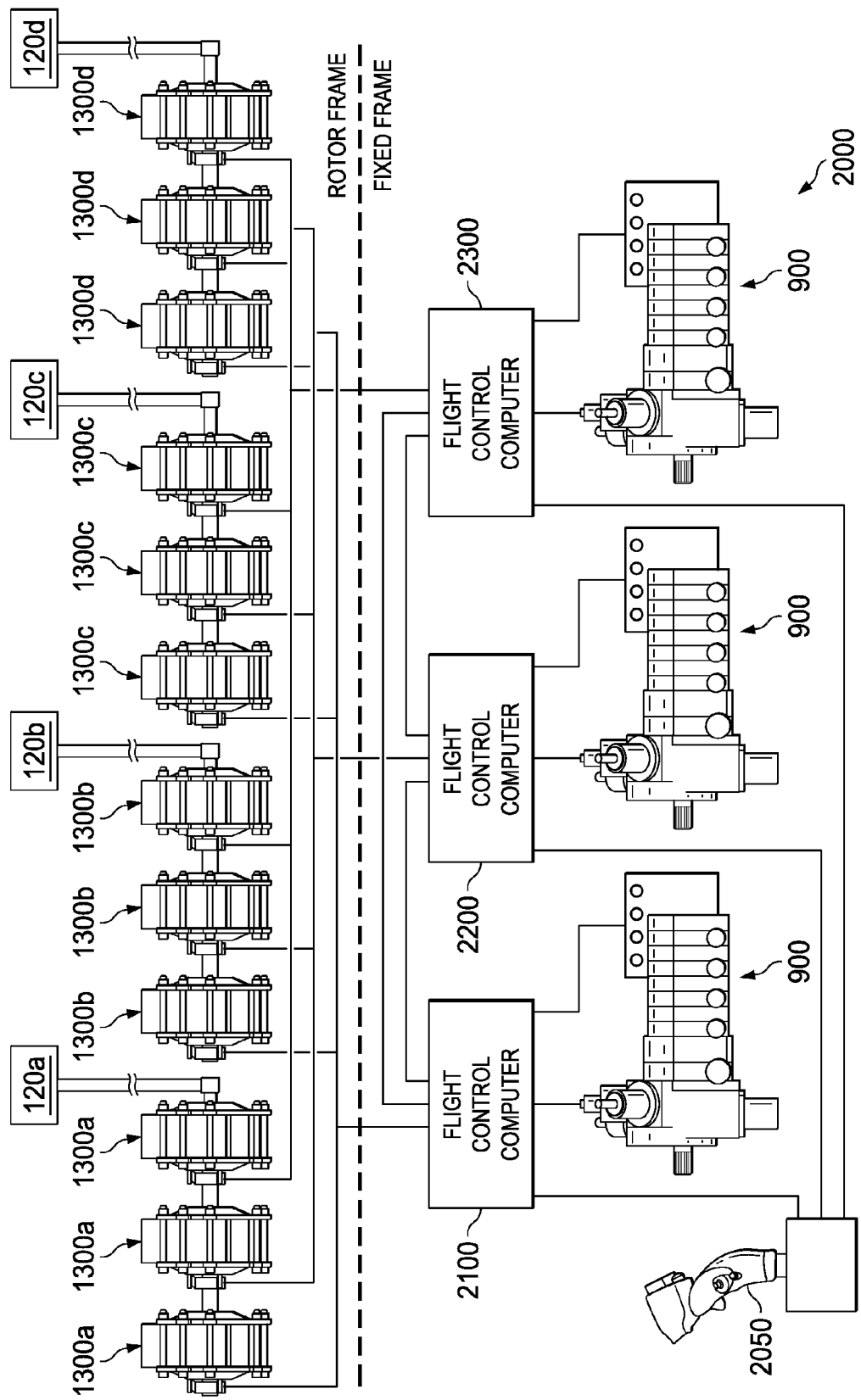
FIG. 17A shows an IBC system featuring three of the radial fluid devices of FIGS. 13A-13J and 13M and four sets of the coupled blade actuators of FIG. 16B according to one example embodiment.
Figure 17B:
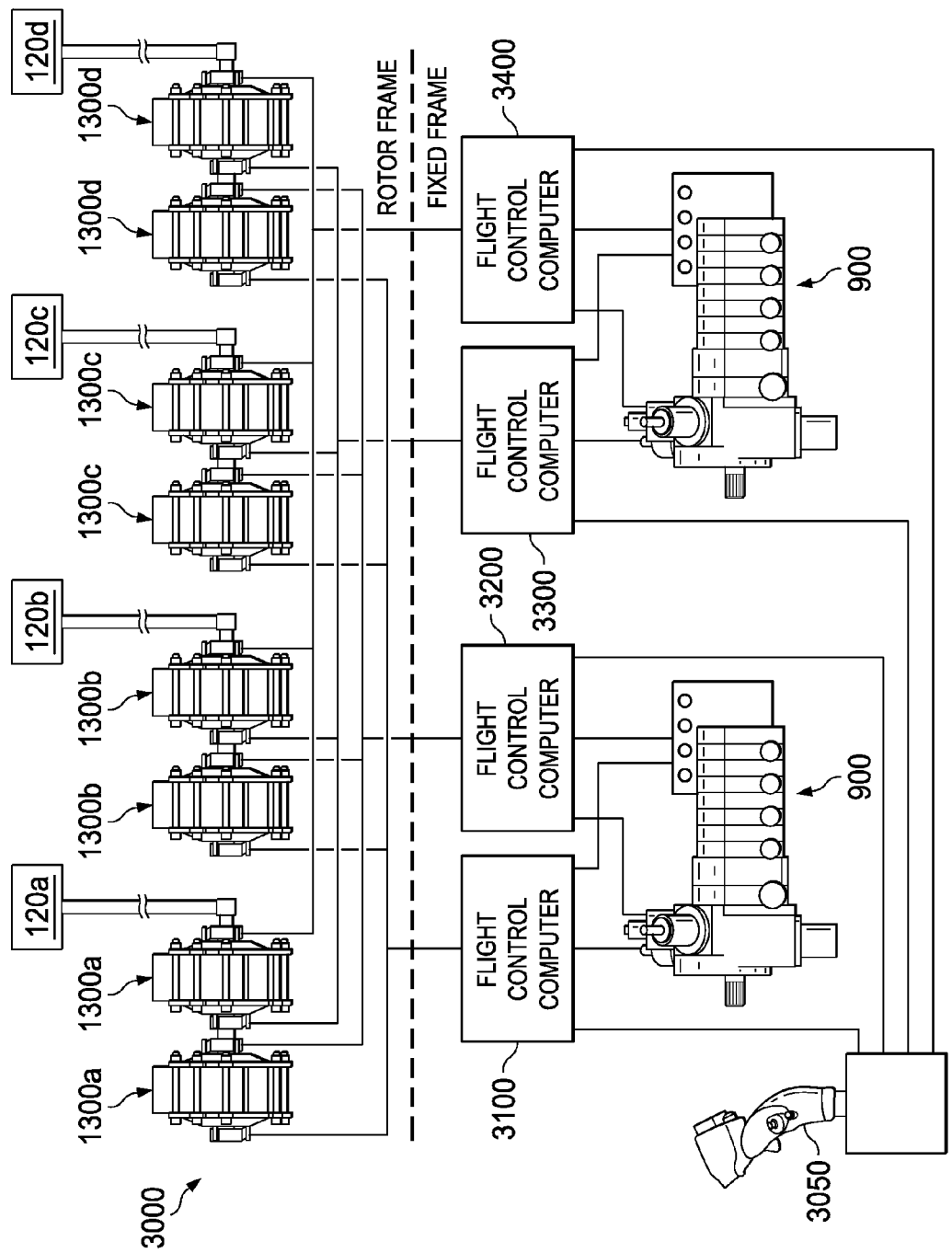
FIG. 17B shows an IBC system featuring two of the radial fluid devices of FIGS. 13A-13J and 13M and four sets of the coupled blade actuators of FIG. 16A according to one example embodiment.

FIGS. 17A and 17B show redundant IBC systems having multiple blade actuators 1300 coupled together in series. In FIG. 17A, IBC system 2000 features three blade actuators 1300 coupled together in series for each rotary blade (e.g., rotor blade 120*a* is coupled to three blade actuators 1300*a*). IBC system 2000 also features three flight control computers (flight control computers 2100, 2200, and 2300). Each flight control computer is in communication with a corresponding radial fluid device 900. Each flight control computer/radial fluid device combination is operable to control one of the three blade actuators 1300 for each rotor blade, as shown in FIG. 17A.

In operation, according to one example embodiment, flight control computers 2100, 2200, and 2300 receive cyclic and collective instructions from input device 2050. One example of input device 2050 may include a control stick accessible by a pilot. Each flight control computer 2100, 2200, and 2300 programs a radial fluid device 900 to implement the cyclic and collective instructions. For example, each flight control computer may send signals indicating how the fundamental cyclic motion pistons and the higher-harmonic cams of each radial fluid device should be positioned.

Each flight control computer 2100, 2200, and 2300 may also receive measurements indicating whether blade actuators 1300 are fighting against one another. For example, each flight control computer may measure shaft rotation speeds, fluid pressures, and/or piston/valve displacements. In this example, a difference in these measurements between flight control computers 2100, 2200, and 2300 may indicating that two or more blade actuators 1300 may be fighting each other. Thus, flight control computers 2100, 2200, and 2300 may communicate with each other using cross-channel data links to share synchronization information. As one example, if two blade actuators 1300 are mechanically fighting, the two corresponding flight control computers may share information indicating that at least one of the flight control computers should adjust fluid line pressure within its portion of the IBC system.

In FIG. 17B, IBC system 3000 features two blade actuators 1300 coupled together in series for each rotary blade (e.g., rotor blade 120*a* is coupled to two blade actuators 1300*a*). IBC system 3000 also features four flight control computers (flight control computers 3100, 3200, 3300, and 3400). Unlike IBC system 2000, two flight control computers are in communication with one corresponding radial fluid device 900. In this example, each radial fluid device 900 is in communication with redundant flight control computers, allowing each radial fluid device 900 to continue powering blade actuators 1300 even if one flight control computer is disabled.

Teachings of certain embodiments recognize that IBC systems may include any number of blade actuators, flight control computers, and radial fluid devices. The numbering and configuration may depend, for example, on the safety requirements for a particular rotorcraft.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
 a body;
 a power train coupled to the body and comprising a power source and a drive shaft coupled to the power source;
 a rotor system coupled to the power train and comprising a rotor blade; and
 a rotary actuator coupled to the at least one rotor blade, the rotary actuator comprising:
  a housing comprising a first chamber and a second chamber, wherein the first chamber features a first fluid opening and a second fluid opening and the second chamber features a third fluid opening and a fourth fluid opening;
  a first fluid source in fluid communication with the first and third fluid openings and configured to provide a first fluid to the first chamber and the second chamber at a first pressure;

a second fluid source in fluid communication with the second fluid opening and configured to provide a second fluid to the first chamber at a second pressure;
a third fluid source in fluid communication with the fourth fluid opening and configured to provide a third fluid to the second chamber at a third pressure different than the second pressure;
a vane disposed within the housing, the vane comprising a first vane surface disposed within the first chamber between the first fluid opening and the second fluid opening and a second vane surface disposed within the second chamber between the third fluid opening and the fourth fluid opening; and
a shaft disposed at least partially within the housing and coupled to the vane, wherein the shaft is coupled to the rotor blade such that the shaft transfers movement of the vane to the rotor blade.

2. The rotorcraft of claim 1, further comprising at least one fluid pump operable to provide the first fluid through the first fluid opening and the third fluid opening and provide the second fluid through the second fluid opening.

3. The rotorcraft of claim 1, wherein the first fluid has a varying pressure and the second fluid has an approximately constant pressure.

4. The rotorcraft of claim 1, wherein:
the housing further comprises a third chamber featuring a fifth fluid opening and a sixth fluid opening;
the first fluid source is in fluid communication with the fifth opening and configured to provide the first fluid to the third chamber at the first pressure;
the third fluid source is in fluid communication with the sixth opening and configured to provide the third fluid to the third chamber at the third pressure; and
the vane further comprises a third surface disposed within the third chamber between the fifth fluid opening and the sixth fluid opening.

5. The rotorcraft of claim 1, the rotary actuator further comprising a plurality of bearings separating the shaft from the housing.

6. The rotorcraft of claim 5, the housing further comprising at least one surface configured to direct at least some leaking fluid from the first chamber or the second chamber through a portion of at least one of the plurality of bearings.

7. The rotorcraft of claim 1, the rotary actuator further comprising an elastomeric seal coupled to the shaft and to the housing, the elastomeric seal configured to prevent at least some fluid from leaking out of the rotary actuator between the shaft and the housing.

8. The rotorcraft of claim 1, wherein the first vane surface separates the first fluid from the second fluid within the first chamber and the second vane surface separates the first fluid from the third fluid within the second chamber.

9. The rotorcraft of claim 1, wherein the vane is operable to rotate in response to a difference in forces applied against the vane by the first fluid in a first direction and by the second and third fluids in an opposing second direction.

10. The rotorcraft of claim 4, wherein the third vane surface separates the first fluid from the third fluid within the third chamber.

11. A rotary blade actuator, comprising:
a housing comprising a first chamber and a second chamber, wherein:
the first chamber features a first fluid opening and a second fluid opening and the second chamber features a third fluid opening and a fourth fluid opening,
the first and third fluid openings are configured to provide a first fluid to the first chamber and the second chamber at a first pressure,
the second fluid opening is configured to provide a second fluid to the first chamber at a second pressure, and
the fourth fluid opening is configured to provide a third fluid to the second chamber at a third pressure different from the second pressure;
a vane disposed within the housing, the vane comprising a first vane surface disposed within the first chamber between the first fluid opening and the second fluid opening and a second vane surface disposed within the second chamber between the third fluid opening and the fourth fluid opening;
a shaft disposed at least partially within the housing and coupled to the vane, the shaft operable to rotate in response to movements of the vane.

12. The rotary blade actuator of claim 11, wherein the first fluid has a varying pressure and the second fluid has an approximately constant pressure.

13. The rotary blade actuator of claim 11, wherein:
the housing further comprises a third chamber featuring a fifth fluid opening and a sixth fluid opening;
the fifth fluid opening is configured to provide the first fluid to the third chamber at the first pressure;
the sixth fluid opening is configured to provide the third fluid to the third chamber at the third pressure; and
the vane further comprises a third surface disposed within the third chamber between the fifth fluid opening and the sixth fluid opening.

14. The rotary blade actuator of claim 11, further comprising a plurality of bearings separating the shaft from the housing.

15. The rotary blade actuator of claim 14, the housing further comprising at least one surface configured to direct at least some leaking fluid from the first chamber or the second chamber through a portion of at least one of the plurality of bearings.

16. The rotary blade actuator of claim 14, further comprising an elastomeric seal coupled to the shaft and to the housing, the elastomeric seal configured to prevent at least some fluid from leaking out of the rotary actuator between the shaft and the housing.

17. The rotary blade actuator of claim 11, wherein the first vane surface separates the first fluid from the second fluid within the first chamber and the second vane surface separates the first fluid from the third fluid within the second chamber.

18. The rotary blade actuator of claim 11, wherein the vane is operable to rotate in response to a difference in forces applied against the vane by the first fluid in a first direction and by the second and third fluids in an opposing second direction.

19. The rotary blade actuator of claim 13, wherein the third vane surface separates the first fluid from the third fluid within the third chamber.

* * * * *